(12) United States Patent
Nemoto

(10) Patent No.: US 8,144,241 B2
(45) Date of Patent: Mar. 27, 2012

(54) IMAGING APPARATUS, IMAGE PROCESSING APPARATUS, AND EXPOSURE CONTROL METHOD

(75) Inventor: Hiromi Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 12/414,187

(22) Filed: Mar. 30, 2009

(65) Prior Publication Data

US 2010/0073510 A1 Mar. 25, 2010

(30) Foreign Application Priority Data

| Apr. 4, 2008 | (JP) | 2008-098644 |
| Apr. 4, 2008 | (JP) | 2008-098645 |
| Apr. 4, 2008 | (JP) | 2008-098646 |
| Apr. 4, 2008 | (JP) | 2008-098647 |
| Apr. 4, 2008 | (JP) | 2008-098648 |
| Sep. 12, 2008 | (JP) | 2008-235245 |

(51) Int. Cl.
- *H04N 17/00* (2006.01)
- *H04N 3/02* (2006.01)
- *H04N 5/228* (2006.01)
- *H04N 5/238* (2006.01)
- *G06K 9/00* (2006.01)

(52) U.S. Cl. ............ 348/365; 348/184; 348/208.16; 382/170

(58) Field of Classification Search .......... 348/184–185, 348/208.12, 208.14, 362–366; 382/170–171
See application file for complete search history.

(56) References Cited

U.S. PATENT DOCUMENTS

| 6,766,066 B2 * | 7/2004 | Kitazawa | 382/291 |
| 6,939,011 B2 * | 9/2005 | Kobayashi | 353/69 |
| 2003/0202004 A1 | 10/2003 | Lin | |

FOREIGN PATENT DOCUMENTS

| JP | 61-74453 | 4/1986 |
| JP | 9-65252 | 3/1997 |
| JP | 2001-312723 | 11/2001 |
| JP | 2003-8909 | 1/2003 |

(Continued)

OTHER PUBLICATIONS

English Machine Translation of JP 2005-275447 published Oct. 10, 2005.*

(Continued)

*Primary Examiner* — Daniel M Pasiewicz
(74) *Attorney, Agent, or Firm* — Oblon, Spivak, McClelland, Maier & Neustadt, L.L.P.

(57) ABSTRACT

An imaging apparatus includes an imaging unit configured to capture an image of an object to obtain an image signal, a detection unit configured to set a detection area in a captured image based on the image signal obtained by the imaging unit and calculate a detection value from an image signal in the detection area, an exposure adjustment unit configured to perform exposure adjustment, a control unit configured to control the exposure adjustment unit so that the detection value becomes equal to a predetermined value, and a presentation-image detecting unit configured to detect a presentation image presented by an image presentation device from the captured image on the basis of a difference in luminance in the captured image. When the presentation-image detecting unit detects the presentation image, the detection unit sets the detection area in a location different from a location of the detected presentation image.

8 Claims, 64 Drawing Sheets

FOREIGN PATENT DOCUMENTS

| | | |
|---|---|---|
| JP | 2003-108996 | 4/2003 |
| JP | 2005-275447 | 10/2005 |
| JP | 2005-354691 | 12/2005 |
| JP | 2006-270135 | 10/2006 |
| JP | 2006-313965 | 11/2006 |
| JP | 2007-36782 | 2/2007 |
| JP | 2007-129622 | 5/2007 |
| JP | 2007-148612 | 6/2007 |
| JP | 2007-195029 | 8/2007 |
| JP | 2007-228747 | 9/2007 |
| JP | 2009-253635 | 10/2009 |
| JP | 2009-253636 | 10/2009 |
| JP | 2009-253637 | 10/2009 |
| JP | 2009-268056 | 11/2009 |
| WO | WO 00/27125 | 5/2000 |

OTHER PUBLICATIONS

English Machine Translation of JP 2006-313965 published Nov. 11, 2006.*

Katsuto Fujimoto, et al., "Binarization Method to Extract High-Quality Character Patterns from Color Images of Low Spatial Resolutions", The Institute of Electronics, Information and Communication Engineers, vol. 99, No. 380, IEICE Technical Report, 1999, pp. 7-14, with English Abstract.

* cited by examiner

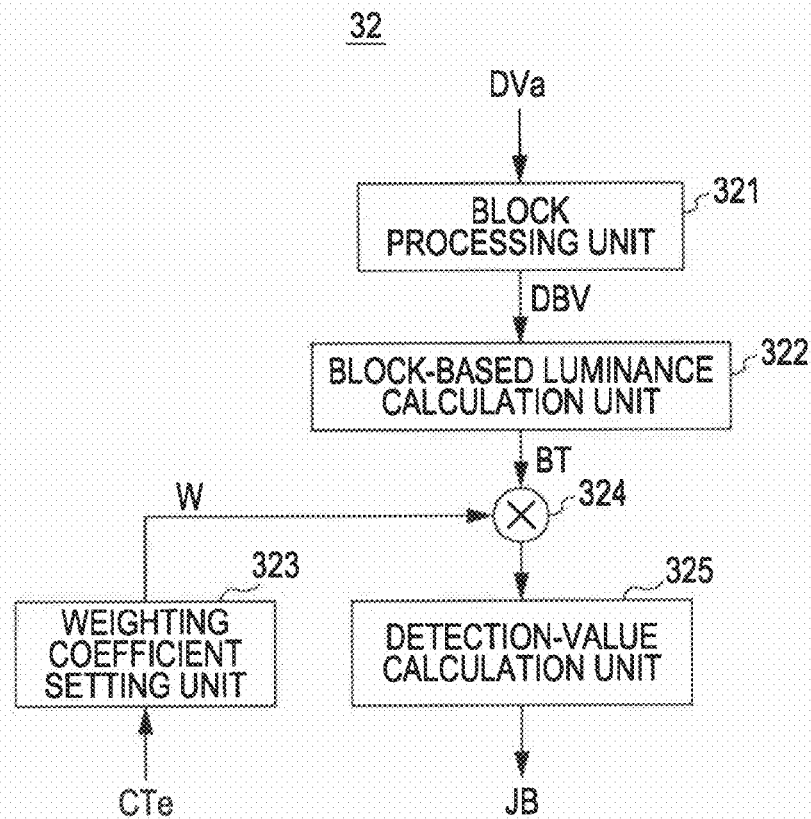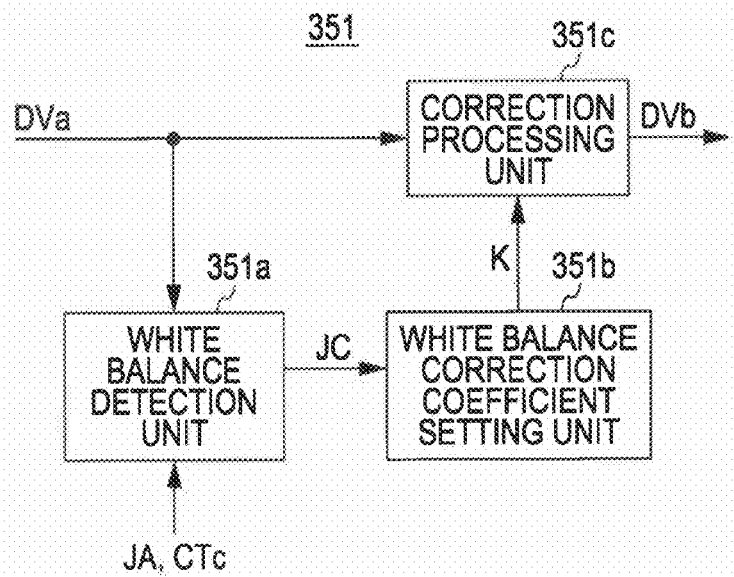

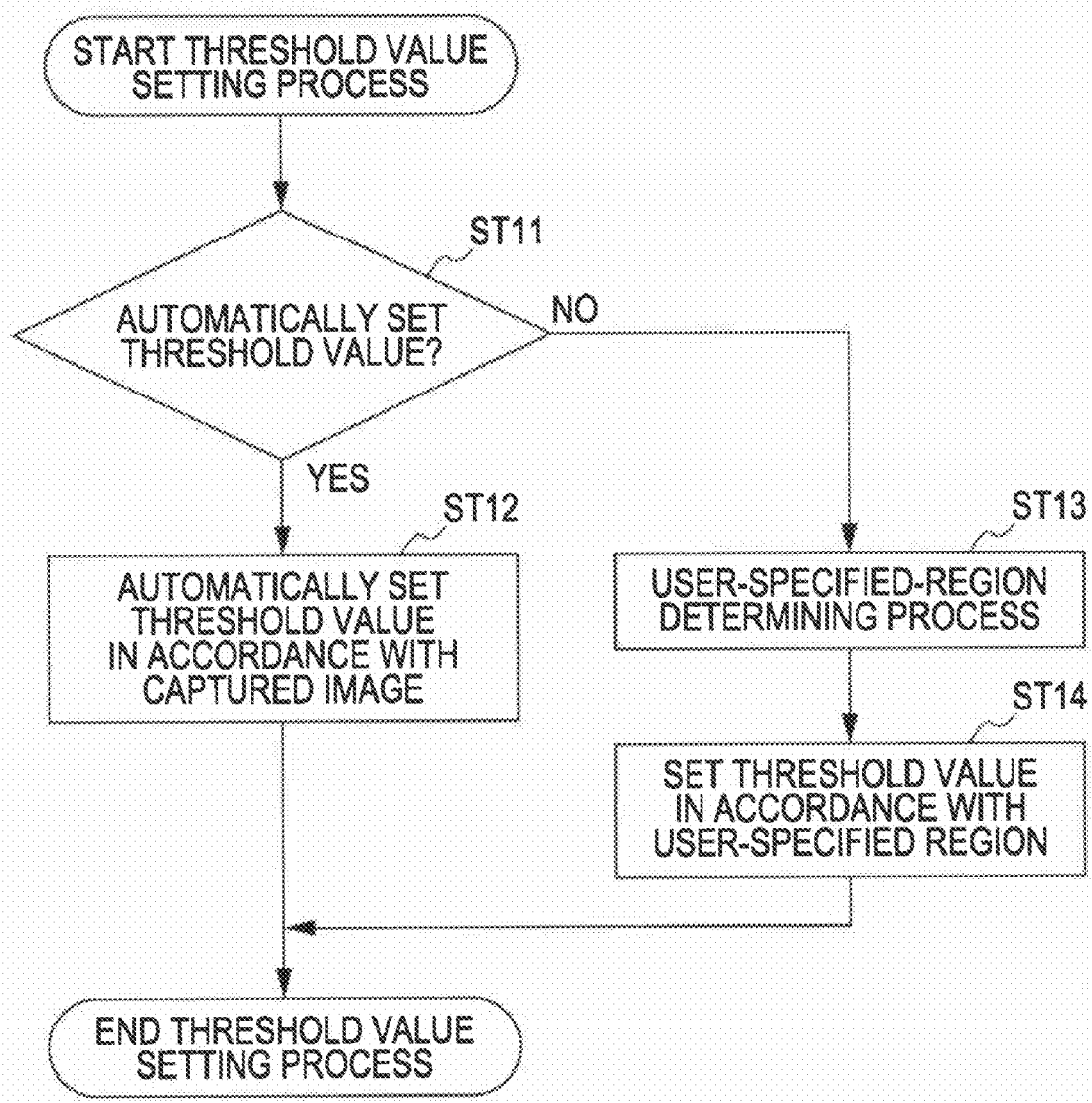

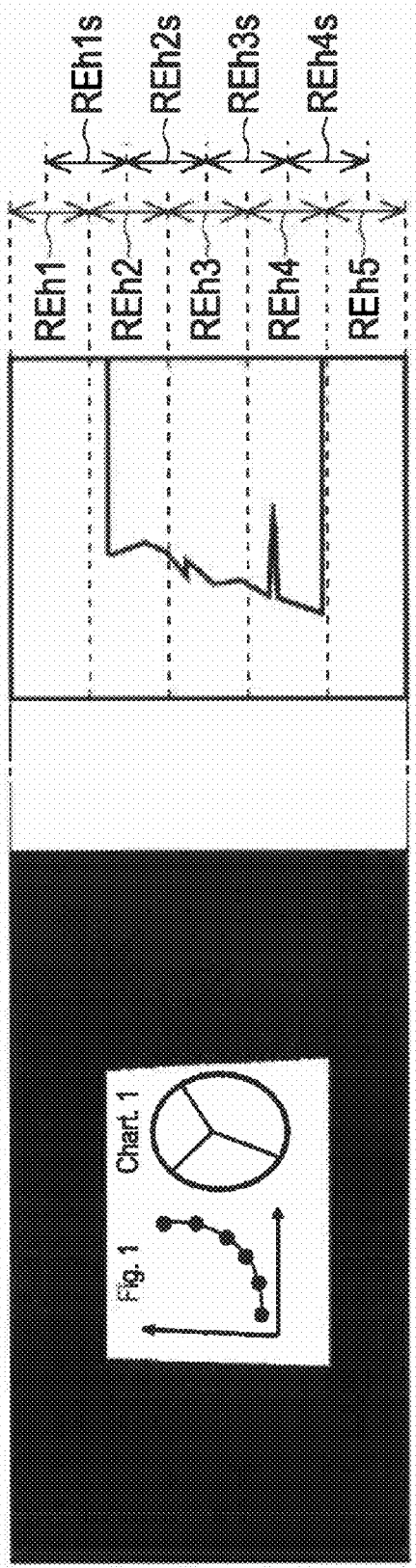

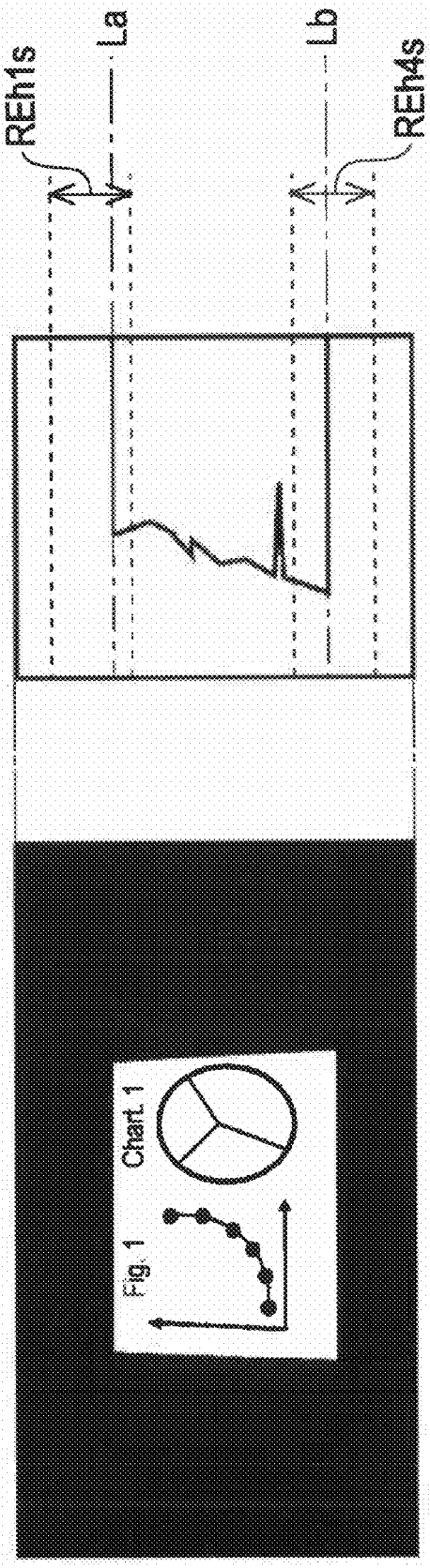

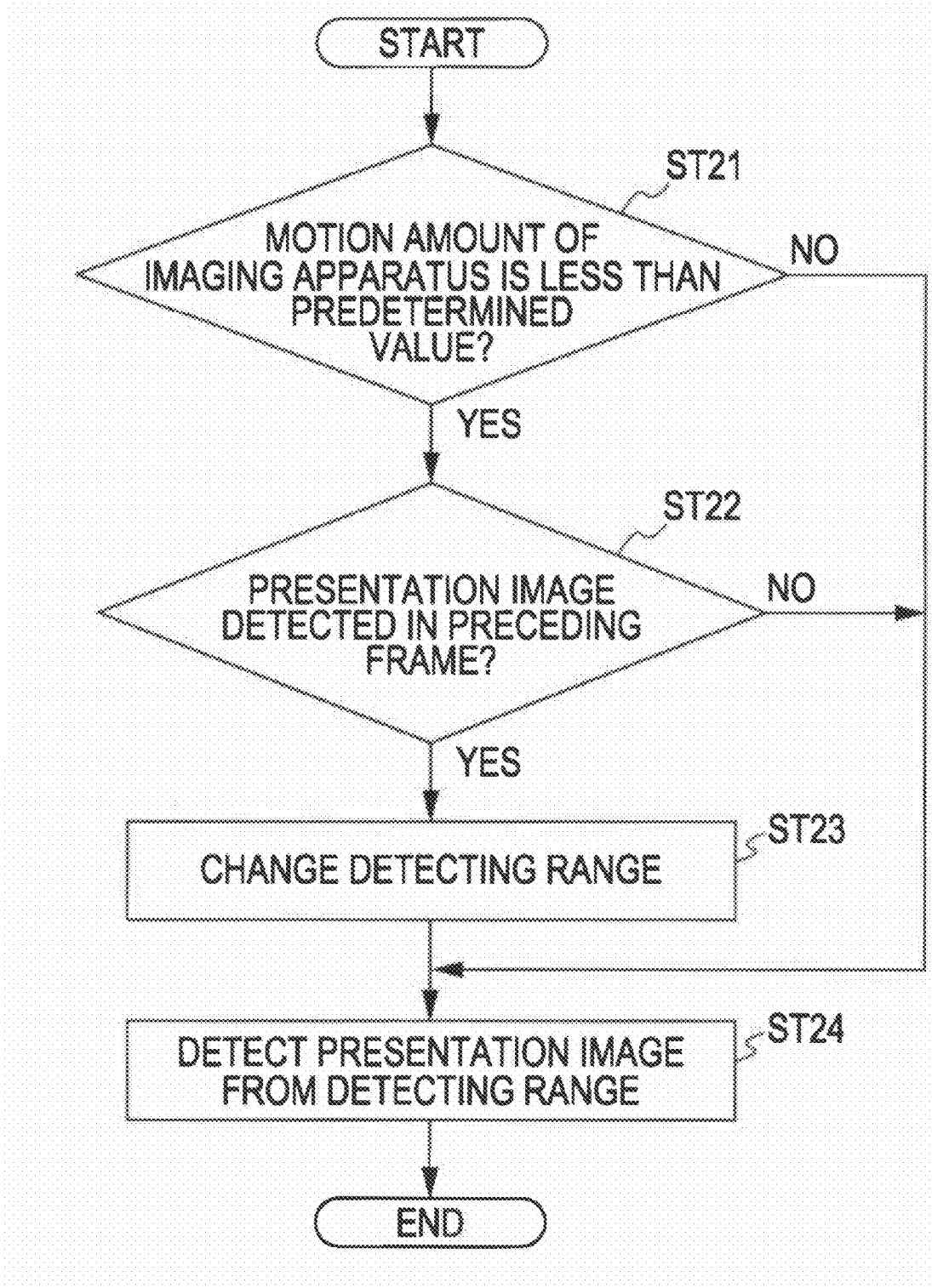

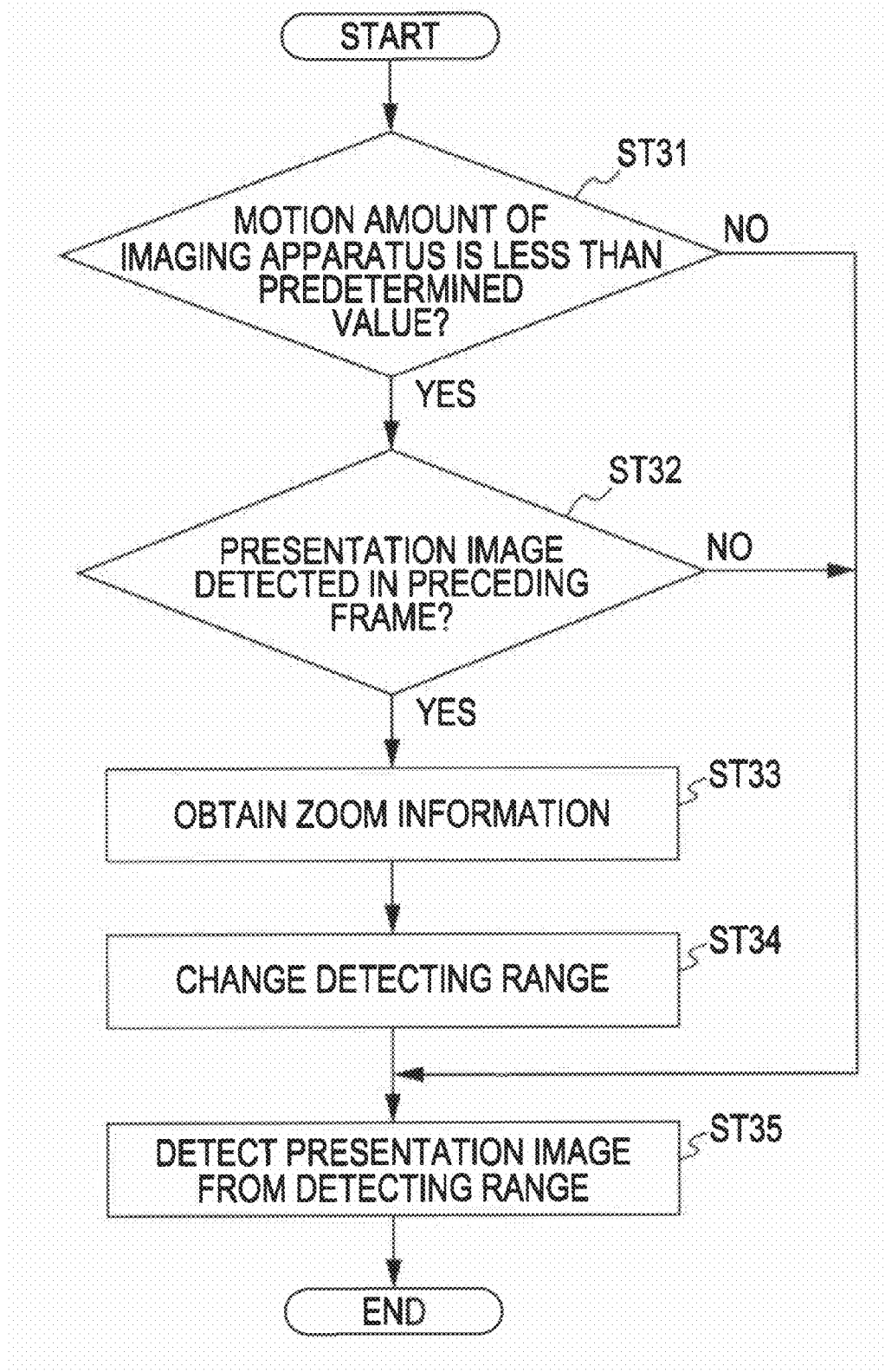

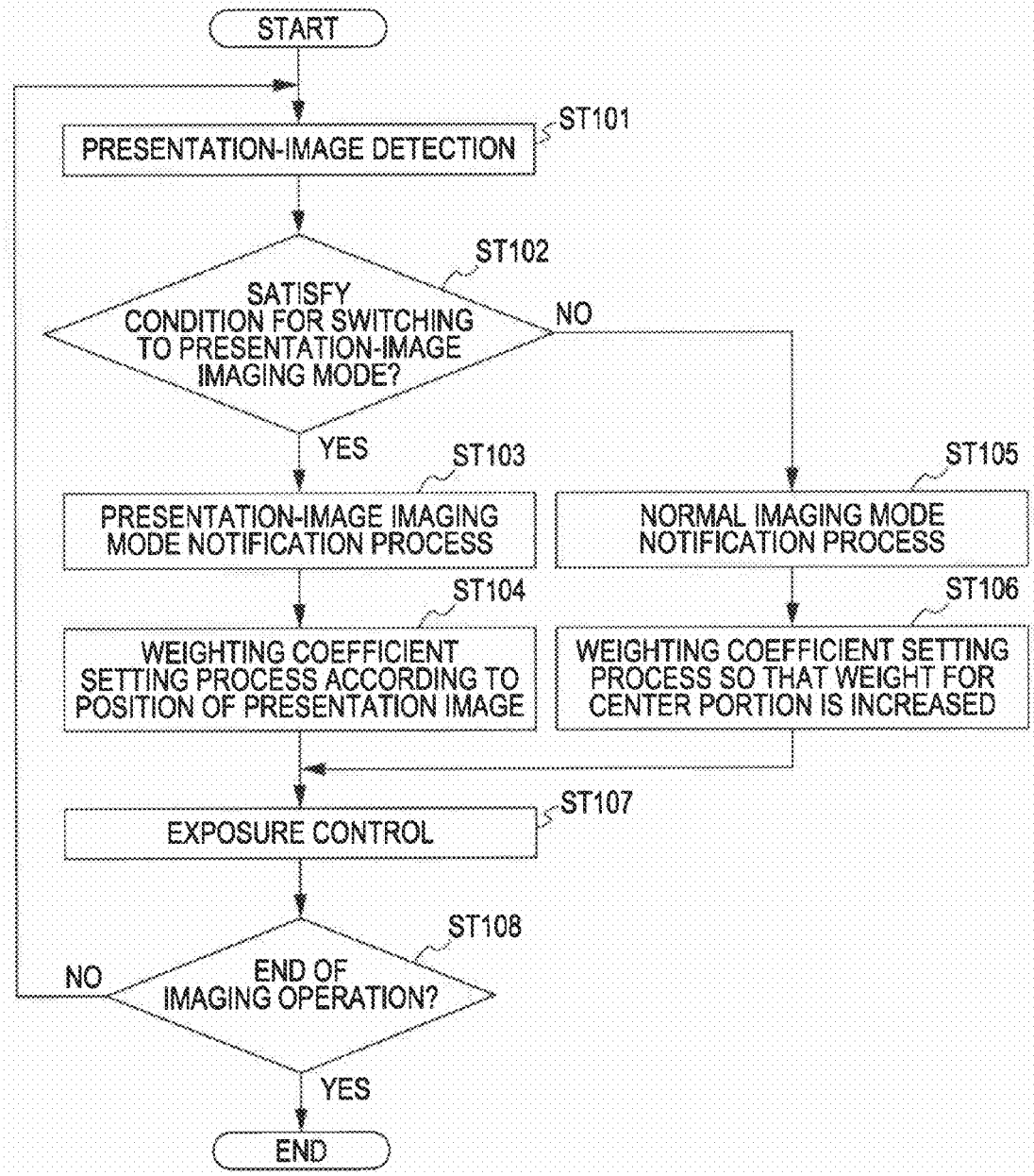

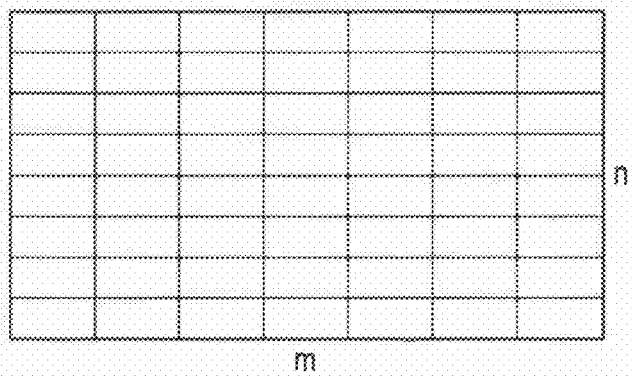
FIG. 21A
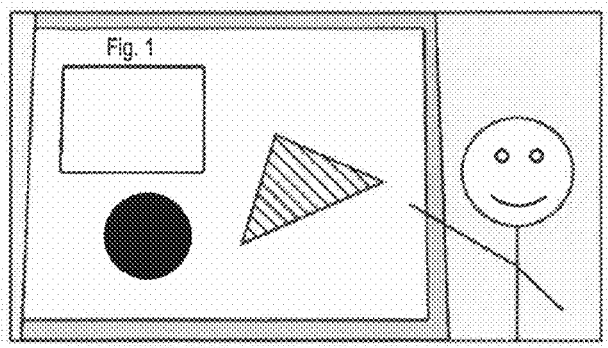
FIG. 21B
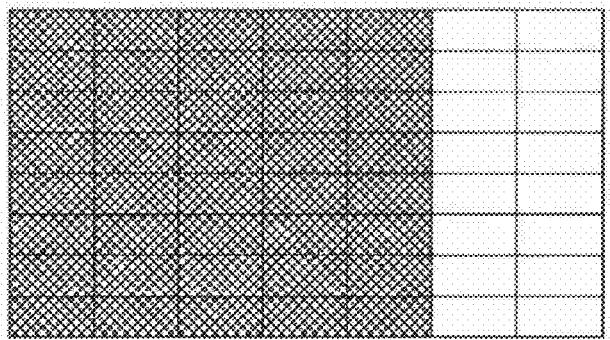
FIG. 21C
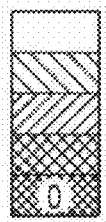
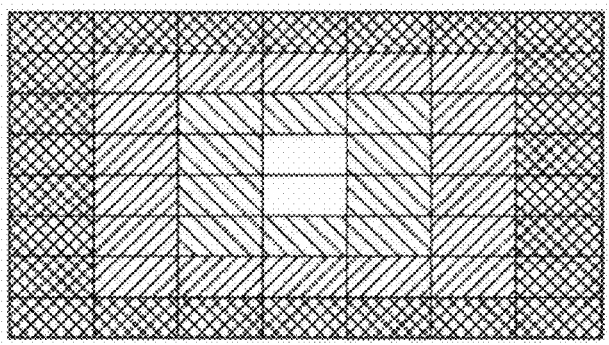
FIG. 21D

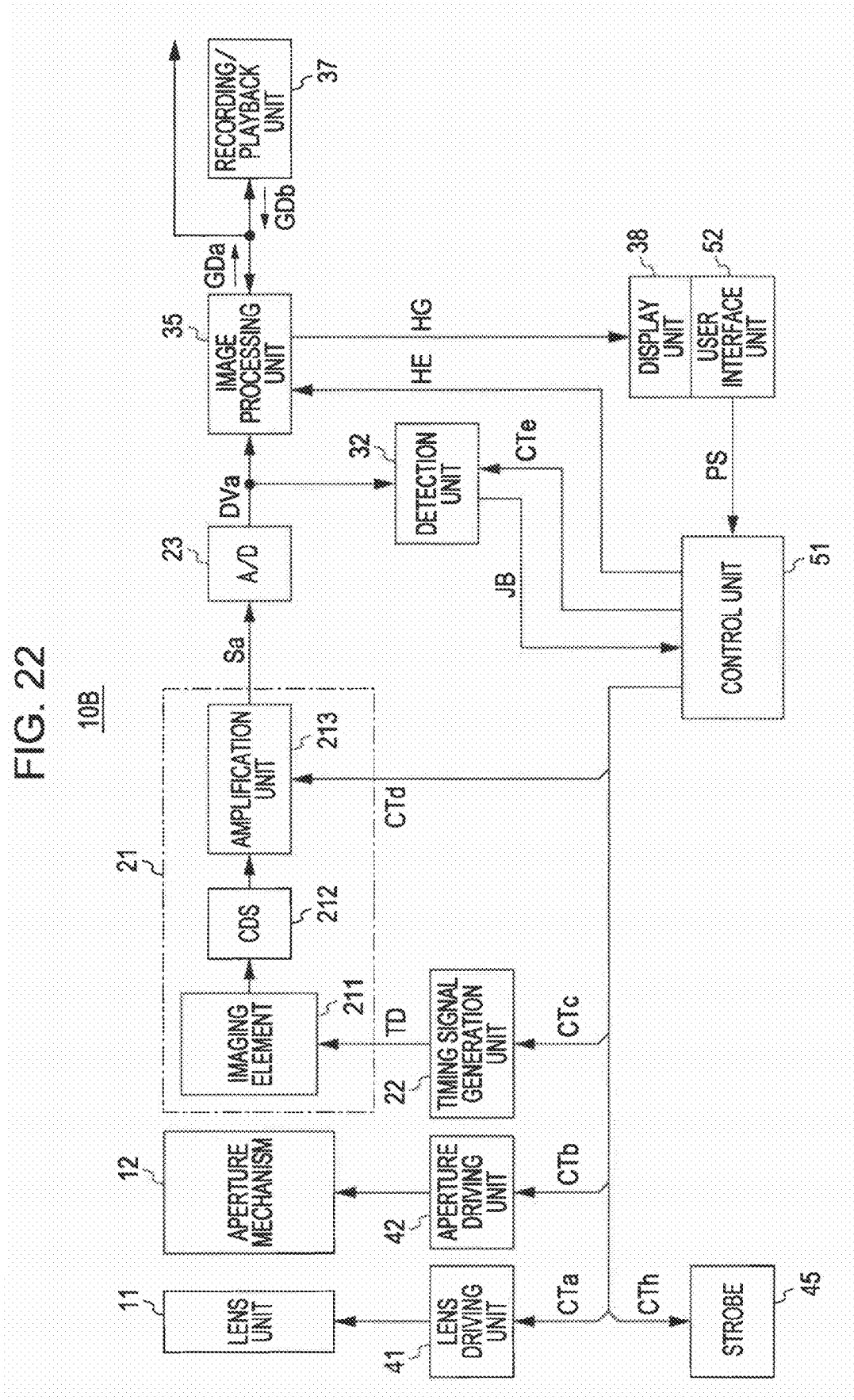

FIG. 29A
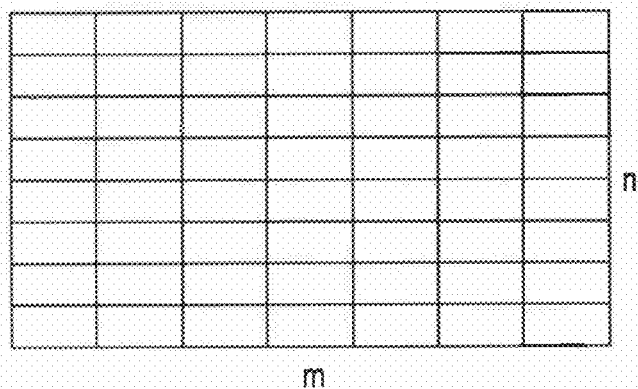
m
FIG. 29B
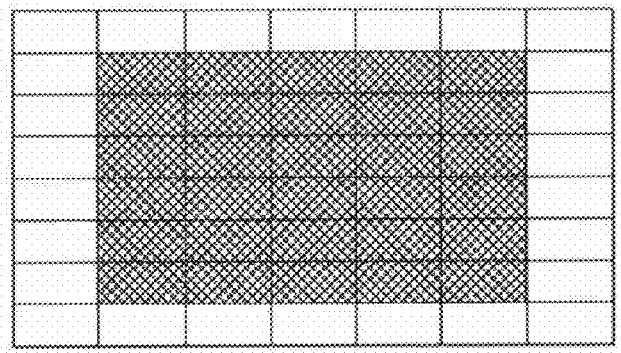
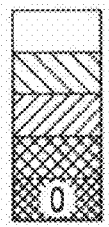
WEIGHT
(HIGH)
0
WEIGHT
(LOW)
FIG. 29C
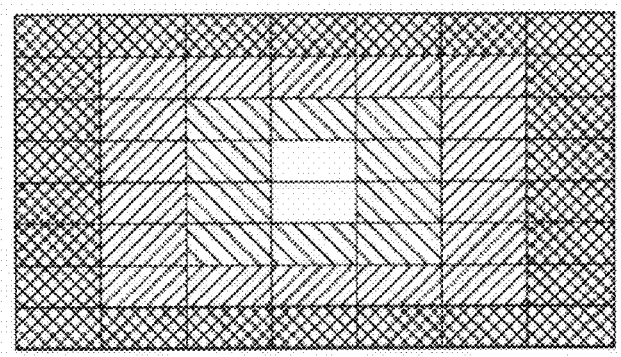

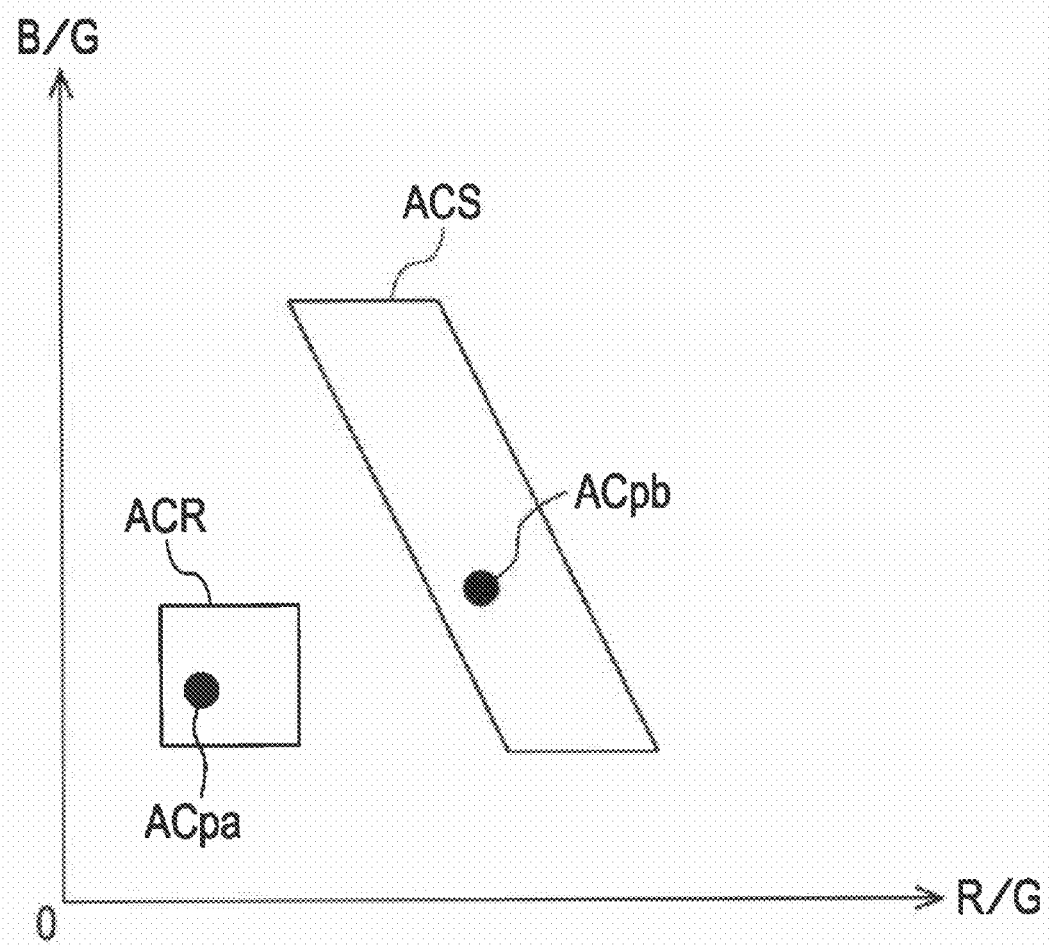

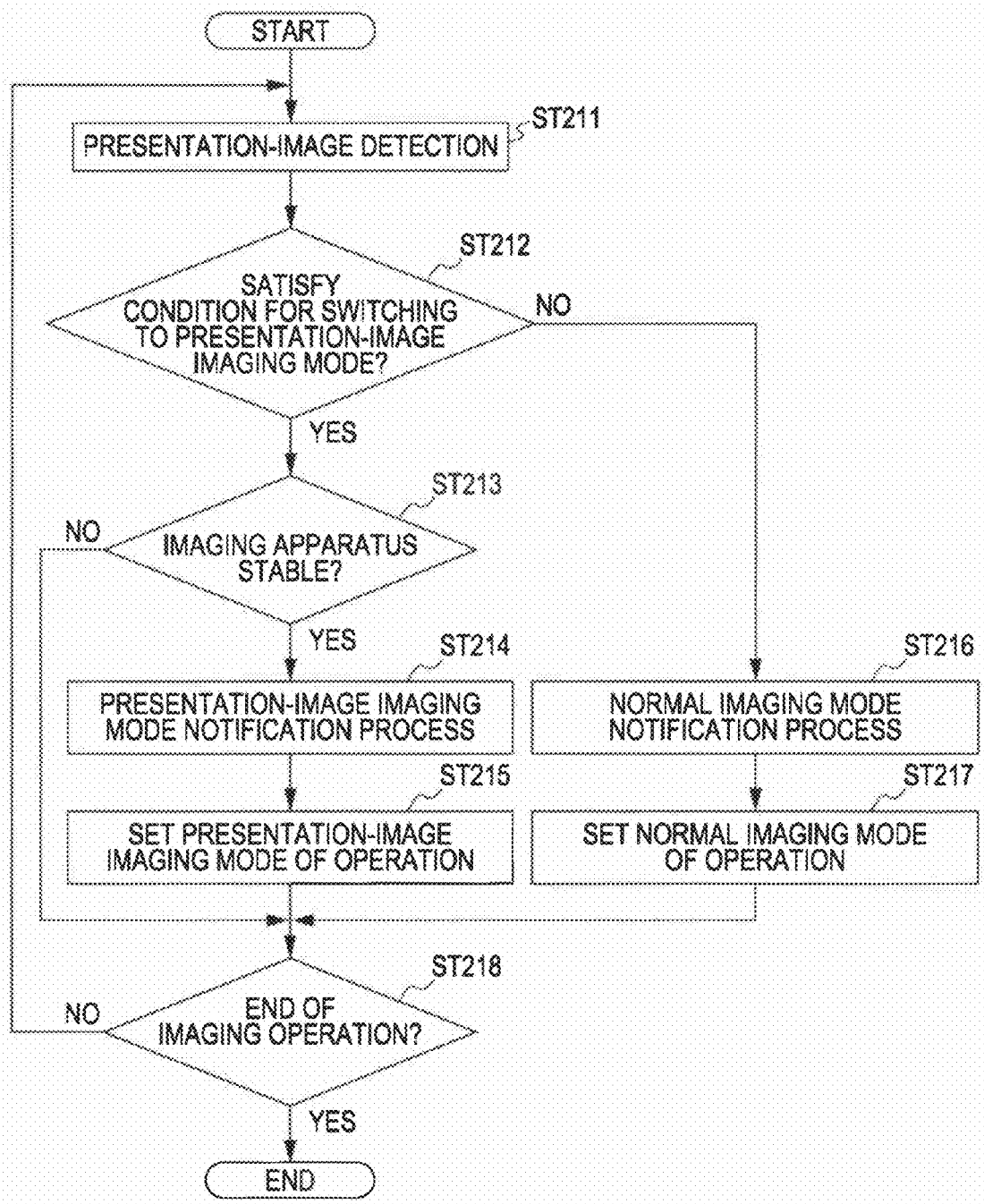

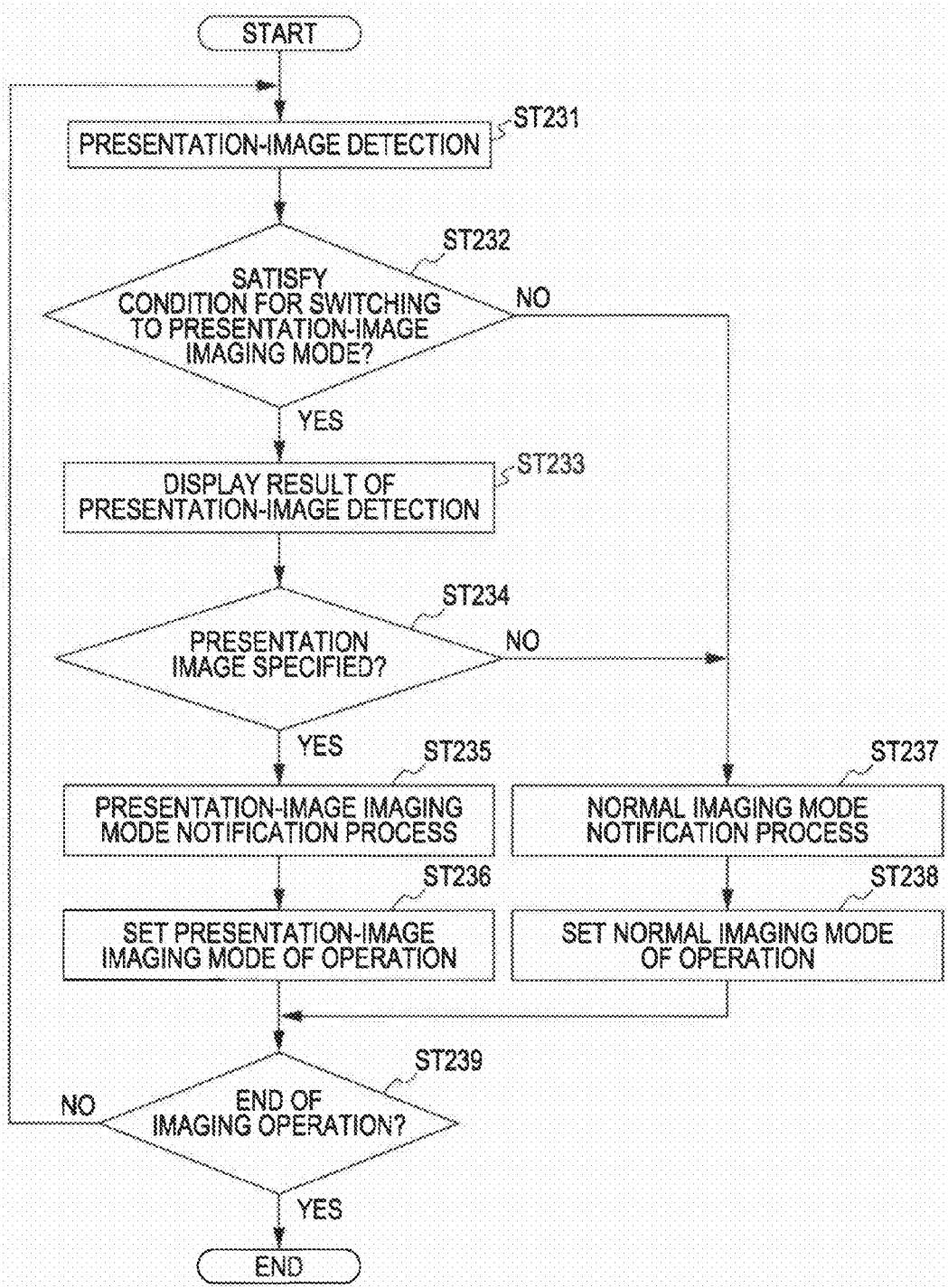

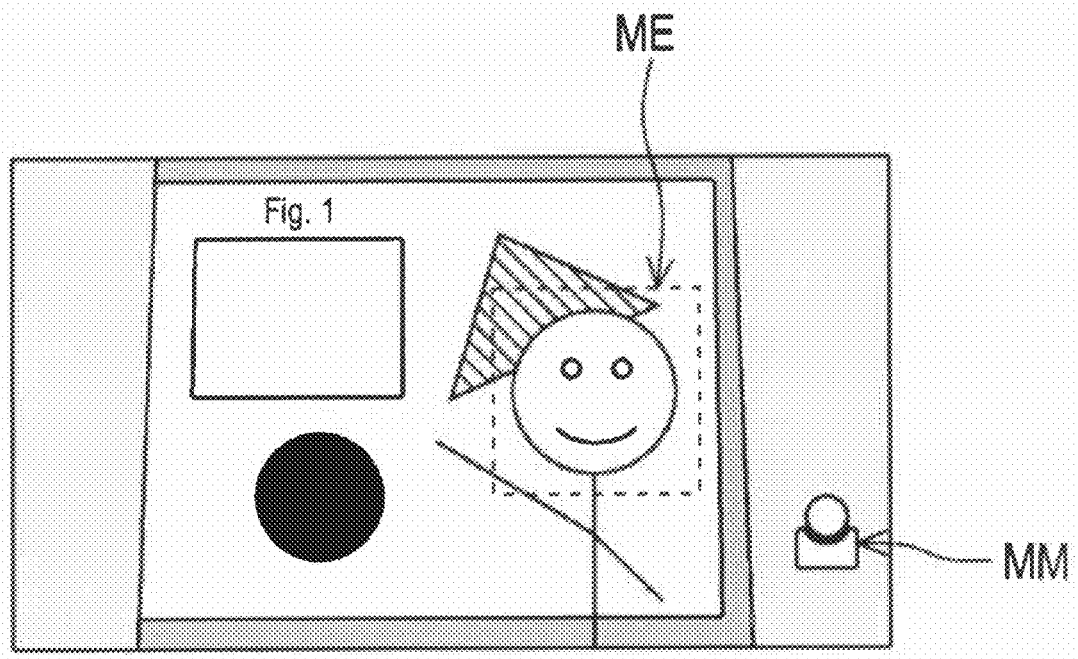

FIG. 39

| | SIMPLE PRESENTATION-IMAGE DETECTION | HIGH-ACCURACY PRESENTATION-IMAGE DETECTION |
|---|---|---|
| STARTING OF PRESENTATION-IMAGE IMAGING MODE | ○ | × |
| CHANGING OF DETECTION AREA | ○ | × |
| REGION-BASED WHITE BALANCE ADJUSTMENT | △ | ○ |
| REGION-BASED GAMMA CORRECTION | △ | ○ |

FIG. 40

| | WHEN PRESENTATION IMAGE IS LOCATED IN EDGE OF CAPTURED IMAGE | WHEN IMAGING APPARATUS IS GREATLY MOVED | WHEN ZOOM OPERATION IS PERFORMED | WHEN FACE DETECTED IN FACE DETECTION IS LOCATED AT CENTER | WHEN DETECTION OF PRESENTATION IMAGE HAS FAILED |
|---|---|---|---|---|---|
| CHANGING OF DETECTION AREA | TERMINATE | MAINTAIN | MAINTAIN | TERMINATE | TERMINATE |
| REGION-BASED WHITE BALANCE ADJUSTMENT | MAINTAIN | MAINTAIN | MAINTAIN | TERMINATE | TERMINATE |
| REGION-BASED GAMMA CORRECTION | MAINTAIN | MAINTAIN | MAINTAIN | TERMINATE | TERMINATE |

FIG. 41

| | | WHEN PRESENTATION IMAGE IS LOCATED IN EDGE OF CAPTURED IMAGE | WHEN IMAGING APPARATUS IS GREATLY MOVED | WHEN ZOOM OPERATION IS PERFORMED |
|---|---|---|---|---|
| WHEN PRESENTATION IMAGE IS LOCATED IN EDGE OF CAPTURED IMAGE | CHANGING OF DETECTION AREA | → NOT APPLIED | → NOT APPLIED | → NOT APPLIED |
| | REGION-BASED WHITE BALANCE ADJUSTMENT | → PREVIOUS SETTING | → NOT APPLIED | → NOT APPLIED |
| | REGION-BASED GAMMA CORRECTION | → PREVIOUS SETTING | → NOT APPLIED | → NOT APPLIED |
| WHEN IMAGING APPARATUS IS GREATLY MOVED | CHANGING OF DETECTION AREA | → NOT APPLIED | → NOT APPLIED | → PREVIOUS SETTING |
| | REGION-BASED WHITE BALANCE ADJUSTMENT | → NOT APPLIED | → NOT APPLIED | → PREVIOUS SETTING |
| | REGION-BASED GAMMA CORRECTION | → NOT APPLIED | → NOT APPLIED | → PREVIOUS SETTING |
| WHEN ZOOM OPERATION IS PERFORMED | CHANGING OF DETECTION AREA | → NOT APPLIED | → PREVIOUS SETTING | → PREVIOUS SETTING |
| | REGION-BASED WHITE BALANCE ADJUSTMENT | → NOT APPLIED | → PREVIOUS SETTING | → PREVIOUS SETTING |
| | REGION-BASED GAMMA CORRECTION | → NOT APPLIED | → PREVIOUS SETTING | → PREVIOUS SETTING |

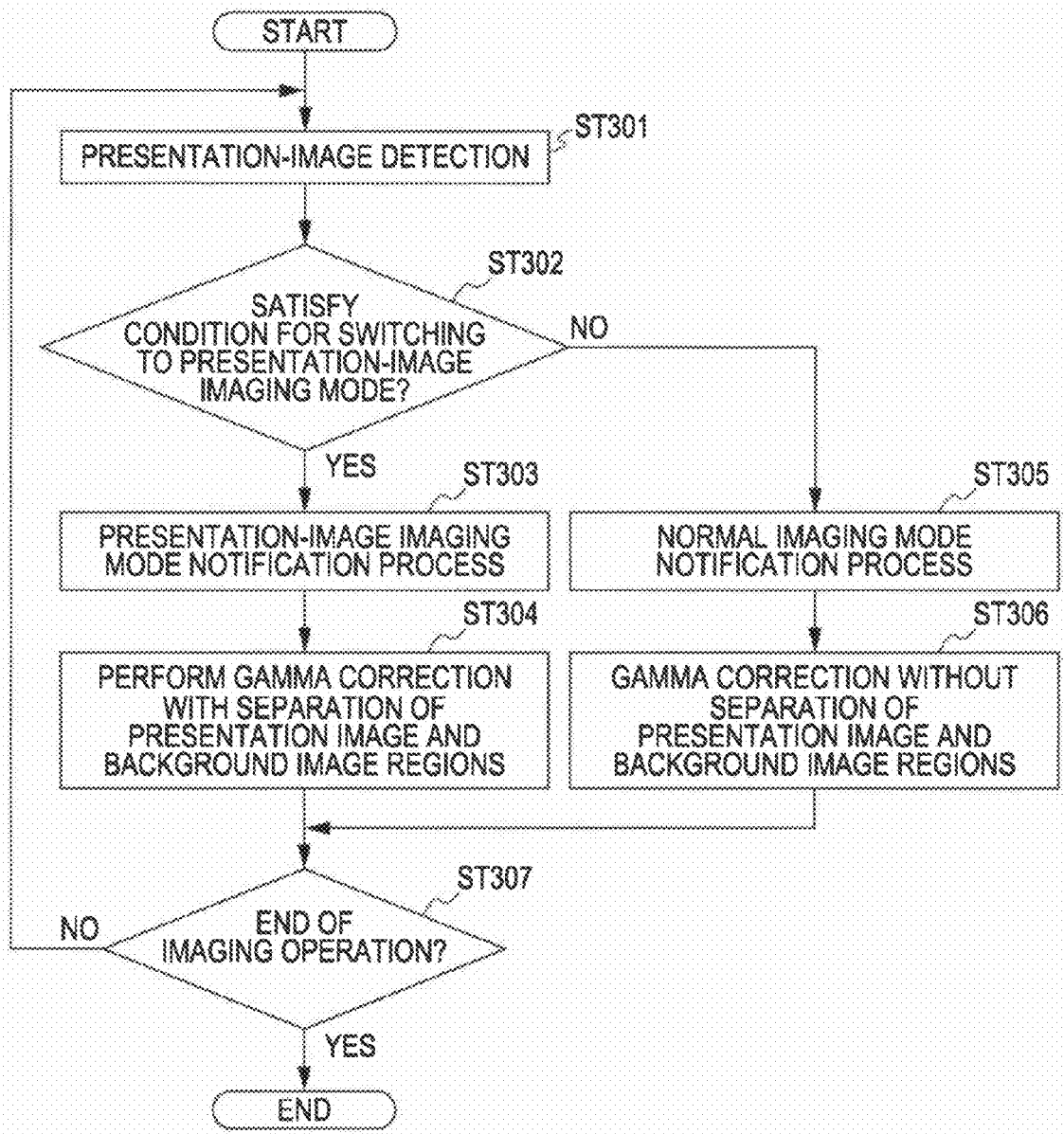

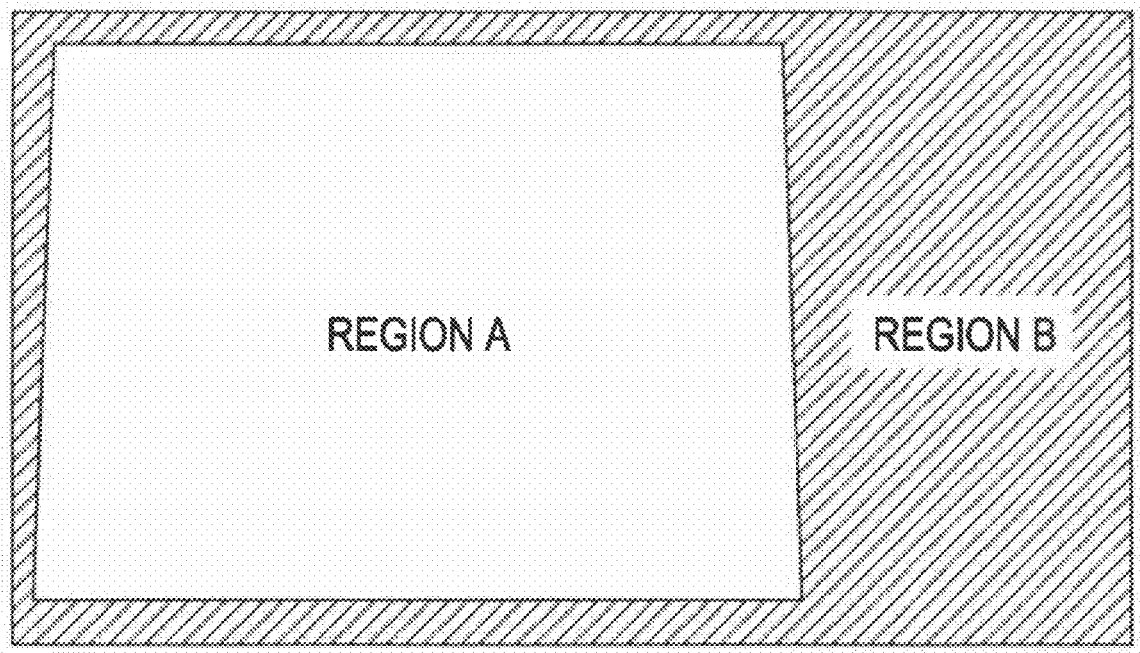

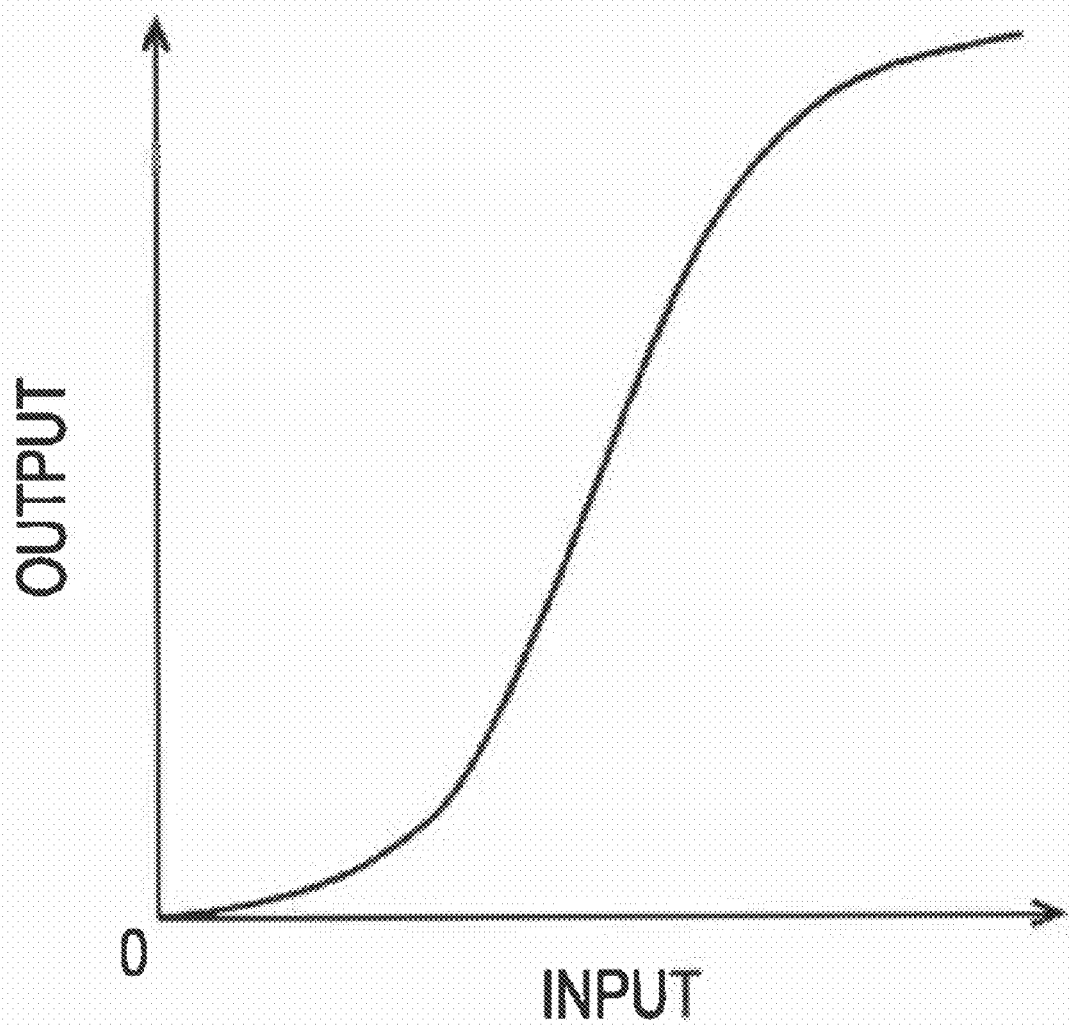

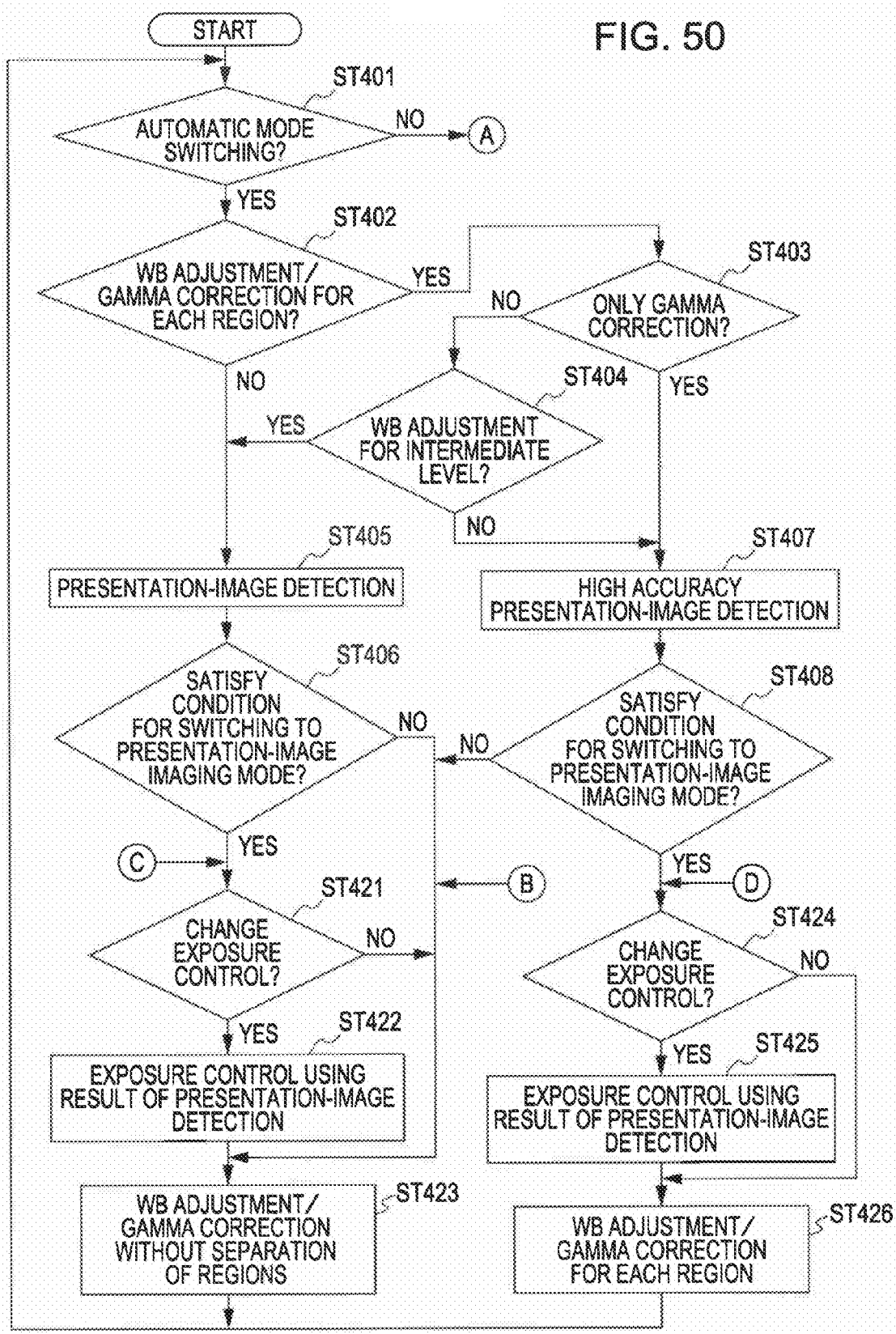

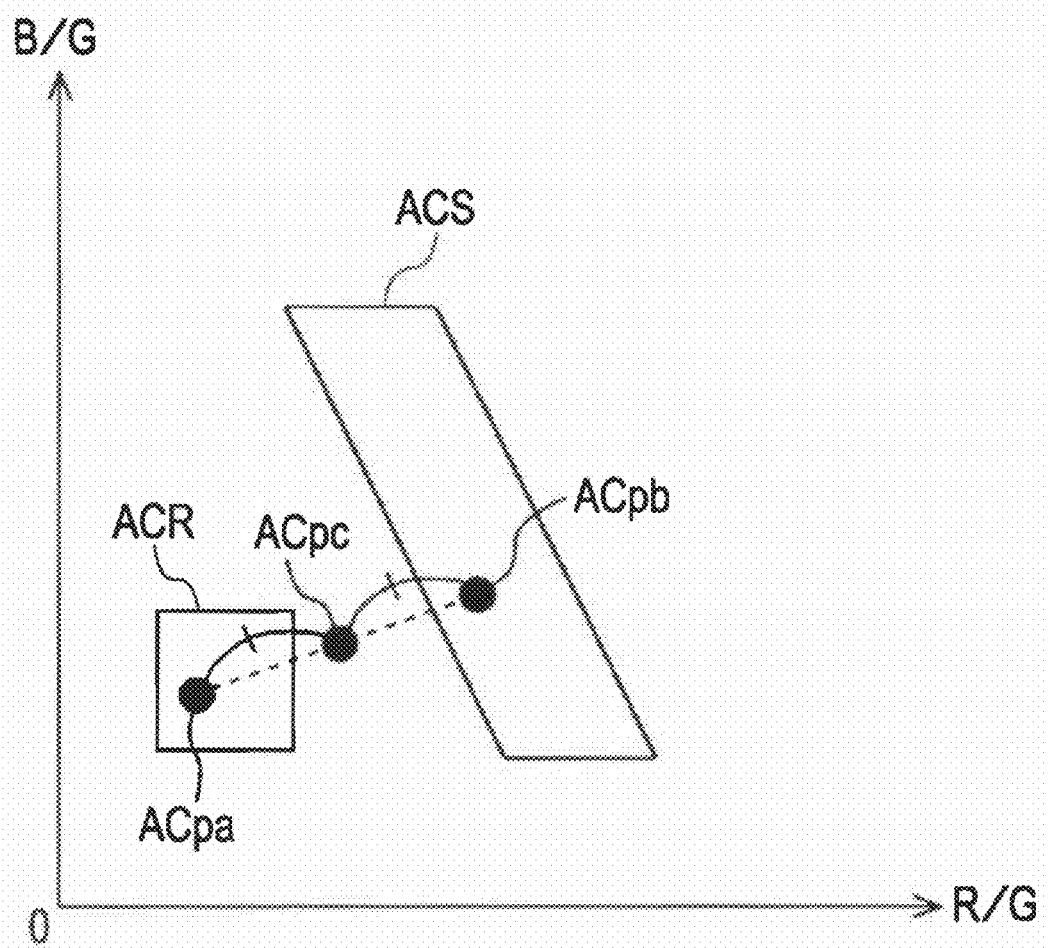

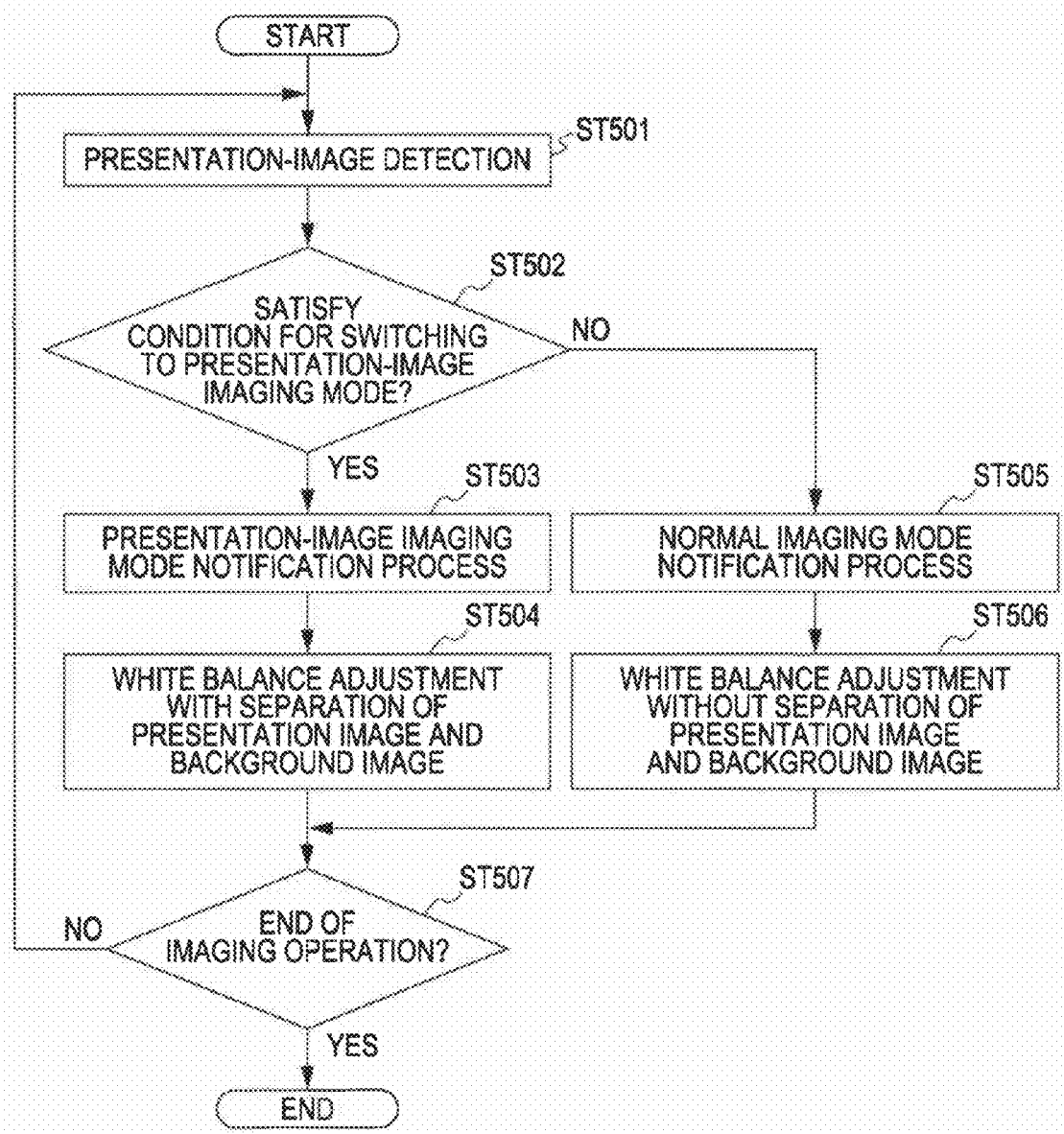

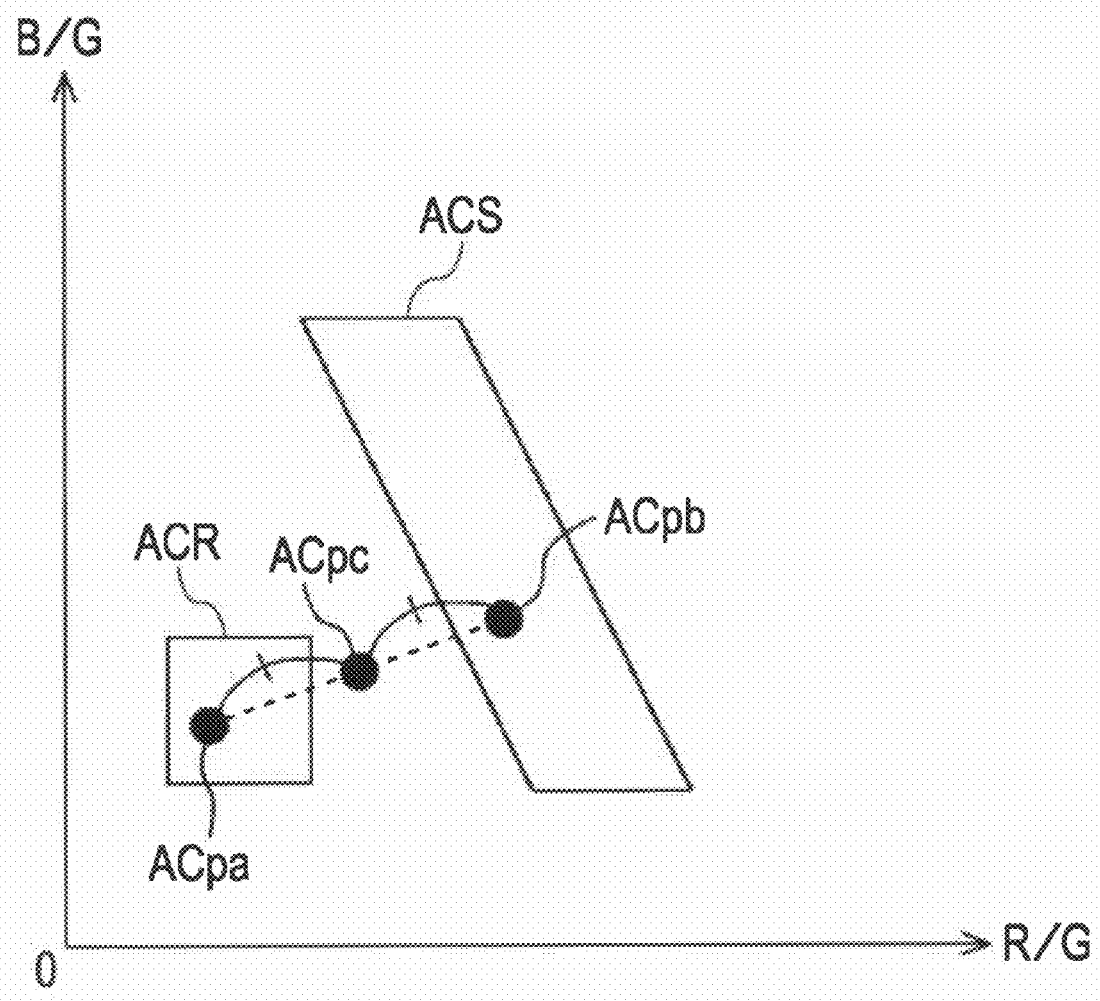

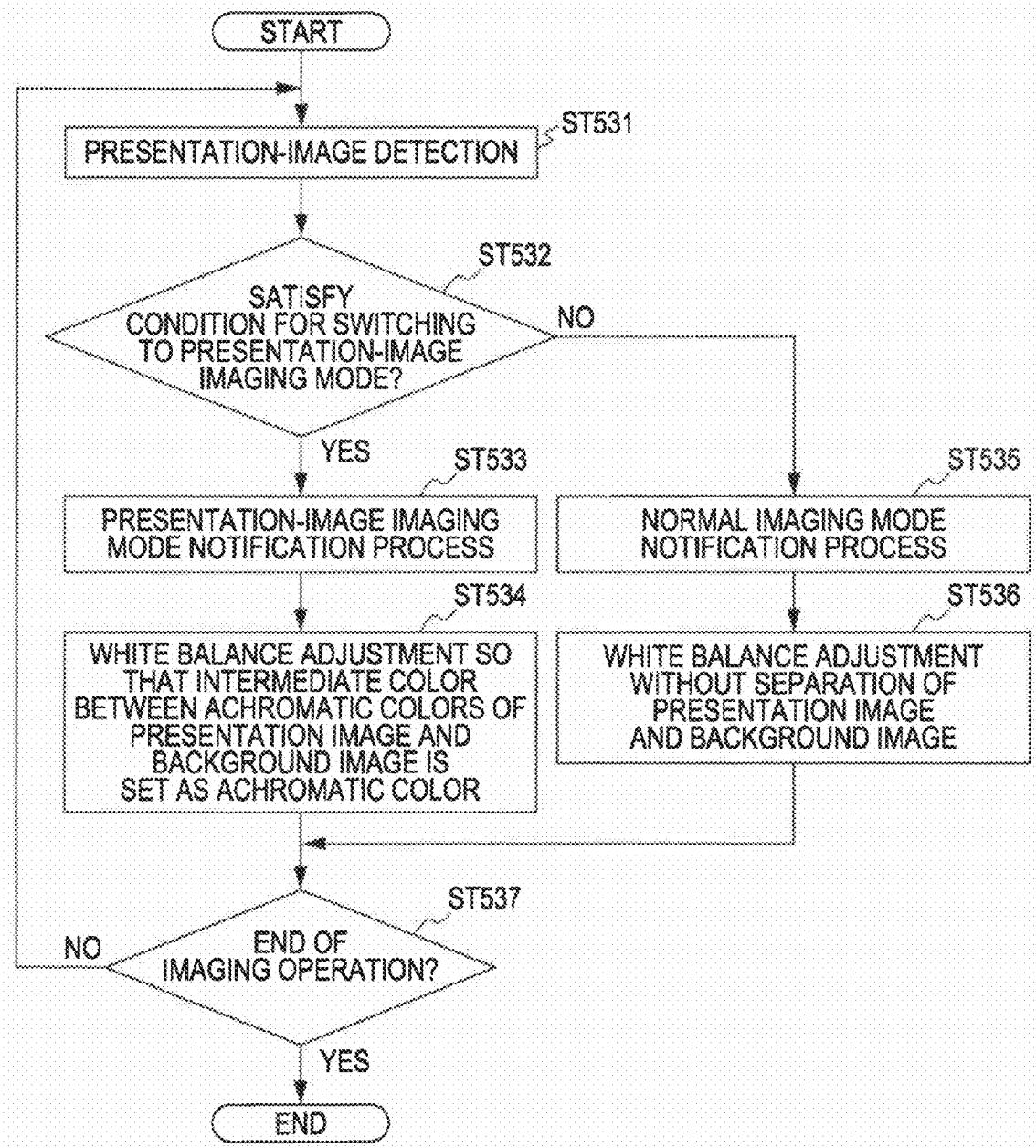

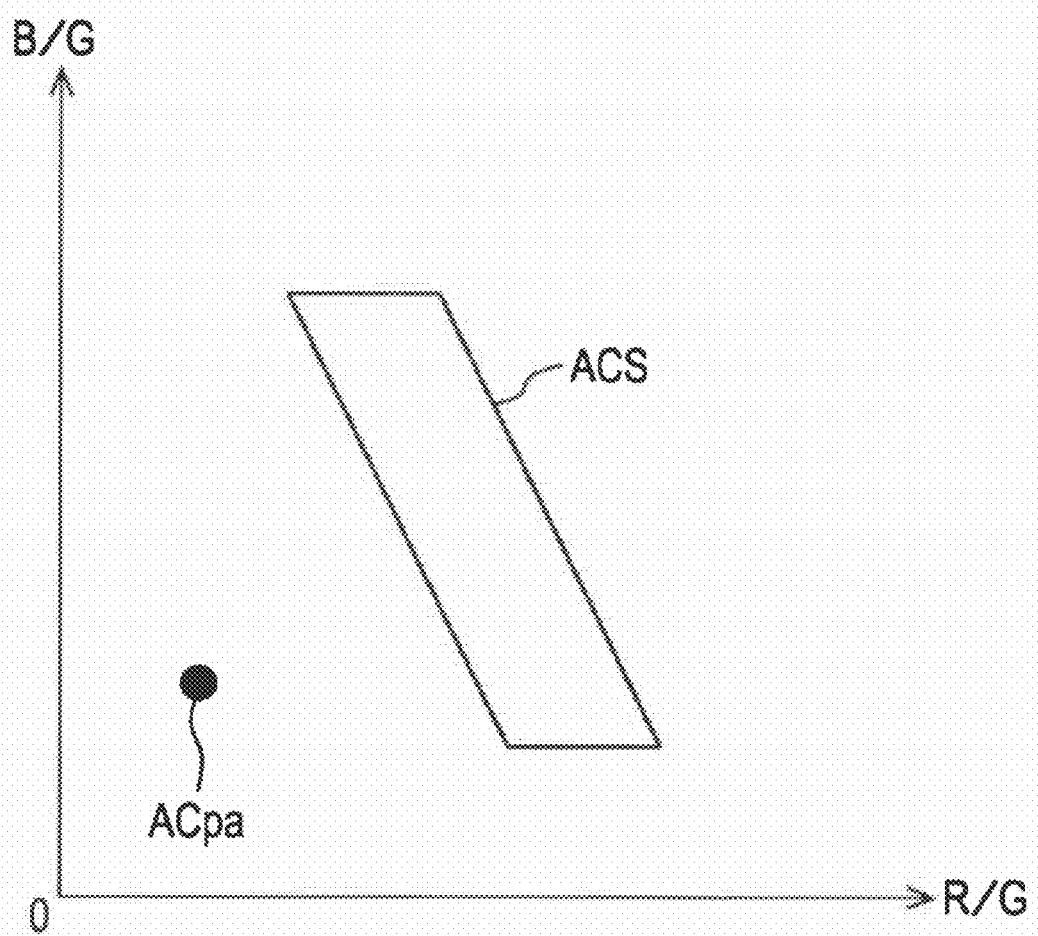

IMAGING APPARATUS, IMAGE PROCESSING APPARATUS, AND EXPOSURE CONTROL METHOD

BACKGROUND OF THE INVENTION

1. Field of the Invention

The present invention relates to an imaging apparatus, an image processing apparatus, and an exposure control method. More specifically, when a presentation image presented by a presentation device is detected from a captured image, a detection area is set at a position different from that of the detected presentation image. A detection value is calculated from an image signal in the detection area, and exposure control is performed in accordance with the calculated detection value, thereby obtaining a captured image in which the presentation image has appropriate brightness.

2. Description of the Related Art

Existing imaging apparatuses are designed such that, assuming that a desired object is at the center of the imaging range, large weight is placed on the center of an imaging range to detect brightness. The imaging apparatuses can therefore obtain a captured image with optimum brightness control of the desired object when the desired object is at the center of the imaging range.

However, brightness detection with large weight placed on the center of an imaging range may cause failure to obtain a captured image with optimum brightness control of the desired object if the desired object is off the center of the imaging range.

Such a phenomenon that prevents optimum brightness control of desired object is not does not allow may be caused when a presentation image presented by a presentation device, for example, an image displayed on a television device or an image projected on a screen by a projector, is photographed.

FIGS. 63A and 63B show images of, for example, a presentation scene, which are captured using an imaging apparatus. As shown in FIG. 63A, a captured image is generally composed so that a presentation image projected on a screen and a presenter are included in the imaging range. That is, the screen is not necessarily at the center of the imaging range. If the screen is not at the center of the imaging range, the imaging apparatus performs brightness control so that the object at the center of the imaging range, which may be different from the presentation image projected on the screen, has appropriate brightness. This may result in a captured image in which, as shown in FIG. 63B, the presentation image being projected whites out due to overexposure.

Furthermore, in the case where brightness detection is performed with large weight placed on the center of the imaging range, it may be difficult to obtain a captured image with optimum brightness control of the desired object even though the desired object is at the center of the imaging range. Such a phenomenon that prevents optimum brightness control of the desired object may also be caused in a case such as when the desired object has a low-luminance color as a base color such as black or dark blue. Materials used in presentations differ in design depending on the presenter and, for example, materials with a design using a base color of blue or black may be often projected. FIGS. 64A and 64B show images of, for example, a presentation image projected on a screen, which are captured using an imaging apparatus. As shown in FIG. 64A, when the presentation image is an image having a low-luminance color as a base color such as black, the imaging apparatus performs brightness control so that the dark image becomes bright. This may result in a captured image in which, as shown in FIG. 64B, a dark portion such as a black portion in the presentation image stands out so that bright portions such as white letters and figures in the presentation image become too bright to cause "white out".

On the other hand, when a presentation image is dark, strobe light emission may be performed so that an image of the presentation image can be captured with appropriate brightness. However, the strobe light may be reflected and enter the imaging apparatus, which may cause difficulty in obtaining a captured image in which the presentation image has appropriate brightness.

FIGS. 65A and 65B show images of, for example, a presentation image displayed on a screen of a television device, which are captured using an imaging apparatus. As shown in FIG. 65A, when the presentation image is an image in a dark color such as black, strobe light emission is performed so that the presentation image has appropriate brightness. The strobe light may be reflected on the display screen of the television device, resulting in an captured image on which, as shown in FIG. 65B, the reflected strobe light is cast to cause difficulty in reading the characters and figures over the presentation image.

Further, dynamic changes in the design of presentation images in moving images or slide shows would cause an imaging apparatus to perform brightness control in accordance with the changes of scenes. Thus, difficult-to-read captured images such as images with variations in brightness will be obtained.

Japanese Unexamined Patent Application Publication No. 2007-195029 discloses an imaging apparatus in which a presentation imaging mode is provided to ensure that presentation materials can be photographed. In the presentation imaging mode, strobe light emission is restricted.

SUMMARY OF THE INVENTION

Even though strobe light emission is restricted in the presentation imaging mode, if a desired object has a low-luminance color as a base color such as black or dark blue, as described above, a dark portion in a presentation image stands out. Thus, bright portions such as white letters and figures in the presentation image may become too bright, resulting in "white out" in the image.

A user can fix the brightness control setting in an imaging apparatus at the time when a presentation image has desired brightness, thereby obtaining a captured image in which the presentation image has appropriate brightness. However, under lighting conditions frequently changing during image capture, it is necessary for the user to reset the brightness control values each time the lighting conditions change. Further, since the lighting conditions under which image capture is to be performed are not accurately predictable, it is difficult for the user to fix the brightness control setting at an optimum state.

It is therefore desirable to provide an imaging apparatus, an image processing apparatus, and an exposure control method in which when a presentation image being presented by a presentation device is captured, a captured image in which the presentation image has optimum brightness can easily be obtained.

In an embodiment of the present invention, the detection of a presentation image presented by a presentation device, for example, an image projected on a screen by a projector or an image displayed on a screen of a television device, is performed, and when a presentation image is detected, detection areas are switched and exposure control is performed so that a captured image in which the presentation image has optimum brightness can be obtained.

According to a first embodiment of the present invention, an imaging apparatus includes an imaging unit configured to capture an image of an object to obtain an image signal, a detection unit configured to set a detection area in a captured image based on the image signal obtained by the imaging unit and calculate a detection value from an image signal in the detection area, an exposure adjustment unit configured to perform exposure adjustment, a control unit configured to control the exposure adjustment unit so that the detection value becomes equal to a predetermined value, and a presentation-image detecting unit configured to detect a presentation image presented by an image presentation device from the captured image on the basis of a difference in luminance in the captured image, wherein when the presentation-image detecting unit detects the presentation image, the detection unit sets the detection area in a location different from a location of the detected presentation image.

According to a second embodiment of the present invention, an exposure control method includes the steps of capturing an image of an object using an imaging unit to obtain an image signal; calculating a detection value from an image signal in a detection area, the detection area being set in a captured image based on the obtained image signal; detecting a presentation image presented by an image presentation device from the captured image on the basis of a difference in luminance in the captured image; and performing exposure adjustment so that the detection value becomes equal to a predetermined value, wherein when the presentation image is detected, the detection area is set in a location different from a location of the detected presentation image.

In the first and second embodiments, when a presentation image is detected from a captured image, a detection area may be provided so as to be located in a location different from that of the detected presentation image. Further, a presentation image may be detected by determining whether or not the captured image includes a presentation image. If it is determined that the captured image includes a presentation image, a detection area may be provided so as to be located along at least one side of the captured image. Further, when an image signal indicative of an aspect ratio indicating that the captured image is horizontally larger than the presentation image is generated, a detection area may be provided so as to be located in a region other than the presentation image in the captured image, which is produced due to the difference in aspect ratio. Further, when an operation of selecting an imaging mode for capturing a presentation image is performed, a detection area may be provided so as to be located along at least one side of the captured image. A detection value may be calculated from an image signal in the detection area provided in the manner described above, and exposure adjustment may be performed so that the calculated detection value becomes equal to a predetermined value. For example, at least one of the amount of light entering the imaging unit, the gain of an image signal output from the imaging unit, and the exposure time over which the imaging unit obtains the image signal may be adjusted so that the calculated detection value becomes equal to a predetermined value.

Therefore, when a presentation image is detected from a captured image, a detection area is provided in a location different from that of the detected presentation image, and exposure adjustment is performed based on a detection value calculated from an image signal in the detection area. This can reduce the effect of the presentation image on exposure control, resulting in a captured image in which the presentation image has optimum brightness.

According to a third embodiment of the present invention, an imaging apparatus includes an imaging unit configured to capture an image of an object to obtain an image signal, a detection unit configured to set a detection area in a captured image based on the image signal obtained by the imaging unit and calculate a detection value from an image signal in the detection area, an exposure adjustment unit configured to perform exposure adjustment, and a control unit configured to control the exposure adjustment unit so that the detection value becomes equal to a predetermined value, wherein in a presentation-image imaging mode for capturing a presentation image presented by an image presentation device, the detection unit provides the detection area so as to be located along at least one side of the captured image except for a center portion thereof.

According to a fourth embodiment of the present invention, an exposure control method includes the steps of capturing an image of an object using an imaging unit to obtain an image signal; calculating a detection value from an image signal in a detection area, the detection area being set in a captured image based on the obtained image signal; performing exposure adjustment so that the detection value becomes equal to a predetermined value; and selecting a presentation-image imaging mode for capturing a presentation image presented by an image presentation device, wherein when the presentation-image imaging mode is selected, the detection area is provided so as to be located along at least one side of the captured image except for a center portion thereof.

In the third and fourth embodiments, a presentation-image imaging mode for capturing a presentation image presented by an image presentation device may be provided. For example, when an operation signal from a user interface unit configured to generate an operation signal according to a user operation indicates an operation of selecting the presentation-image imaging mode, the detection unit may provide a detection area so as to be located along at least one side of the captured image. Therefore, even if a detecting unit fails to detect a presentation image, brightness control can be performed without being affected by the presentation image.

Therefore, in a presentation-image imaging mode for capturing a presentation image presented by an image presentation device, the detection unit provides a detection area so as to be located along at least one side of the captured image, except for the center portion thereof. Thus, the effect of the presentation image on exposure control can be reduced, and a captured image in which the presentation image has optimum brightness can be obtained. Further, even when a detecting unit fails to detect a presentation image, brightness control can be performed without being affected by the presentation image.

BRIEF DESCRIPTION OF THE DRAWINGS

FIG. 3 is a diagram showing a structure of a detection unit;

FIG. 4 is a diagram showing a structure of a white balance adjustment unit;

FIG. 7 is a flowchart showing a process of setting a threshold value used in a binarization process;

FIGS. 9A and 92 are diagrams showing a process of detecting upper and lower sides of a presentation image;

FIGS. 10A and 102 are diagrams showing a process of detecting upper and lower sides of a presentation image;

FIGS. 14A and 142 are diagrams showing images in which a portion of a presentation image is hidden;

FIG. 15 is a flowchart showing an operation for detecting a presentation image using inter-frame information;

FIGS. 16A and 162 are diagrams showing switching of detecting ranges;

FIG. 17 is a flowchart showing an operation for detecting a presentation image using zoom information;

FIG. 19 is a flowchart showing an exposure control operation performed by the imaging apparatus;

FIGS. 21A to 21D are diagrams describing the operation of the detection unit;

FIG. 22 is a diagram showing a structure of an imaging apparatus according to a second embodiment of the present invention;

FIGS. 23A and 233 are diagrams showing display of an imaging mode selection menu;

FIGS. 26A to 26C are diagrams showing an operation when the lighting setting is turned on;

FIGS. 27A and 273 are diagrams showing another operation for weighting;

FIGS. 29A to 29C are diagrams showing an operation of a detection unit;

FIG. 30 is a diagram showing the position of achromatic color and an achromatic region;

FIG. 32 is a flowchart showing another operation of the imaging apparatus;

FIG. 35 is a flowchart showing another operation of the imaging apparatus;

FIG. 38 is a diagram showing the display of an icon sign indicating that a portrait imaging mode has been set;

FIG. 39 is a table showing the relationship between the processes of starting the presentation-image imaging mode, changing a detection area, performing white balance adjustment for each region, and performing gamma correction for each region, and methods for detecting a presentation image;

FIG. 40 is a table showing the relationship between the processes of changing a detection area, performing white balance adjustment for each region, and performing gamma correction for each region, and actions for imaging;

FIG. 41 is a table showing exemplary applicability of the processes of changing a detection area, performing white balance adjustment for each region, and performing gamma correction for each region in accordance with a combination of actions for imaging;

FIG. 42 is a flowchart showing a gamma correction operation;

FIG. 43 is a diagram showing a presentation image region and a background image region in a captured image;

FIG. 48 is a diagram showing a gamma curve for enhancing the contrast of a presentation image;

FIG. 50 is a flowchart showing an operation of the imaging apparatus which is performed using a result of presentation-image detection;

FIG. 52 is a diagram showing the position of achromatic color obtained by performing white balance detection;

FIG. 54 is a flowchart showing a white balance adjustment operation;

FIG. 60 is a diagram showing an intermediate position;

FIG. 61 is a flowchart showing a process for performing white balance adjustment using a white balance correction coefficient in which the intermediate color between achromatic color in a presentation image and achromatic color in a background image is set as achromatic color;

FIG. 62 is a diagram showing an achromatic region in an (R/G)-(B/G) plane;

DESCRIPTION OF THE PREFERRED EMBODIMENTS

Embodiments of the present invention will be described hereinafter with reference to the drawings.

First Embodiment

Figure 1:
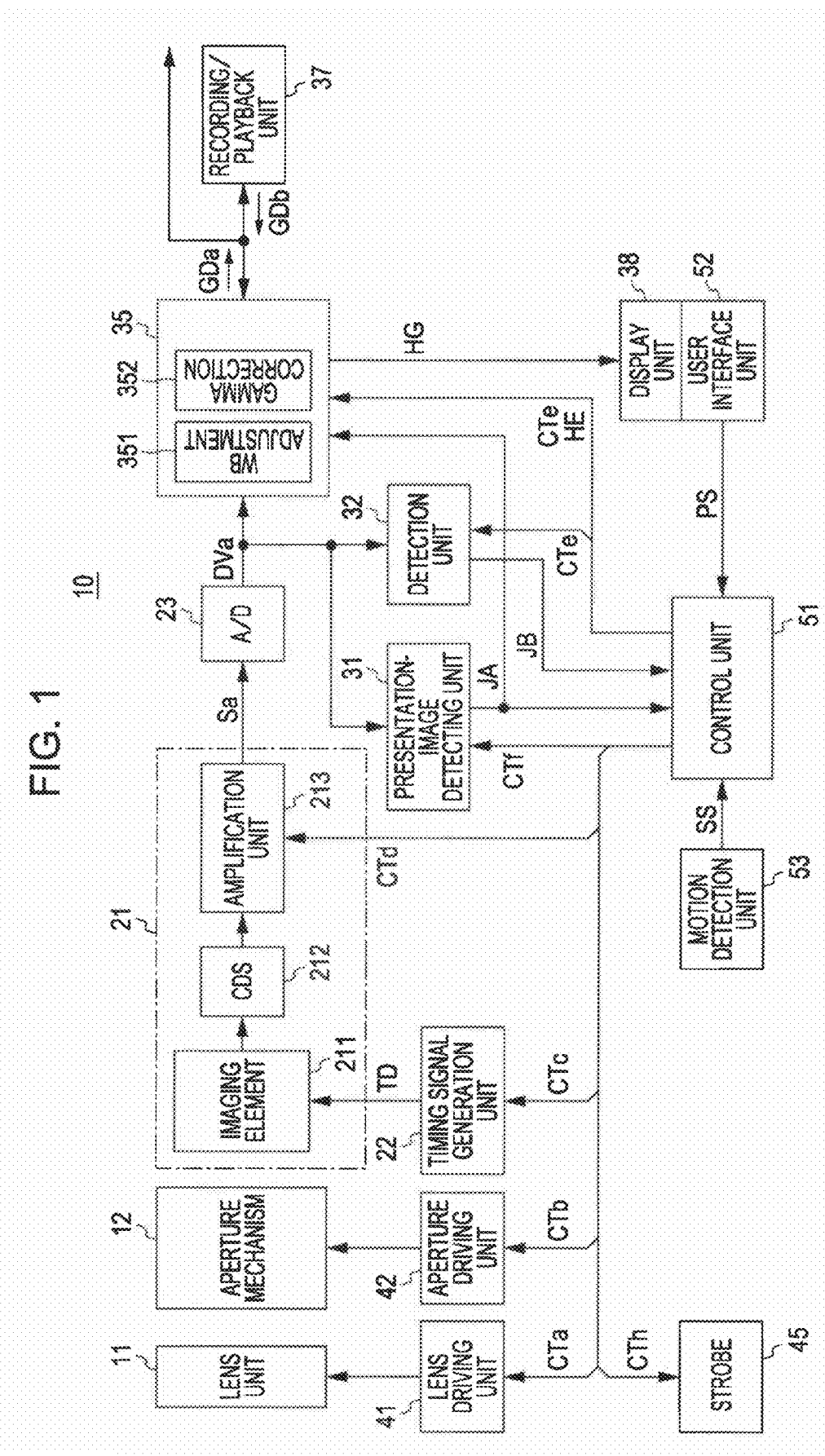
FIG. 1 is a diagram showing a structure of an image processing apparatus, which is implemented by an imaging apparatus.

An embodiment of the present invention will now be described with reference to the drawings. FIG. 1 shows a structure of an image processing apparatus according to an embodiment of the present invention, which is implemented by, for example, an imaging apparatus 10. Object light enters an imaging element 211 of an imaging unit 21, such as a charge coupled device (CCD) image sensor or a complementary metal oxide semiconductor (CMOS) image sensor, through a lens unit 11 and an aperture mechanism 12.

The imaging element 211 converts imaging light of an object image formed on a light receiving surface into an electrical signal for each pixel to generate a three-primary-color image signal. The generated image signal is supplied to a correlated double sampling circuit (CDS) unit 212.

The CDS unit 212 removes noise from the image signal supplied from the imaging element 211, and supplies the noise-removed image signal to an amplification unit 213. The amplification unit 213 adjusts the gain of the image signal supplied from the CDS unit 212, and supplies a gain-adjusted image signal Sa to an analog/digital (A/D) conversion unit 23.

A timing signal generation unit 22 generates a driving signal TD in response to which the imaging element 211 generates an image signal, and supplies the driving signal TD to the imaging element 211. The timing signal generation unit 22 also controls the exposure time of the imaging element 211 (the effective charge accumulation time which is determined by photoelectric conversion) using the driving signal TD.

The A/D conversion unit 23 converts the analog image signal Sa into a digital image signal DVa, and supplies the digital image signal DVa to a presentation-image detecting unit 31, a detection unit 32, and an image processing unit 35.

The presentation-image detecting unit 31 performs a process of detecting a presentation image from a captured image based on the image signal DVa to generate a detection signal JA indicating a detection result, and supplies the detection signal JA to a control unit 51.

Figure 2:
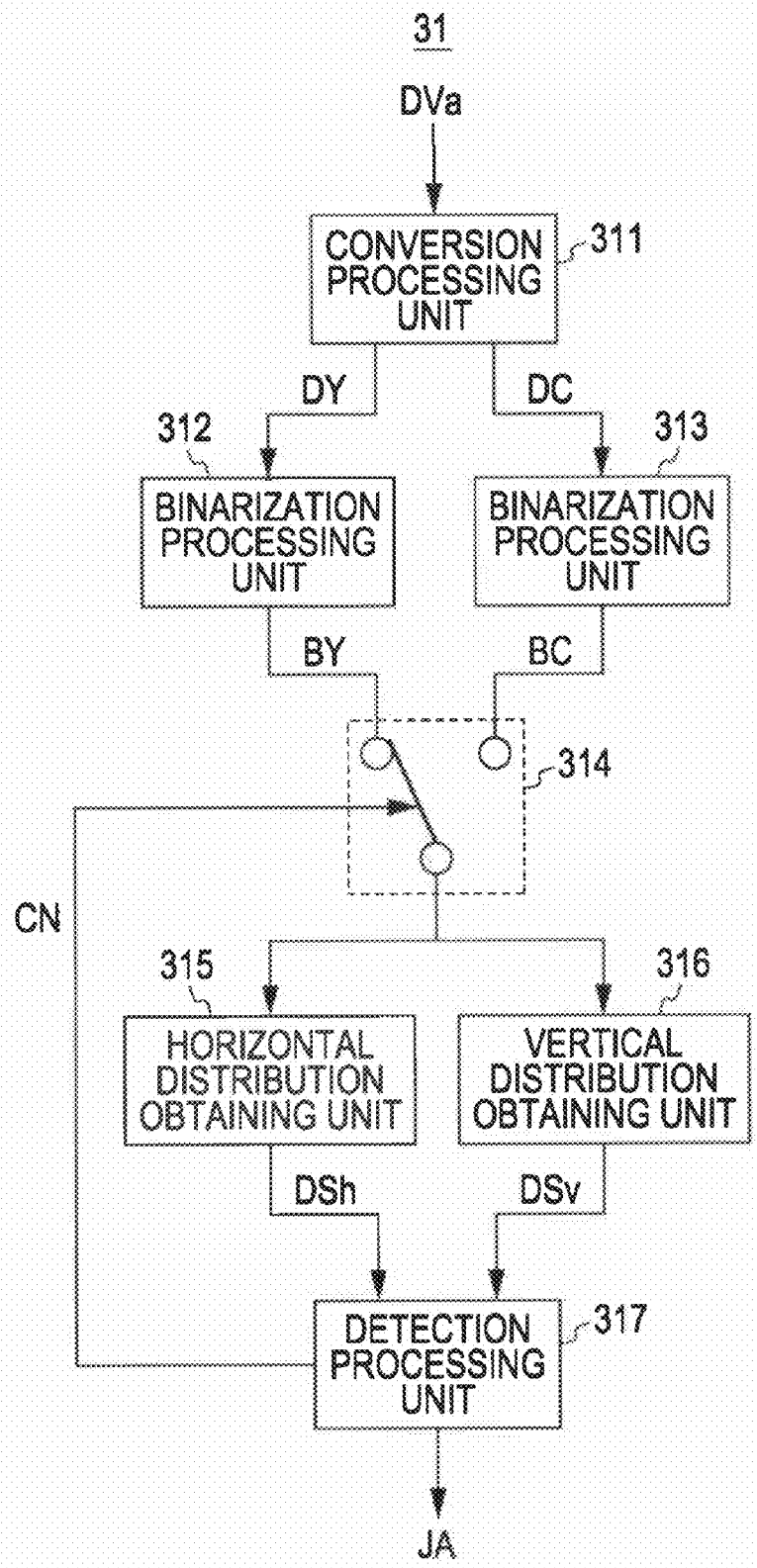
FIG. 2 is a diagram showing a structure of a presentation-image detecting unit.

FIG. 2 shows a structure of the presentation-image detecting unit 31. A conversion processing unit 311 of the presentation-image detecting unit 31 converts the three-primary-color image signal DVa into a luminance signal DY and a color-difference signal DC, and supplies the luminance signal DY and the color-difference signal DC to binarization processing units 312 and 313, respectively.

The binarization processing unit 312 performs a process of binarizing the luminance signal DY, and supplies a resulting binary luminance signal BY to a signal selection unit 314. The binarization processing unit 313 performs a process of binarizing the color-difference signal DC, and supplies a resulting binary color-difference signal BC to the signal selection unit 314. The binarization processing unit 312 compares the luminance signal DY with a threshold value to binarize the luminance signal DY, and generates the binary luminance signal BY. The binarization processing unit 313 compares the color-difference signal DC with a threshold value to binarize the color-difference signal DC, and generates the binary color-difference signal BC. Each of the binarization processing units 312 and 313 may be configured to set the threshold value to a predetermined fixed level or set a threshold value depending on a captured image so that a presentation image can accurately be detected from the captured image.

The signal selection unit 314 selects one of the binary luminance signal BY and the binary color-difference signal BC, and supplies the selected binary signal to a horizontal distribution obtaining unit 315 and a vertical distribution obtaining unit 316.

When the binary luminance signal BY is selected, the horizontal distribution obtaining unit 315 counts for each line the number of pixels each of which is assigned a binary luminance signal BY having a signal level higher than a threshold value to determine the distribution of pixels having higher luminance signal levels along the horizontal direction, and supplies a horizontal distribution signal DSh indicating this distribution to a detection processing unit 317. When the binary color-difference signal BC is selected, the horizontal distribution obtaining unit 315 counts for each line the number of pixels each of which is assigned a binary color-difference signal BC having a signal level higher than a threshold value to determine the distribution of pixels having higher color-difference signal levels along the horizontal direction, and supplies a horizontal distribution signal DSh indicating this distribution to the detection processing unit 317.

When the binary luminance signal BY is selected, the vertical distribution obtaining unit 316 counts in the vertical direction the number of pixels each of which is assigned a binary luminance signal BY having a signal level higher than a threshold value to determine the distribution of pixels having higher luminance signal levels along the vertical direction perpendicular to the horizontal direction, and supplies a vertical distribution signal DSv indicating this distribution to the detection processing unit 317. When the binary color-difference signal BC is selected, the vertical distribution obtaining unit 316 counts the number of pixels each of which is assigned a binary color-difference signal BC having a signal level higher than a threshold value. Then, the vertical distribution obtaining unit 316 determines the distribution of pixels having higher color-difference signal levels along the vertical direction, and supplies a vertical distribution signal DSv indicating this distribution to the detection processing unit 317.

The detection processing unit 317 performs a process of detecting upper and lower sides on the basis of the horizontal distribution signal DSh supplied from the horizontal distribution obtaining unit 315, and a process of detecting left and right sides on the basis of the vertical distribution signal DSv supplied from the vertical distribution obtaining unit 316. Further, when it is determined that the detected upper, lower, left, and right sides correspond to the respective sides of a presentation image, the detection processing unit 317 determines that an image defined by the detected upper, lower, left, and right sides is a presentation image. Then, the detection processing unit 317 generates a detection signal JA indicating the position of this presentation image or indicating that a presentation image has been detected, and supplies the detection signal JA to the control unit 51.

The detection processing unit 317 further performs a process of controlling the signal selection operation of the signal selection unit 314 using a control signal CN so that the binary luminance signal BY is first selected. When detection of a presentation image from the binary luminance signal BY has failed, the signal selection unit 314 is controlled to select the binary color-difference signal BC to detect a presentation image using the binary color-difference signal BC as well as the binary luminance signal BY.

The detection unit 32 generates a detection signal JB indicating the brightness of the captured image from the supplied image signal DVa, and supplies the detection signal JB to the control unit 51. The detection unit 32 divides the captured image into, for example, m by n blocks, and calculates a sum of signals each indicating the brightness of one of the pixels in each block. The detection unit 32 further weights the calculated sums for the individual blocks so that the sum of the weighted sums is calculated as a detection value, and supplies a detection signal JB indicating the detection value to the control unit 51. The detection unit 32 further changes a detection area according to a control signal CTe from the control unit 51. Specifically, a block with a weight of "0" is not used for the calculation of a detection value, and a block with a high weight highly contributes to the calculation of a detection value. Accordingly, the detection area is changed by switching weights.

FIG. 3 shows a structure of the detection unit 32. A block processing unit 321 of the detection unit 32 performs a process of dividing a captured image into m by n blocks, and supplies the image signal DVa to a block-based luminance calculation unit 322 as an image signal DBV for each block.

In response to the image signal DBV, the block-based luminance calculation unit 322 generates for each block a block-based luminance value signal BT indicating the sum of luminance values of pixels in the block, and supplies the block-based luminance value signal BT to a multiplier 324.

In response to the control signal CTe supplied from the control unit 51, a weighting coefficient setting unit 323 sets a weighting coefficient W for each block, and supplies the set weighting coefficient W to the multiplier 324.

The multiplier 324 multiplies the block-based luminance value signal BT supplied from the block-based luminance calculation unit 322 by the weighting coefficient W set by the weighting coefficient setting unit 323, and supplies a result to a detection-value calculation unit 325.

The detection-value calculation unit 325 calculates the sum of multiplication results between the block-based luminance value signals BT and the weighting coefficients W in the captured image, and supplies the sum to the control unit 51 as a detection signal JB. The detection-value calculation unit 325 further generates a detection signal JB for each captured image.

The image processing unit 35 performs various image processes on the image signal DVa supplied from the A/D conversion unit 23. For instance, a white balance (WB) adjustment unit 351 performs white balance adjustment so that a white object in the captured image can correctly be displayed in white. If the captured image can be segmented into a presentation image region and a remaining image (hereinafter referred to as a "background image") region on the basis of the detection signal JA, the white balance adjustment unit 351 performs white balance adjustment for the presentation image region in the captured image and white balance adjustment for the background image region so as to provide region-based white balance adjustment according to the detection signal JA. The image processing unit 35 further performs gamma correction on the white-balance-adjusted image signal. For instance, if the captured image can be segmented into a presentation image region and a background image region on the basis of the detection signal JA from the presentation-image detecting unit 31, a gamma correction unit 352 performs gamma correction on the presentation image region so as not to cause "white out", and performs gamma correction on the background image region so as not to cause "black out".

FIG. 4 shows a structure of the white balance adjustment unit 351. A white balance detection unit 351a extracts an image signal in an achromatic region from the image signal DVa, and supplies the extracted image signal to a white balance correction coefficient setting unit 351b as a detection signal JC. The white balance detection unit 351a further switches between an achromatic region in a presentation image region and an achromatic region in a background image region according to the detection signal JA.

The white balance correction coefficient setting unit 351b determines a white balance correction coefficient K from the detection signal JC supplied from the white balance detection unit 351a, and supplies the white balance correction coefficient K to a correction processing unit 351c.

The correction processing unit 351c multiplies the image signal DVa by the white balance correction coefficient K to perform white balance adjustment, and supplies a white-balance-adjusted image signal DVb to the gamma correction unit 352 shown in FIG. 1.

The image processing unit 35 further converts the three-primary-color image signal subjected to processes such as white balance adjustment and gamma correction into an image signal according to an image encoding technique for still images or moving images, such as a luminance signal or a color-difference signal, to perform a compression expansion process. The image processing unit 35 outputs a resulting compression encoded signal GDa of a still image or moving image to a recording/playback unit 37. The image processing unit 35 further performs a process of outputting an image signal of a still image or moving image that is not subjected to a compression expansion process and/or a compression encoded signal to an external device (not shown). When a compression encoded signal GDb is supplied from the recording/playback unit 37, the image processing unit 35 performs a process of returning the compression encoded signal GDb into an original image signal before the compression encoding process. The image processing unit 35 further generates a display image signal HG from the image signal DVa, and supplies the display image signal HG to a display unit 38. Further, in response to a display signal HE supplied from the control unit 51, the image processing unit 35 performs processes such as generating a display image signal HG that provides on-screen display of information or the like indicating that a presentation-image imaging mode has been set.

The recording/playback unit 37 records the compression encoded signal GDa supplied from the image processing unit 35 onto a recording medium such as a semiconductor memory, an optical disk, or a magnetic tape. The recording/playback unit 37 further reads a compression encoded signal GDb recorded on a recording medium and supplies the compression encoded signal GDb to the image processing unit 35.

The display unit 38 may be composed of, for example, a liquid crystal display element or the like, and displays an image on the basis of the display image signal HG supplied from the image processing unit 35.

A lens driving unit 41 drives a focus lens (not shown) of the lens unit 11 so that an object image can be formed in an in-focus state on the light receiving surface of the imaging element 211. The lens driving unit 41 also drives a zoom lens (not shown) of the lens unit 11 so that the object image to be formed on the light receiving surface of the imaging element 211 has a desired size.

An aperture driving unit 42 drives the aperture mechanism 12 to adjust the amount of light of the object image to be formed on the light receiving surface of the imaging element 211.

A strobe 45 emits strobe light so that a captured image having desired brightness can be obtained.

The control unit 51 is connected to a user interface unit 52 and a motion detection unit 53. The user interface unit 52 is composed of an interface or the like for receiving a remote operation signal input from an operation key or from outside. The user interface unit 52 generates an operation signal PS according to a user operation, and supplies the operation signal PS to the control unit 51. The motion detection unit 53 is configured to detect a shift of the captured image, which is caused by moving the imaging apparatus 10, and may be implemented using, for example, an acceleration sensor, a gyro sensor, or the like. The motion detection unit 53 detects motion of the imaging apparatus 10, and supplies a sensor signal SS indicating a motion detection result to the control unit 51.

The control unit 51 includes a central processing unit (CPU), a read only memory (ROM), and a random access memory (RAM). The CPU executes a program stored in the ROM to generate a control signal according to the operation signal PS and supply the control signal to each unit, thereby controlling the operation of the imaging apparatus 10 in accordance with a user operation. The RAM is used as a work area or the like for temporarily storing information when various types of control are performed.

The control unit 51 further generates a control signal so that the detection value indicated by the detection signal JB supplied from the detection unit 32 is equal to a predetermined reference value, and supplies the control signal to an exposure adjustment unit so as to adjust the brightness of the desired object in the captured image to an optimum level. The exposure adjustment unit is configured to adjust at least one of the amount of light entering the imaging unit 21, the gain of the image signal Sa output from the imaging unit 21, and the exposure time over which the imaging unit 21 obtains the image signal Sa. The exposure adjustment unit is implemented by the aperture mechanism 12 and the aperture driving unit 42, the timing signal generation unit 22, or the amplification unit 213. For example, the control unit 51 generates a control signal CTb on the basis of the detection signal JB, and supplies the control signal CTb to the aperture driving unit 42 to adjust the amount of light entering the imaging unit 21 so that the desired object in the captured image has optimum brightness. Further, the control unit 51 generates a control signal CTc on the basis of the detection signal JB, and supplies the control signal CTc to the timing signal generation unit 22 to adjust the exposure time so that the desired object in the captured image has optimum brightness. Further, the control unit 51 generates a control signal CTd on the basis of the detection signal JB, and supplies the control signal CTd to the amplification unit 213 to adjust the gain of the image signal Sa so that the desired object in the captured image has optimum brightness.

The control unit 51 also performs a process of controlling an operation for detecting a presentation image in response to the sensor signal SS from the motion detection unit 53 or switching to a presentation-image imaging mode for producing a presentation image or the like in the captured image in an optimum state when it is determined that a presentation image has been detected on the basis of the detection signal JA supplied from the presentation-image detecting unit 31. The control unit 51 further notifies the detection unit 32 and the image processing unit 35 of which imaging mode the imaging apparatus 10 is in by using the control signal CTe. Further, when a user specifies the region of a presentation image, the control unit 51 supplies information indicating the specified region to the presentation-image detecting unit 31 as a control signal CTf.

When the presentation-image imaging mode is set by the control unit 51, the detection unit 32 switches detection areas so that a presentation image in the captured image has optimum brightness. The image processing unit 35 performs white balance adjustment so as to correctly reproduce the colors of the presentation image and the background image, or performs gamma correction on the presentation image so as not to cause "white out" and gamma correction on the image determined to be a background image so as not to cause "black out".

The control unit 51 generates the control signal CTa and supplies the control signal CTa to the lens driving unit 41 to perform control to drive the focus lens so that an object image can be formed in an in-focus state onto the light receiving surface of the imaging element 211 or perform control to drive the zoom lens so that a captured image with a desired angle of view can be obtained. The control unit 51 further generates a control signal CTh and supplies the control signal CTh to the strobe 45 to control the strobe light emission.

Figure 5:
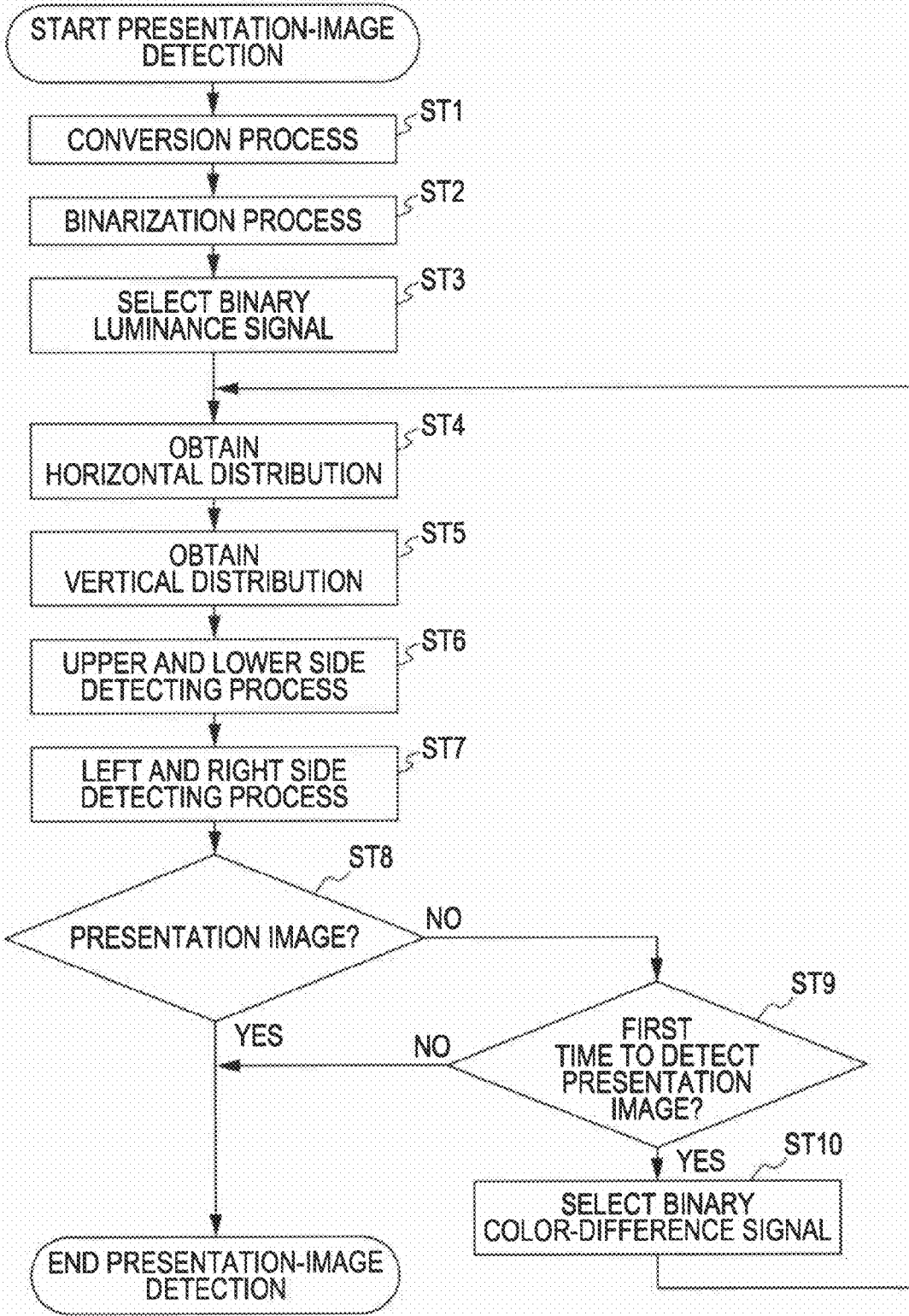
FIG. 5 is a flowchart showing a presentation image detecting operation.

Next, an operation for detecting a presentation image region will be described. FIG. 5 is a flowchart showing a presentation image detecting operation. In step ST1, the presentation-image detecting unit 31 performs a conversion process. The presentation-image detecting unit 31 generates a luminance signal DY and a color-difference signal DC from a three-primary-color image signal DVa, and proceeds to step ST2.

In step ST2, the presentation-image detecting unit 31 performs a binarization process. The presentation-image detecting unit 31 binarizes the luminance signal DY and the color-difference signal DC to generate a binary luminance signal and a binary color-difference signal, respectively, and proceeds to step ST3.

In the binarization process, as described above, the luminance signal DY and the color-difference signal DC are compared with threshold values to binarize the luminance signal DY and the color-difference signal DC, and a binary luminance signal BY and a binary color-difference signal BC are generated. The threshold values used in the binarization process may be set to predetermined fixed levels or may be set depending on a captured image so that a presentation image can accurately be detected from the captured image.

In the case of setting threshold values depending on a captured image, for example, a statistical technique may be used to set the threshold values. Examples of the statistical technique may include the mode method and the discriminant analysis method. The mode method is a method in which the minimum between two peaks in a histogram of luminance levels of a captured image is set as a threshold value when the captured image is segmented into a presentation image portion and a remaining image (hereinafter referred to as a "background image") portion. The discriminant analysis method is a method in which the histogram is segmented into two groups depending on the luminance level and the segment level with the maximum variance between the groups is set as a threshold value.

The threshold values used in the binarization process may not necessarily be automatically set in the manner described above. Alternatively, the threshold values may be determined in accordance with an instruction from a user. The determination of the threshold values in accordance with an instruction from a user will now be described.

In the case of determining a threshold value in accordance with an instruction from a user, the captured image is displayed on the display unit 38 and a threshold value is set from an image signal in a region specified corresponding to as a presentation image by the user on the basis of the operation signal PS from the user interface unit 52. The user interface unit 52 may be implemented by, for example, a touch panel. In this case, the touch panel may be provided on the screen of the display unit 38.

Figure 6A:
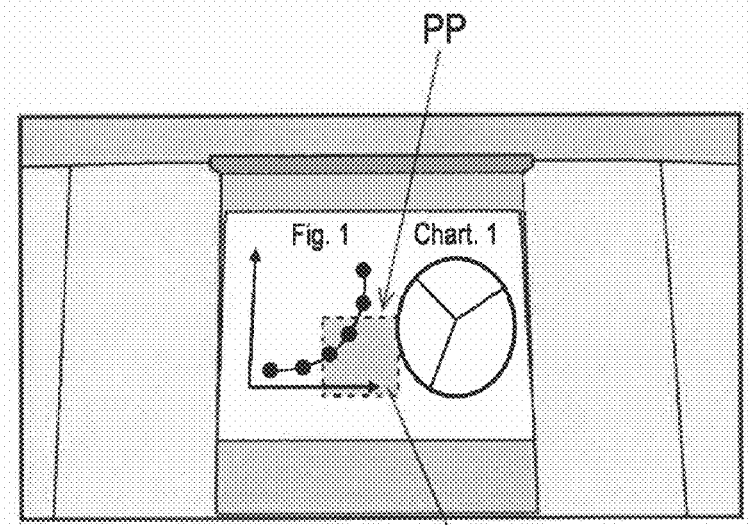
FIGS. 6A and 6B are diagrams describing an operation for determining a threshold value in accordance with an instruction given from a user.
Figure 6B:
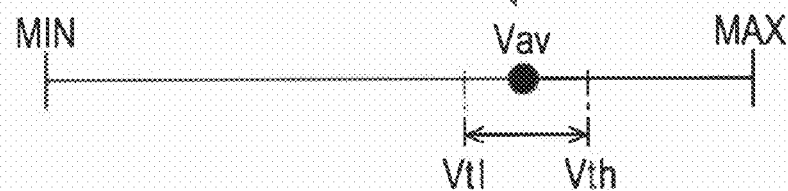

FIGS. 6A and 6B are diagrams describing an operation for determining a threshold value in accordance with an instruction from a user. As shown in FIG. 6A, a portion PP pressed by the user is detected to determine an average level Vav of luminance signals or color-difference signals in the pressed portion PP. Further, as shown in FIG. 6B, a range with respect to the average level Vav is provided. An upper limit Vth and a lower limit Vtl of the range are used as threshold values to generate a binary signal indicating whether a target is inside or outside the range defined by the upper limit Vth and the lower limit Vtl.

FIG. 7 is a flowchart showing a process of setting a threshold value used in the binarization process. In step ST11, the control unit 51 determines whether or not a threshold value is to be automatically set. If it is determined, based on the operation signal PS from the user interface unit 52, that a mode for automatically setting a threshold value is selected, the control unit 51 proceeds to step ST12. If it is determined that a mode for manually setting a threshold value is selected, the control unit 51 proceeds to step ST13.

In step ST12, the control unit 51 controls the presentation-image detecting unit 31 to automatically set a threshold value in accordance with the captured image, and ends the process of setting a threshold value. The presentation-image detecting unit 31 automatically sets a threshold value using, for example, a statistical technique as described above or the like. The presentation-image detecting unit 31 may also automatically use a predetermined threshold value.

In step ST13, the control unit 51 performs a user-specified-region determining process. For example, the control unit 51 determines a region pressed by the user in the captured image on the basis of the operation signal PS from the user interface unit 52, and proceeds to step ST14.

In step ST14, the control unit 51 controls the presentation-image detection unit 31 to set a threshold value in accordance with the user-specified region, and ends the process of setting a threshold value. Here, the control unit 51 notifies the presentation-image detecting unit 31 of the region determined in step ST13 by using the control signal CTf. The presentation-image detecting unit 31 calculates an average level of luminance signals or color-difference signals in the notified region, and sets an upper limit and a lower limit of a given level range with respect to the calculated average level as threshold values. Then, the presentation-image detecting unit 31 ends the process.

In this manner, a threshold value can be set in accordance with an instruction from a user, thereby ensuring that a threshold value can be set according to a presentation image even if it is difficult to automatically set a threshold value using a statistical technique or the like due to the small difference in luminance between a presentation image portion and a remaining image portion or the like.

In step ST3 shown in FIG. 5, the presentation-image detecting unit 31 selects the binary luminance signal BY and proceeds to step ST4.

In step ST4, the presentation-image detecting unit 31 obtains a horizontal distribution and proceeds to step ST5. In step ST5, the presentation-image detecting unit 31 obtains a vertical distribution and proceeds to step ST6.

Figure 8A:
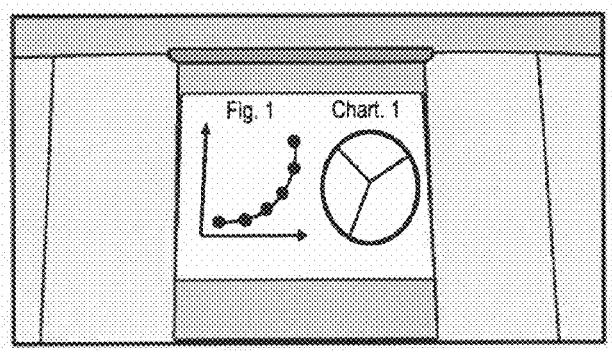
FIGS. 8A to 8D are diagrams showing a process of obtaining a horizontal distribution and a vertical distribution.
Figure 8B:
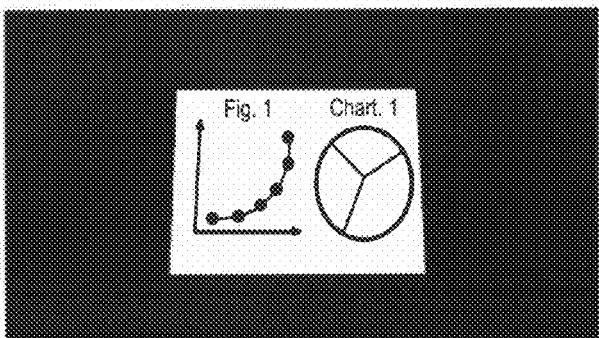
Figure 8C:
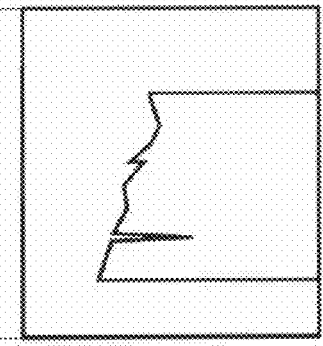
Figure 8D:

FIGS. 8A to 8D show a process of obtaining a horizontal distribution and a vertical distribution. FIG. 8A shows a captured image, and FIG. 8B shows a captured image subjected to the binarization process. The presentation-image detecting unit 31 counts for each line the number of pixels each of which is assigned a luminance signal DY having a signal level higher than a threshold value to produce a horizontal distribution shown in FIG. 8C. The presentation-image detecting unit 31 further counts in the vertical direction the number of pixels each of which is assigned a luminance signals DY having a signal level higher than a threshold value to determine the distribution in the vertical direction as shown in FIG. 8D which is perpendicular to the direction of the horizontal distribution described above.

In step ST6, the presentation-image detecting unit 31 performs a process of detecting upper and lower sides of a presentation image, and proceeds to step ST7.

FIGS. 9A to 10B show a process of detecting upper and lower sides of a presentation image. FIG. 9A shows the captured image subjected to the binarization process, and FIG. 9B shows the horizontal distribution obtained in step ST4. The presentation-image detecting unit 31 segments the horizontal distribution into a plurality of regions, and determines a sum of target pixels for each region. For example, the horizontal distribution is segmented into regions REh1, REh2, REh3, REh4, and REh5, and a sum of target pixels for each region is determined. Then, the presentation-image detecting unit 31 sequentially selects the regions in the direction from the upper end to the lower end of the captured image, and compares the sum of the target pixels in each selected region with the threshold value to detect a region for which the sum exceeds the threshold value. According to this process, a region including an upper side of a presentation image can be detected. Likewise, the presentation-image detecting unit 31 sequentially selects the regions in the direction from the lower end to the upper end of the captured image, and compares the sum of the target pixels in each selected region with the threshold value to detect a region for which the sum exceeds the threshold value. According to this process, a region including a lower side of a presentation image can be detected.

Note that if a side of a presentation image is adjacent to a boundary between regions, the sums of the target pixels in the regions largely differ, which may cause difficulty in detecting a region including the side of the presentation image. For example, if an upper side of a presentation image lies within the region REh(n) and is adjacent to the region REh(n+1), the sum of the target pixels in the region REh(n) does not have a large value. Here, if a region for which the sum exceeds the threshold value is detected, the upper side of the presentation image may be erroneously determined to lie within the region REh(n+1). In order to avoid such an erroneous determination, the horizontal distribution is segmented into a plurality of regions so that each of the regions has a portion overlapping another region. For example, regions REh1 to REh5 and REh1s to REh4s are provided. In this case, even when an upper side of a presentation image is close to the boundary between the regions REh1 and REh2 and lies within either the region REh1 or REh2, the sum of target pixels in the region REh1s does not largely vary. Therefore, a threshold value is set so as to determine that an upper side of a presentation image lies within the region REh1s when the sum of the target pixels in the region REh1s is compared with the threshold value, thus allowing correct detection of a region including a side of a presentation image. Note that the threshold value may be set to a predetermined fixed value or may be set on the basis of the sum of target pixels in each region using a statistical technique as described above.

Then, the presentation-image detecting unit 31 sequentially uses, for the respective lines in the direction from the upper end to the lower end of the captured image, the sums of the target pixels for the individual lines in the horizontal distribution within the detected region including the side of the presentation image, for example, within the region REh1s including the upper side, and compares each of the sums with the threshold value to set the line for which the sum exceeds the threshold value as an upper side La of a presentation image. Likewise, the presentation-image detecting unit 31 sequentially uses, for the respective lines in the direction from the lower end to the upper end of the captured image, the sums of the target pixels for the individual lines in the horizontal distribution within the region REh4s including the lower side, and compares each of the sums with the threshold value. Then, presentation-image detecting unit 31 sets the line for which the sum exceeds the threshold value as a lower side Lb of a presentation image. FIG. 10A shows the captured image subjected to the binarization process, and FIG. 10B shows the horizontal distribution. Here, when it is determined that the region REh1s is a region including an upper side, the sums of the target pixels for the individual lines within the region REh1s, are sequentially used for the respective lines in the direction from the upper end to the lower end of the captured image. Then, each of the sums is compared with the threshold value to set the line for which the sum exceeds the threshold value as an upper side La of a presentation image. Likewise, when it is determined that the region REh4s is a region including a lower side, the sums of the target pixels for the individual lines within the region REh4s are sequentially used for the respective lines in the direction from the lower end to the upper end of the captured image. Then, each of the sums is compared with the threshold value to set the line for which the sum exceeds the threshold value as a lower side Lb of a presentation image.

In this manner, a region including an upper side or a lower side is detected, and an upper side or a lower side of a presentation image is detected from the detected region. Thus, a line for which the sum of target pixels is large due to, for example, noise or the like can be prevented from being erroneously determined to be an upper side of a presentation image.

In step ST7, the presentation-image detecting unit 31 performs a process of detecting left and right sides of a presentation image, and proceeds to step ST8.

Figure 11A:
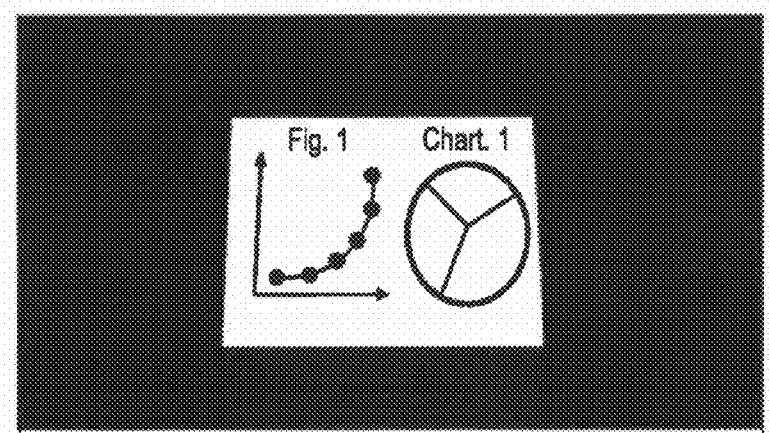
FIGS. 11A and 11B are diagrams showing a process of detecting left and right sides of a presentation image.
Figure 11B:
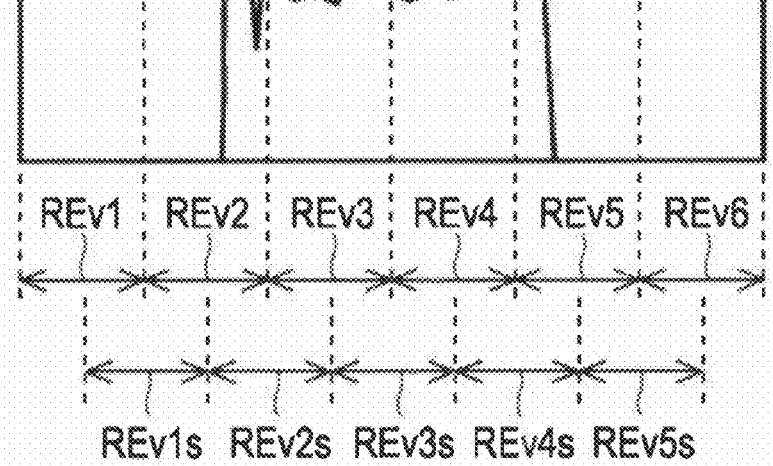

FIGS. 11A to 12B show a process of detecting left and right sides of a presentation image. FIG. 11A shows the captured image subjected to the binarization process, and FIG. 11B shows the vertical distribution obtained in step ST5. The presentation-image detecting unit 31 segments the vertical distribution into a plurality of regions, for example, regions REv1 to REv6 and REv1s to REv5s, and determines a sum of target pixels for each region. Then, the presentation-image detecting unit 31 sequentially selects the regions in the direction from the left end to the right end of the captured image, and compares the sum of the target pixels in each selected region with the threshold value to detect a region for which the sum exceeds the threshold value. According to this process, the region REv2 including a left side of a presentation image can be detected. Likewise, the presentation-image detecting unit 31 sequentially selects the regions in the direction from the right end to the left end of the captured image, and compares the sum of the target pixels in each selected region with the threshold value to detect a region for which the sum exceeds the threshold value. According to this process, the region REv5 including a right side of a presentation image can be detected. Note that the threshold values may be set to predetermined fixed values or may be set on the basis of the sum of target pixels in each region using a statistical technique as described above.

Then, the presentation-image detecting unit 31 sequentially uses, for the respective pixel positions in the direction from the left end to the right end of the captured image, the sums of the target pixels for the individual pixel positions in the vertical distribution within the detected region, for example, within the region REv2 including the left side, and compares each of the sums with the threshold value. Then, the presentation-image detecting unit 31 sets the pixel position for which the sum exceeds the threshold value as a left side Lc of a presentation image. Likewise, the presentation-image detecting unit 31 sequentially uses, for the respective pixel positions in the direction from the right end to the left end of the captured image, the sums of the target pixels for the individual pixel positions in the vertical distribution within the region REv5 including the right side, and compares each of the sums with the threshold value. Then, the presentation-image detecting unit 31 sets the pixel position for which the sum exceeds the threshold value as a right side Ld of a presentation image.

Figure 12A:
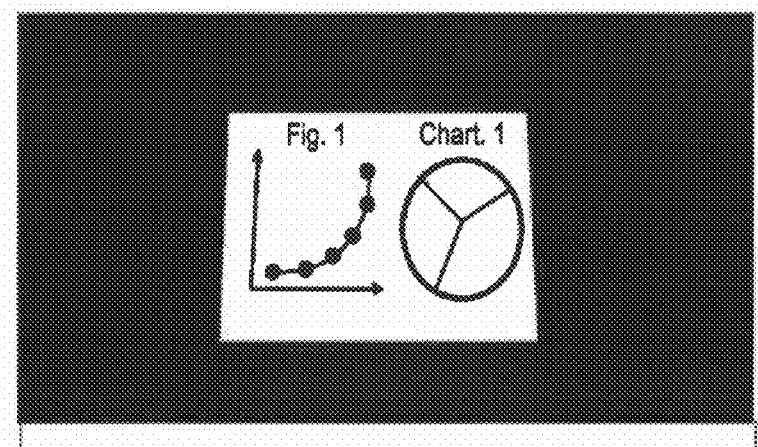
FIGS. 12A and 12B are diagrams showing a process of detecting left and right sides of a presentation image.
Figure 12B:
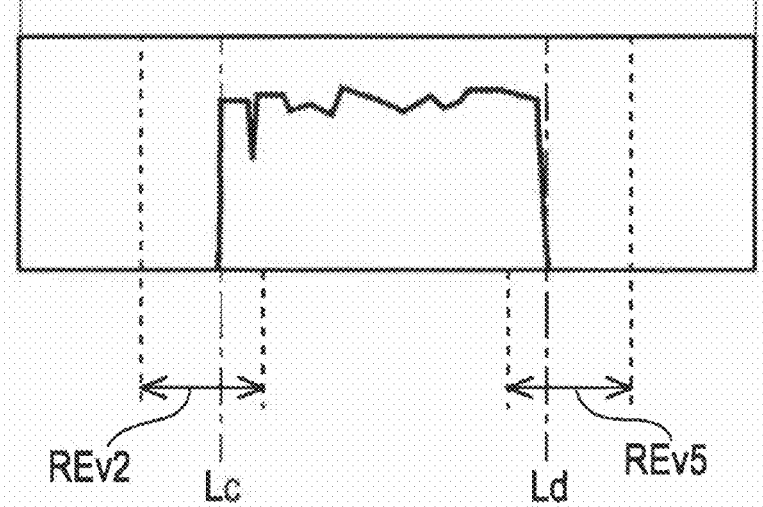

FIG. 12A shows the captured image subjected to the binarization process, and FIG. 12B shows the vertical distribution. Here, when it is determined that the region REv2 is a region including a left side, the sums of the target pixels for the individual pixel positions within the region REv2 are sequentially used in the direction from the left end to the right end of the captured image. Then, each of the sums is compared with the threshold value to set the pixel position for which the sum exceeds the threshold value as a left side Lc of a presentation image. Likewise, when it is determined that the region REv5 is a region including a right side, the sums of the target pixels for the individual pixel positions within the region REv5 are used sequentially for the respective pixel positions in the direction from the right end to the left end of the captured image. Then, each of the sums is compared with the threshold value to set the pixel position for which the sum exceeds the threshold value as a right side Ld of a presentation image.

In step ST8, the presentation-image detecting unit 31 determines whether or not the resulting image is a presentation image. The presentation-image detecting unit 31 determines an aspect ratio based on the upper, lower, left, and right sides detected in steps ST6 and ST7. If the determined aspect ratio is similar to an aspect ratio of a presentation image, for example, an aspect ratio of "4:3" or "16:9", which is used for television broadcast, that is, if the determined aspect ratio is "4:3±α" or "16:9±β", the presentation-image detecting unit 31 determines that the region defined by the sides detected in steps ST6 and ST7 corresponds to a presentation image, and then ends the presentation image detection process. The values "α" and "β" are constants indicating the tolerance for determining a presentation image and are determined in advance. In this manner, it is determined whether or not the determined aspect ratio is similar to a desired aspect ratio. Thus, when a presentation image with a predefined aspect ratio is captured, the presentation image region can easily be identified from a captured image.

If upper, lower, left, and right sides of a presentation image are not detectable or if the aspect ratio determined based on the detected upper, lower, left, and right sides is not similar to a desired aspect ratio, the presentation-image detecting unit 31 determines that no presentation image is detected, and proceeds to step ST9.

Figure 13A:
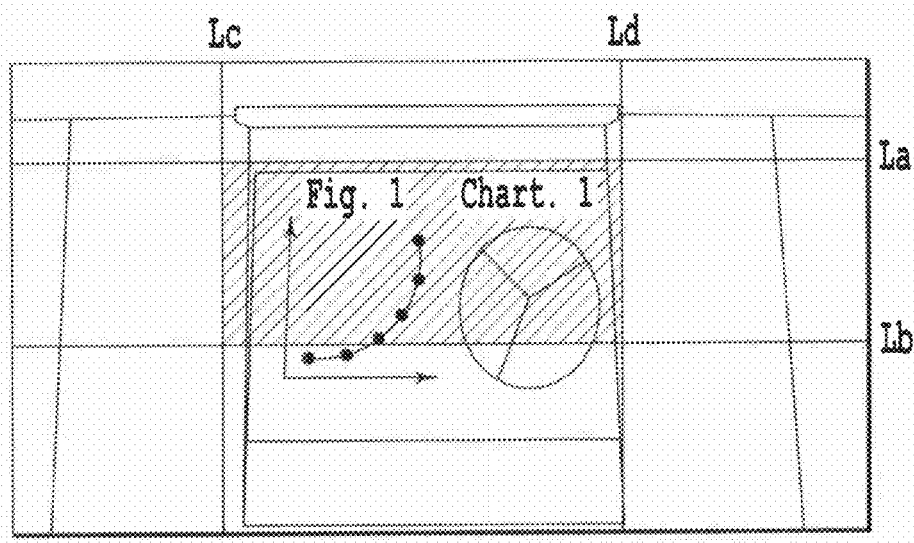
FIGS. 13A and 13B are diagrams describing an operation for determining whether or not a presentation image has been detected.
Figure 13B:
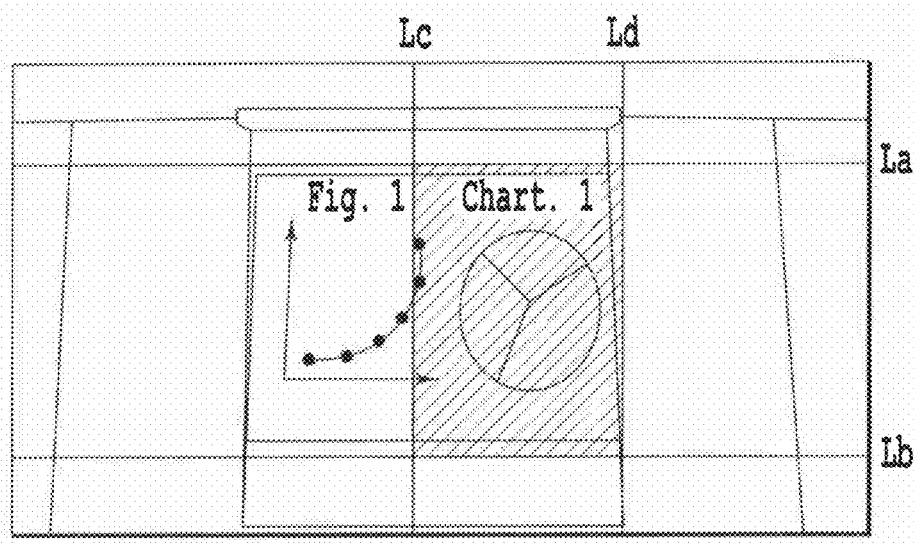

FIGS. 13A and 13B are diagrams describing an operation for determining whether or not the resulting image is a presentation image. For instance, as shown in FIG. 13A or 13B, an upper side La, a lower side Lb, a left side Lc, and a right side Ld are detected. If the aspect ratio of an image defined by the detected upper, lower, left, and right sides is not similar to an aspect ratio of a presentation image, the presentation-image detecting unit 31 proceeds to step ST9.

In step ST9, the presentation-image detecting unit 31 determines whether or not this is the first time to detect a presentation image. Since the detection of a presentation image is performed using a binary luminance signal at the first time of the presentation-image detection, the presentation-image detecting unit 31 proceeds to step ST10.

In step ST10, the presentation-image detecting unit 31 selects the binary color-difference signal. Then, the presentation-image detecting unit 31 returns to step ST4, and repeats the process from step ST4.

The presentation-image detecting unit 31 repeats the process from step ST4 to perform presentation-image detection based on the binary color-difference signal. Note that if upper, lower, left, and right sides of a presentation image are not detectable or if the aspect ratio determined based on the detected upper, lower, left, and right sides is not similar to a desired aspect ratio, the presentation-image detecting unit 31 proceeds from step ST8 to step ST9.

In this manner, presentation-image detection is performed using a binary color-difference signal as well as using a binary luminance signal. Therefore, for example, even when it is difficult to separate a presentation image and a background image on the basis of a binary luminance signal due to the small difference in luminance between the presentation image and the background image, the presentation image whose base color is different from the color of the background image would be detectable due to the difference in color. This presentation image has features of having a higher luminance value than natural landscape and having a deep color. Here, the color density can be represented using the magnitude of color-difference component in YCC or Lab color space or the magnitude of saturation in the hue-saturation-value (HSV) space. Therefore, presentation-image detection using the intensity of the color-difference component or the magnitude of saturation allows a presentation image and a background image to be separated from each other even if it is difficult to separate the presentation image and the background image from each other based on the difference in luminance. Thus, the presentation image can accurately be detected.

In step ST9, the presentation-image detecting unit 31 determines whether or not this is the first time tp detect a presentation image. Since the presentation-image detecting unit 31 has performed presentation-image detection using the binary luminance signal and the binary color-difference signal, this is not the first time to detect a presentation image. Then, the presentation-image detecting unit 31 ends the process.

Figure 14A:
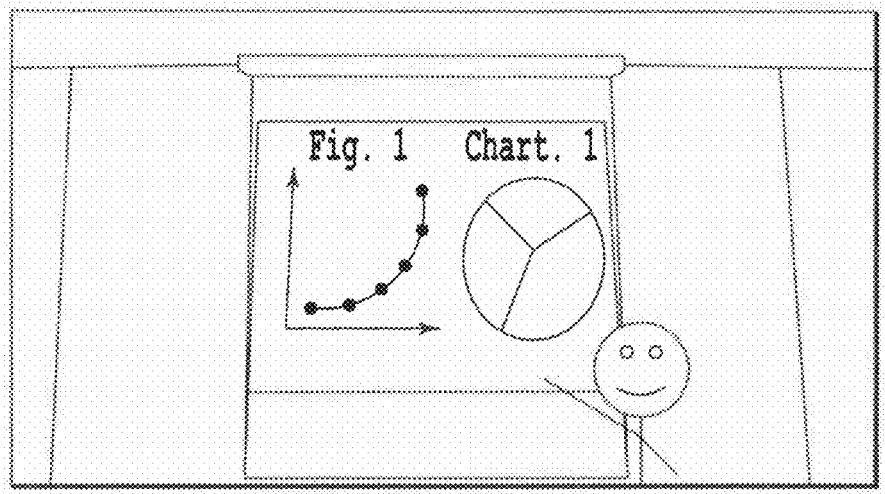
Figure 14B:
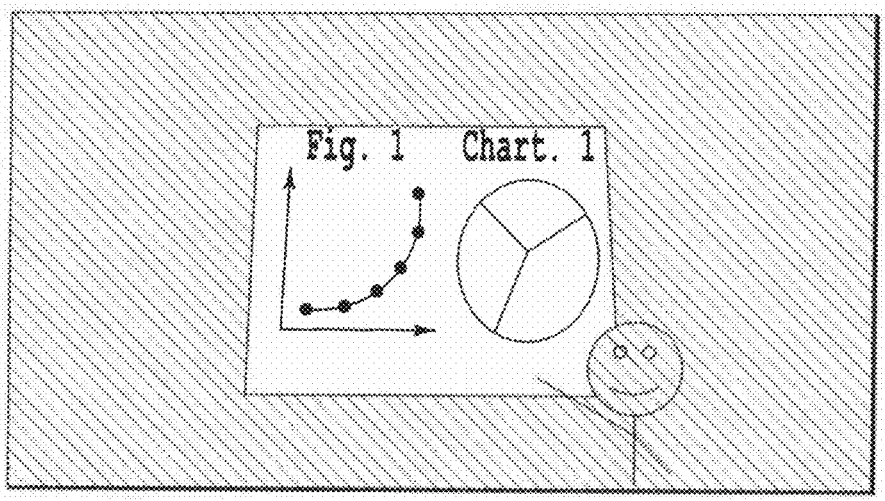

This process does not involve a heavy process such as mathematical coordinate transform for detection of lines from an edge image or vertex search. Thus, the presentation-image detecting unit 31 can provide quick detection of a presentation image region. Further, no contour extraction is involved when thumbnail images are used for high-speed processing, thus achieving the advantage of less degradation of the detection accuracy. Further, if the detection using luminance information has failed, the presentation-image detecting unit 31 detects a presentation image using color-difference information. Thus, a presentation image can be detected even when the luminance of the presentation image and the background image is low. Further, in a case where a presentation image is detected using vertex search, as shown in FIG. 14A, if a portion of a presentation image is hidden, it is difficult to search for vertices, resulting in failure to detect a presentation image. According to the present embodiment of the present invention, however, as shown in FIG. 14B, the appearance of an outline of a presentation image in the binary image to some extent when it is binarized would allow detection of the presentation image. Further, a presentation image can be detected even when it is difficult to detect a presentation image using edge detection due to the small difference in signal level at the boundaries between the presentation image and the background image.

In the embodiment described above, each of the horizontal distribution and the vertical distribution is segmented into a plurality of regions, and regions including upper, lower, left, and right sides are each detected from the sum of target pixels for each region, and upper, lower, left, and right sides are detected from the detected regions. Here, the presentation-image detecting unit 31 sets a detecting range within which the horizontal and vertical sides of a presentation image are detected in accordance with information indicating that an operation for changing a presentation image region in the captured image has been performed, thereby more efficiently detecting the presentation image region. The information indicating that the operation for changing the presentation image region in the captured image has been performed may be, for example, information that allows easy identification of changes in the presentation image which have occurred between frames (hereinafter referred to as "inter-frame information"). For instance, as the direction of imaging is changed, the position of a presentation image in the captured image is also changed. Thus, the imaging apparatus 10 is provided with the motion detection unit 53 to easily recognize a change in the position of a presentation image, and a detecting range is set using the sensor signal SS from the motion detection unit 53 as inter-frame information.

Next, an operation for detecting a presentation image using inter-frame information will be described with reference to a flowchart shown in FIG. 15. In step ST21, the control unit 51 determines, based on the sensor signal SS from the motion detection unit 53, whether or not the amount of motion of the imaging apparatus 10 is greater than or equal to a predetermined value, and notifies the presentation-image detecting unit 31 of a determination result by using the control signal CTf.

If it is determined in step ST21 that the amount of motion of the imaging apparatus 10 is less than the predetermined value, the presentation-image detecting unit 31 proceeds to step ST22. If the amount of motion of the imaging apparatus 10 is greater than or equal to the predetermined value, the process proceeds to step ST24.

In step ST22, the presentation-image detecting unit 31 determines whether or not a presentation image has been detected in the preceding frame. If a presentation image has been detected in the captured image of the preceding frame, the presentation-image detecting unit 31 proceeds to step ST23. If no presentation image is detected, the presentation-image detecting unit 31 proceeds to step ST24.

Figure 16A:
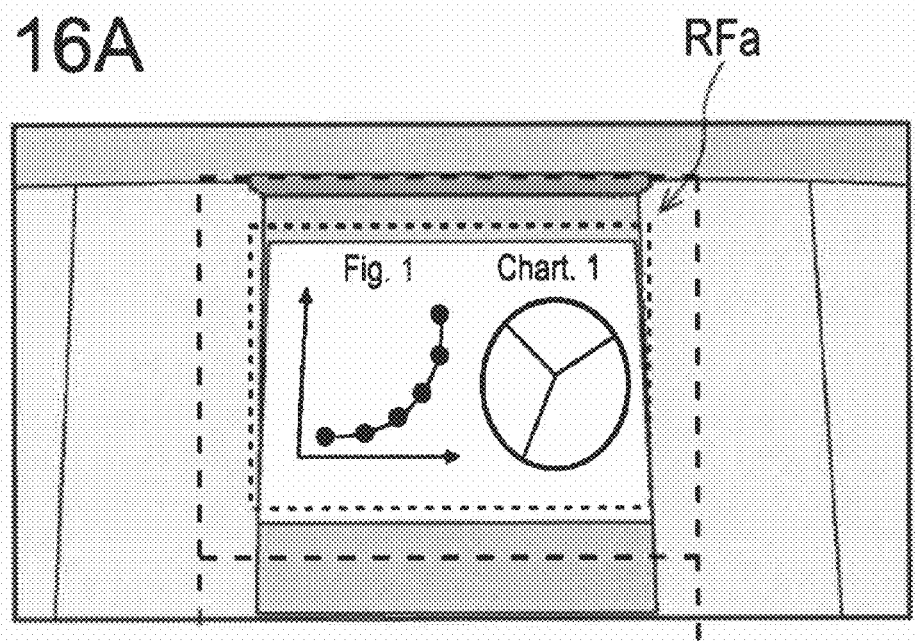
Figure 16B:
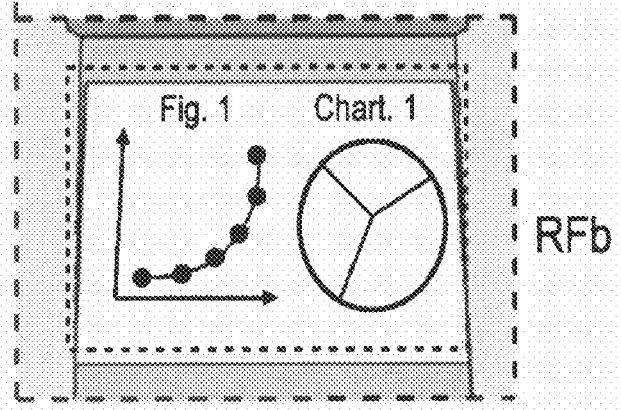

In step ST23, the presentation-image detecting unit 31 switches detecting ranges. FIGS. 16A and 16B show switching of detecting ranges. The presentation-image detecting unit 31 switches the detecting range from, as shown in FIG. 16A, the range of the captured image with respect to a presentation image region RFa detected in the preceding frame to, as shown in FIG. 16B, a region RFb that is smaller than the captured image and that is larger than the presentation image. Then, the presentation-image detecting unit 31 proceeds to step ST24. The presentation-image detecting unit 31 may also set a detecting range not only with respect to a position detected in the preceding frame but also using a motion detection result. For example, when the imaging apparatus 10 is not moved, a detecting range is set so that, for example, the center of the presentation image detected in the preceding frame and the center of the detecting range match. When motion of the imaging apparatus 10 is detected from a motion detection result, since the position of the presentation image in the captured image is shifted in a direction opposite to the direction of the motion of the imaging apparatus 10, the presentation-image detecting unit 31 increases the detecting range in the direction opposite to the direction of the motion with respect to the position of the presentation image detected in the preceding frame. Accordingly, a detecting range can be set in accordance with the motion of the imaging apparatus 10. The detecting range may also be increased in accordance with an increase in the amount of motion.

In step ST24, the presentation-image detecting unit 31 detects a presentation image from the detecting range. That is, the presentation-image detecting unit 31 performs the processing of steps ST1 to ST10 described above, and detects a presentation image from the detecting range. Then the presentation-image detecting unit 31 ends the process.

In this manner, when the amount of motion of the imaging apparatus 10 is less than a predetermined value, the presentation-image detecting unit 31 refers to the position of the presentation image detected in the preceding frame and reduces a detecting range. Thus, a presentation image can quickly be detected compared with when a presentation image is detected from a captured image. Further, the time involved even in finely detecting the position of a presentation image for improved accuracy can be reduced compared with the time involved in detecting a presentation image from a captured image. Further, since the presentation-image detecting unit 31 sets a detecting range by referring to the position of the presentation image detected in the preceding frame, a background portion where a presentation image will be less possibly found is not taken into account. This can prevent a portion other than the presentation image from being erroneously detected. Further, when the amount of motion of the imaging apparatus 10 is large, a detecting range is shifted in accordance with the amount of motion, thus providing quicker detection of a presentation image than that when a presentation image is detected from a captured image.

Note that in the imaging apparatus 10, a change in a presentation image may also be caused when the angle of view is changed through a zoom operation as well as when the imaging apparatus 10 is moved. The presentation-image detecting unit 31 may therefore change a detecting range not only using the sensor signal SS from the motion detection unit 53 as inter-frame information but also in response to zoom information.

Next, an operation for detecting a presentation image using zoom information as inter-frame information will be described with reference to a flowchart shown in FIG. 17. When a zoom operation is performed, the control unit 51 notifies the presentation-image detecting unit 31 of zoom information, for example, a zoom magnification ratio, by using the control signal CTf without controlling the lens driving unit 41.

If it is determined in step ST31 that the amount of motion of the imaging apparatus 10 is less than a predetermined value, the presentation-image detecting unit 31 proceeds to step ST32. If the amount of motion of the imaging apparatus 10 is greater than or equal to the predetermined value, the presentation-image detecting unit 31 proceeds to step ST35.

In step ST32, the presentation-image detecting unit 31 determines whether or not a presentation image has been detected in the preceding frame. If a presentation image has been detected from the captured image of the preceding frame, the presentation-image detecting unit 31 proceeds to step ST33. If no presentation image is detected, the presentation-image detecting unit 31 proceeds to step ST35.

In step ST33, the presentation-image detecting unit 31 obtains zoom information from the control unit 51, and proceeds to step ST34. Examples of the zoom information include the ratio of a zoom magnification at which the captured image of the preceding frame is generated to a zoom magnification at which the captured image of the current frame is generated (hereinafter referred to as a "zoom magnification ratio").

In step ST34, the presentation-image detecting unit 31 switches between detecting ranges. The presentation-image detecting unit 31 switches between detecting ranges in accordance with the zoom magnification ratio with respect to the presentation image region detected in the preceding frame, and proceeds to step ST35. If the zoom magnification ratio is less than "1", the presentation image of the current frame is determined to be reduced compared with the presentation image of the preceding frame, and the presentation-image detecting unit 31 reduces the detecting range. If the zoom magnification ratio is greater than "1", the presentation image of the current frame is determined to be magnified compared with the presentation image of the preceding frame, and the presentation-image detecting unit 31 increases the detecting range.

Figure 18A:
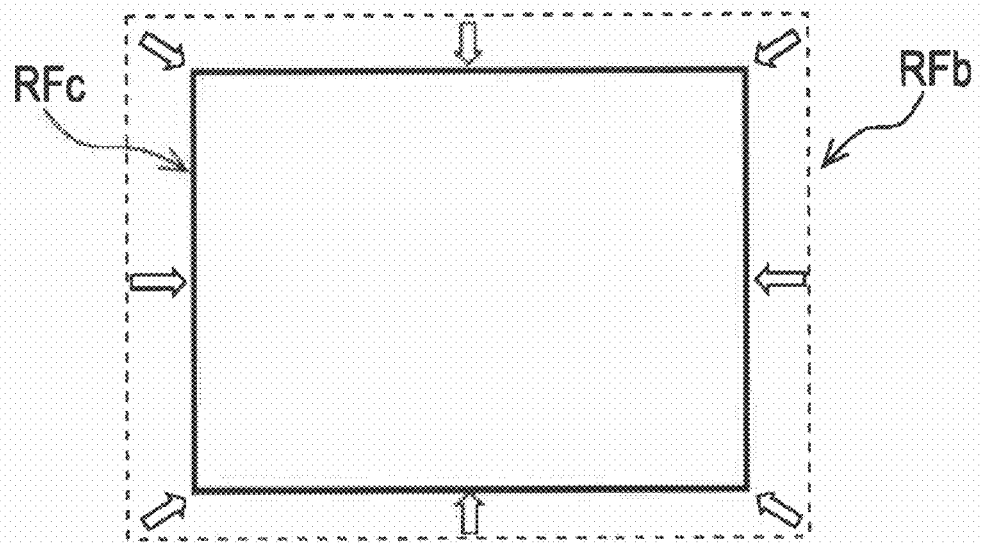
FIGS. 18A and 18B are diagrams showing the switching of detecting ranges based on zoom information.
Figure 18B:
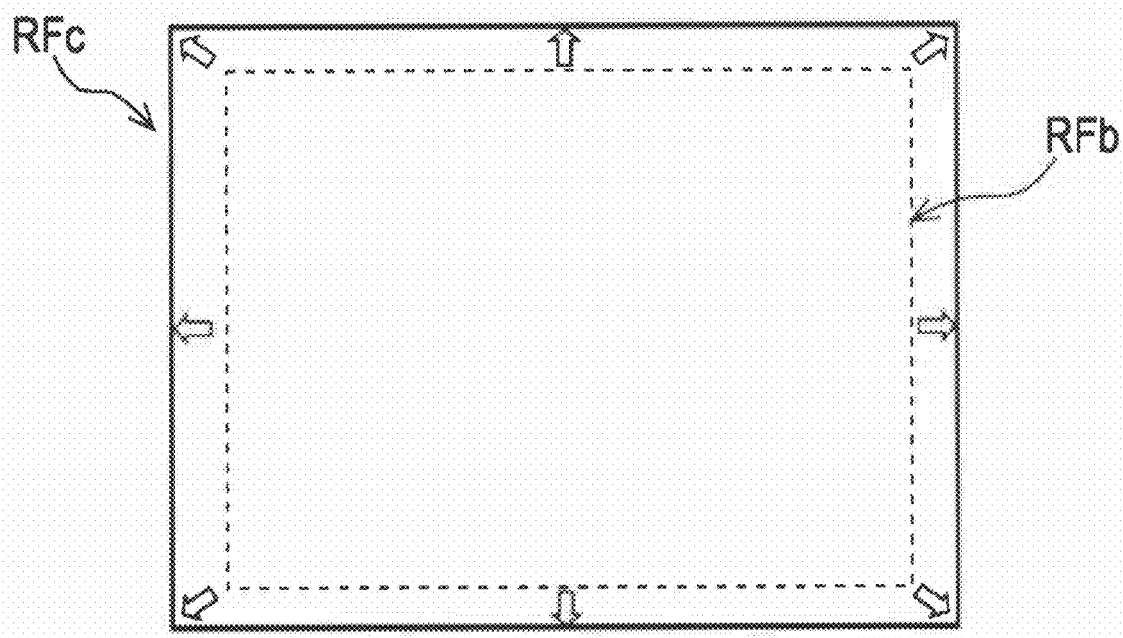

FIGS. 18A and 18B show the switching of detecting ranges based on zoom information. For example, as in step ST34 described above, after the presentation-image detecting unit 31 switches between detecting ranges, if the zoom magnification ratio is less than "1", as shown in FIG. 18A, the presentation-image detecting unit 31 reduces the detecting range in accordance with the zoom magnification ratio. If the zoom magnification ratio is greater than "1", as shown in FIG. 18B, the presentation-image detecting unit 31 increases the detecting range in accordance with the zoom magnification ratio. In FIGS. 18A and 18B, a region RFb represents a detecting range before the change according to the zoom magnification ratio, and a region RFc represents a detecting range after the change according to the zoom magnification ratio.

In step ST35, the presentation-image detecting unit 31 detects a presentation image from the detecting range. That is, the presentation-image detecting unit 31 performs the processing from steps ST1 to ST10 described above to detect a presentation image from the detecting range, and ends the process.

In this manner, a detecting range is reduced or increased in accordance with zoom information. Therefore, for example, if the zoom magnification ratio is less than "1" and the presentation image is reduced, the detecting range is reduced so that a background portion where a presentation image will be less possibly found is removed from the detecting range. This can prevent a portion other than a presentation image from being erroneously detected. Further, a presentation image can quickly be detected. If the zoom magnification ratio is greater than "1" and the presentation image is magnified, the detecting range is increased to prevent a presentation image from being beyond the detecting range to ensure that a presentation image can be detected. With this process, a presentation image can more efficiently be detected from a captured image.

Next, the operation of the imaging apparatus 10 will be described. FIG. 19 is a flowchart showing an exposure control operation performed by the imaging apparatus 10. In step ST101, the control unit 51 causes the presentation-image detecting unit 31 to perform presentation-image detection, and proceeds to step ST102 shown in FIG. 19.

The process of detecting a presentation image is not limited to that shown in FIG. 19. For example, edge detection of a captured image may be performed to obtain a contour indicating the boundary between a presentation image and a background image, and four vertices or four lines indicating sides of a presentation image may be determined from information regarding the obtained contour to detect a presentation image.

In step ST102 shown in FIG. 19, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST103. If it is determined that the condition is not satisfied, the control unit 51 sets the imaging mode to another image imaging mode (for example, a normal imaging mode), and proceeds to step ST105.

The control unit 51 determines whether or not the condition for switching to the presentation-image imaging mode is satisfied in accordance with the occurrence of frames where a presentation image has been detected. For example, the control unit 51 counts up each time a frame where a presentation image has been detected is produced, and counts down each time a frame where no presentation image is detected is produced. The count value may be set in the range from "0" to "about several tens". When the count value is greater than or equal to a threshold value determined in advance for the imaging mode determination (hereinafter referred to as a "mode-determination threshold value"), the control unit 51 sets the presentation-image imaging mode. If the count value is less than the mode-determination threshold value, the control unit 51 sets the normal imaging mode.

Alternatively, the control unit 51 may set an imaging mode on the basis of the number of consecutive frames where a presentation image has been detected or the number of consecutive frames where no presentation image is detected. For example, when the number of consecutive frames where a presentation image has been detected has reached a predetermined value, the control unit 51 may switch the imaging mode from the normal imaging mode to the presentation-image imaging mode. Or, when the number of consecutive frames where no presentation image is detected has reached a predetermined value, the control unit 51 may switch the imaging mode from the presentation-image imaging mode to the normal imaging mode. This allows stable switching between the imaging modes according to the detection of a presentation image.

Figure 20:
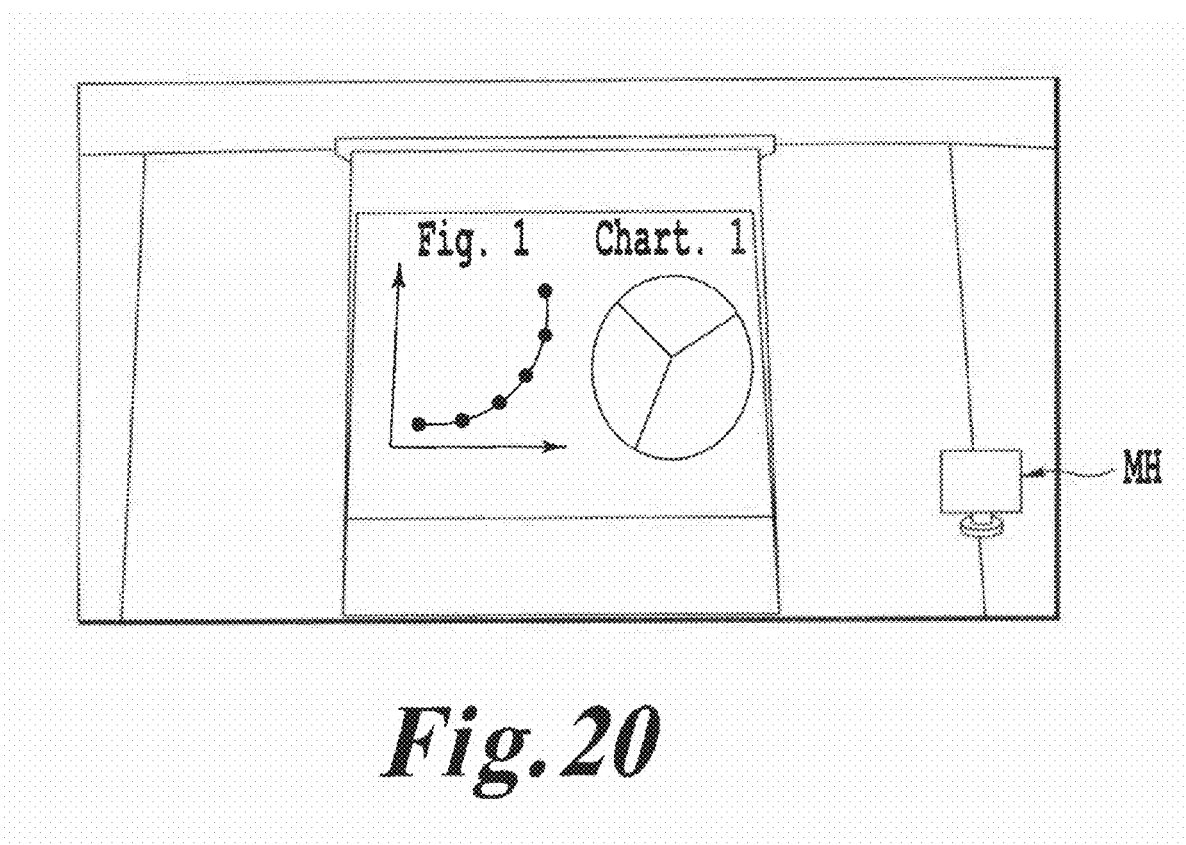
FIG. 20 is a diagram showing the display of an icon sign indicating that a presentation-image imaging mode has been set.

In step ST103, the control unit 51 performs a presentation-image imaging mode notification process, and proceeds to step ST104. The control unit 51 notifies the user that the imaging apparatus 10 has been set in the presentation-image imaging mode. For example, when the imaging apparatus 10 is in the presentation-image imaging mode, the control unit 51 generates a display signal HE and supplies the display signal HE to the image processing unit 35 to generate a display image signal HG from the image signal DVa and the display signal HE. Thus, the control unit 51 causes the captured image and information indicating that the presentation-image imaging mode has been set to be displayed on the screen of the display unit 38. FIG. 20 shows a captured image displayed on the display unit 38, in which an icon sign MH indicating that the presentation-image imaging mode has been set is provided.

In step ST104, the control unit 51 determines the position of the presentation image on the basis of the detection signal JA, and performs a weighting coefficient setting process according to the position of the presentation image. Then, the control unit 51 proceeds to step ST107.

FIGS. 21A to 21D are diagrams describing the operation of the detection unit 32. As shown in FIG. 21A, the detection unit 32 divides a captured image into a plurality of blocks, for example, m by n blocks. Further, the captured image has composition shown in FIG. 21B. When a presentation image is detected, as shown in FIG. 21C, high weight is assigned to blocks that do not include the presentation image so as not to be affected by the presentation image. For example, the weighting coefficient for blocks that include the presentation image is set to "0" and the weighting coefficient for blocks including a background image is set high.

In step ST105, the control unit 51 performs a normal imaging mode notification process, and proceeds to step ST106. The control unit 51 notifies the user that the imaging apparatus 10 has been set in the normal imaging mode. For example, the control unit 51 stops the supply of the display signal HE, which is performed when the imaging apparatus 10 is in the presentation-image imaging mode, to remove the icon sign MH so that the user can identify the normal imaging mode being set.

In step ST106, the control unit 51 controls the detection unit 32 to perform a weighting coefficient setting process so that the weight for the center is increased, and proceeds to step ST107. Specifically, in the normal imaging mode, as shown in FIG. 21D, the control unit 51 sets weighting coefficients so that high weight can be assigned to blocks located at the center in the captured image.

When weighting coefficients are set in accordance with the imaging mode, the detection unit 32 provides a detection area in the captured image and generates a detection signal JB from an image signal in the detection area. Specifically, the detection unit 32 divides the captured image into blocks, and weights a sum of signals indicating the brightness of the individual pixels in each block with a weighting coefficient W. The weighted sums are added to calculate a detection value Vjb, and a detection signal JB indicating the detection value Vjb is generated.

Here, if the sum of luminance signals of pixels included in a block given by coordinates (a, b) is represented by BT(a, b) and a weighting coefficient for the block at the coordinates (a, b) is represented by W(a, b), the detection unit 32 generates the detection value Vjb according to Equation (1):

$$V_{jb} = \sum_{a=1,b=1}^{m,n} (W(a,b) \times BT(a,b)) \quad (1)$$

Normalizing the sum of weighting coefficients to 1 yields a normalized detection value Vjb.

In step ST107, the control unit 51 performs exposure control on the basis of the detection signal JB generated by the detection unit 32, and proceeds to step ST108. Here, in the detection unit 32, the weighting coefficient W set in the weighting coefficient setting process in step ST104 or ST106 is used to generate the detection signal JB. The control unit 51 generates at least one of the control signals CTb, CTc, and CTd on the basis of the detection signal JB generated by the detection unit 32. The control unit 51 supplies the generated control signals CTb, CTc, and CTd to the aperture driving unit 42, the timing signal generation unit 22, and the amplification unit 213, respectively. The control unit 51 performs the aperture setting of the aperture mechanism 12, the adjustment of the exposure time using the timing signal generation unit 22, or the gain adjustment of the image signal Sa using the amplification unit 213 so as to realize appropriate exposure.

In step ST108, the control unit 51 determines whether or not the imaging operation ends. The control unit 51 ends the brightness control, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST101.

In this manner, a detection area is set in a location different from that of a presentation image detected by detecting the position of the presentation image, that is, weighting is dynamically changed so that blocks with high weight do not include the presentation image, thereby realizing brightness control without being affected by the presentation image. Therefore, a captured image in which a presentation image has appropriate brightness can be obtained while being less affected by the presentation image. Further, even in the case of dynamic change in the design of a presentation image in a moving image or a slide show, brightness control is not performed in accordance with the change in the presentation image, resulting in a readable captured image without variations in brightness. Further, when a presentation image is dark, a captured image in which the presentation image has appropriate brightness can be produced without performing strobe light emission which may involve an effect of reflected strobe light on the presentation image when it is captured.

Second Embodiment

In the foregoing embodiment, the process of detecting a presentation image from a captured image is performed, and the imaging mode is automatically switched to the presentation-image imaging mode when a presentation image is detected. That is, unless a presentation image is detected, brightness control is not automatically performed without being affected by the presentation image. Further, when the accuracy of detecting a presentation image is low, a detection unit may not correctly provide a detection area in a location different from that of the detected presentation image.

Accordingly, imaging modes may be manually switched so that brightness control can be performed without being affected by a presentation image even if the detection of the presentation image has failed. Further, since a presentation image is often captured so that the presentation image is substantially at the center of the captured image, a detection area may be provided in an edge of the captured image or along at least one side of the captured image, except for the center portion thereof.

FIG. 22 shows a structure of an imaging apparatus 10B according to a second embodiment of the present invention. The same or similar components as or to those of the imaging apparatus 10 shown in FIG. 1 are given the same numerals, and detailed descriptions thereof are thus omitted. The imaging apparatus 10B shown in FIG. 22 is configured such that imaging modes are manually switched, and does not include the presentation-image detecting unit 31 shown in FIG. 1.

The user interface unit 52 connected to the control unit 51 generates an operation signal PS according to a user operation, and supplies the operation signal PS to the control unit 51. The control unit 51 generates a control signal according to the operation signal PS and supplies the control signal to each unit, thereby performing control so that the imaging apparatus 10B can be operated in accordance with the user operation.

Figure 25A:
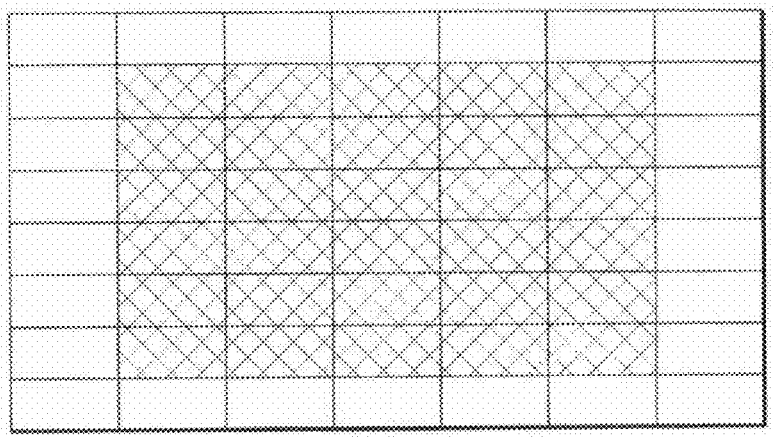
FIGS. 25A to 25E are diagrams showing an operation when the presentation-image imaging mode is set.

For example, when a user selects the presentation-image imaging mode, the control unit 51 receives an operation signal PS indicating the presentation-image imaging mode. Upon receipt of the operation signal PS indicating the presentation-image imaging mode, the control unit 51 outputs a control signal CTe for changing a detection area to a detection unit 32. For example, the control unit 51 outputs to the detection unit 32 a control signal CTe for changing a detection area so that high weight is assigned to blocks located along at least one side of the captured image, for example, as shown in FIG. 25A, along the edges of the captured image, while the weight to remaining blocks is set to "0".

The detection unit 32 sets the weight for each of the blocks of the captured image on the basis of the control signal CTe supplied from the control unit 51 to determine a detection signal JB. In this example, the blocks with a weight of "0" are not used to determine a detection value while blocks with high weight largely contribute to the generation of a detection value. By switching the weights in the manner described above, a detection area is changed.

Instead of using the above-described method of changing a detection area of the detection unit 32 by switching the weights, the control unit 51 may generate a control signal CTe for obtaining luminance values of only blocks in a detection area of the captured image. In this case, the detection unit 32 supplies the sum of luminance value signals for each block obtained on the basis of the control signal CTe to the control unit 51 as the detection signal JB.

The control unit 51 generates a control signal CTb on the basis of the detection signal JB determined by the detection unit 32, and supplies the signal CTb to the aperture driving unit 42 to adjust the amount of light entering the imaging unit 21 so that the desired object in the captured image has optimum brightness. The control unit 51 further generates a control signal CTc on the basis of the detection signal JB and supplies the control signal CTc to the timing signal generation unit 22 to adjust the exposure time so that the desired object in the captured image has optimum brightness. The control unit 51 further generates a control signal CTd on the basis of the detection signal JB and supplies the control signal CTd to the amplification unit 213 to adjust the gain of the image signal Sa so that the desired object in the captured image has optimum brightness.

Figure 23A:
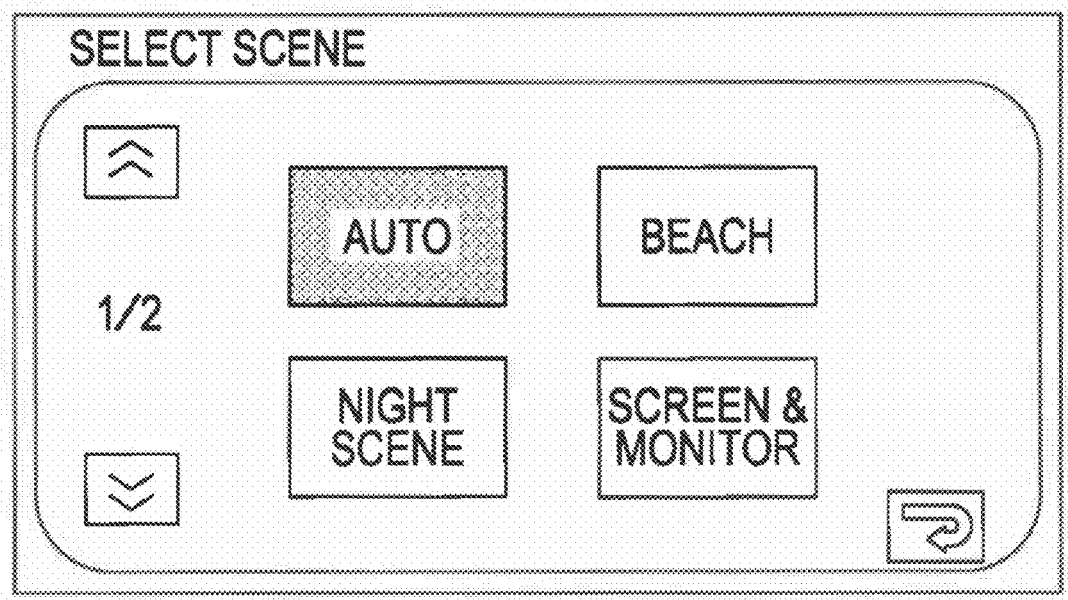
Figure 23B:
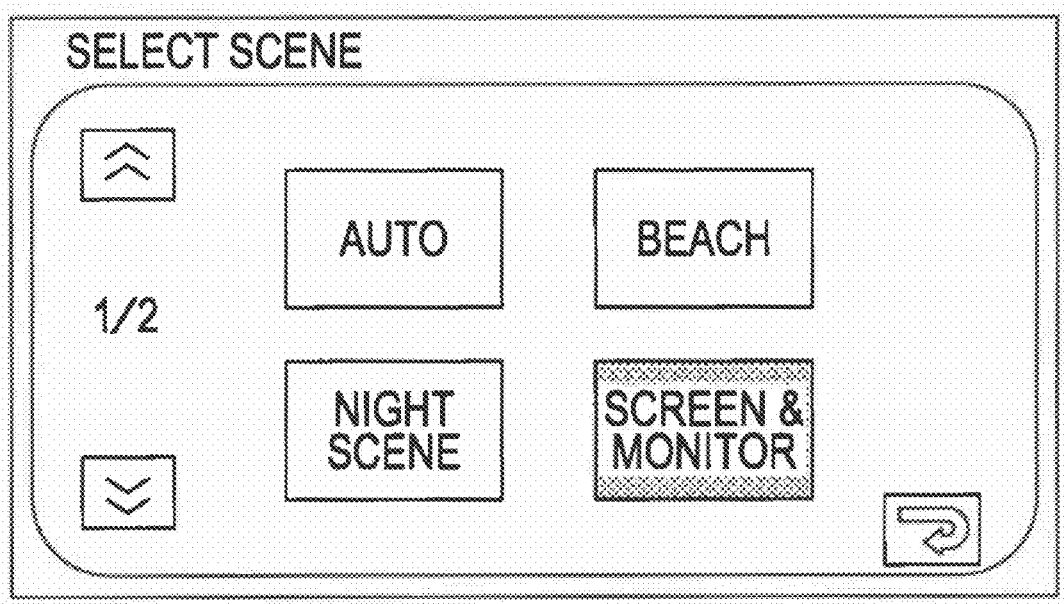

FIGS. 23A and 23B show display of an imaging mode selection menu when the switching between imaging modes is manually performed. For example, the control unit 51 controls the operation of the display unit 38 to display an imaging mode selection menu as shown in FIG. 23A. Further, for example, a touch panel is used as the user interface unit 52. In this case, the touch panel is provided on a display screen of the display unit 38 so that the display unit 38 and the user interface unit 52 form a graphical user interface (GUI). Here, a user touches an icon sign of a desired imaging mode to switch to the touched imaging mode. For example, as shown in FIG. 23B, when the user touches icon sign "screen & monitor" for switching to the presentation-image imaging mode, the imaging mode is switched to the presentation-image imaging mode. Alternatively, a cursor may be displayed on the display unit 38 and may be moved in accordance with a key operation of the user interface unit 52 to select a desired imaging mode.

Figure 24:
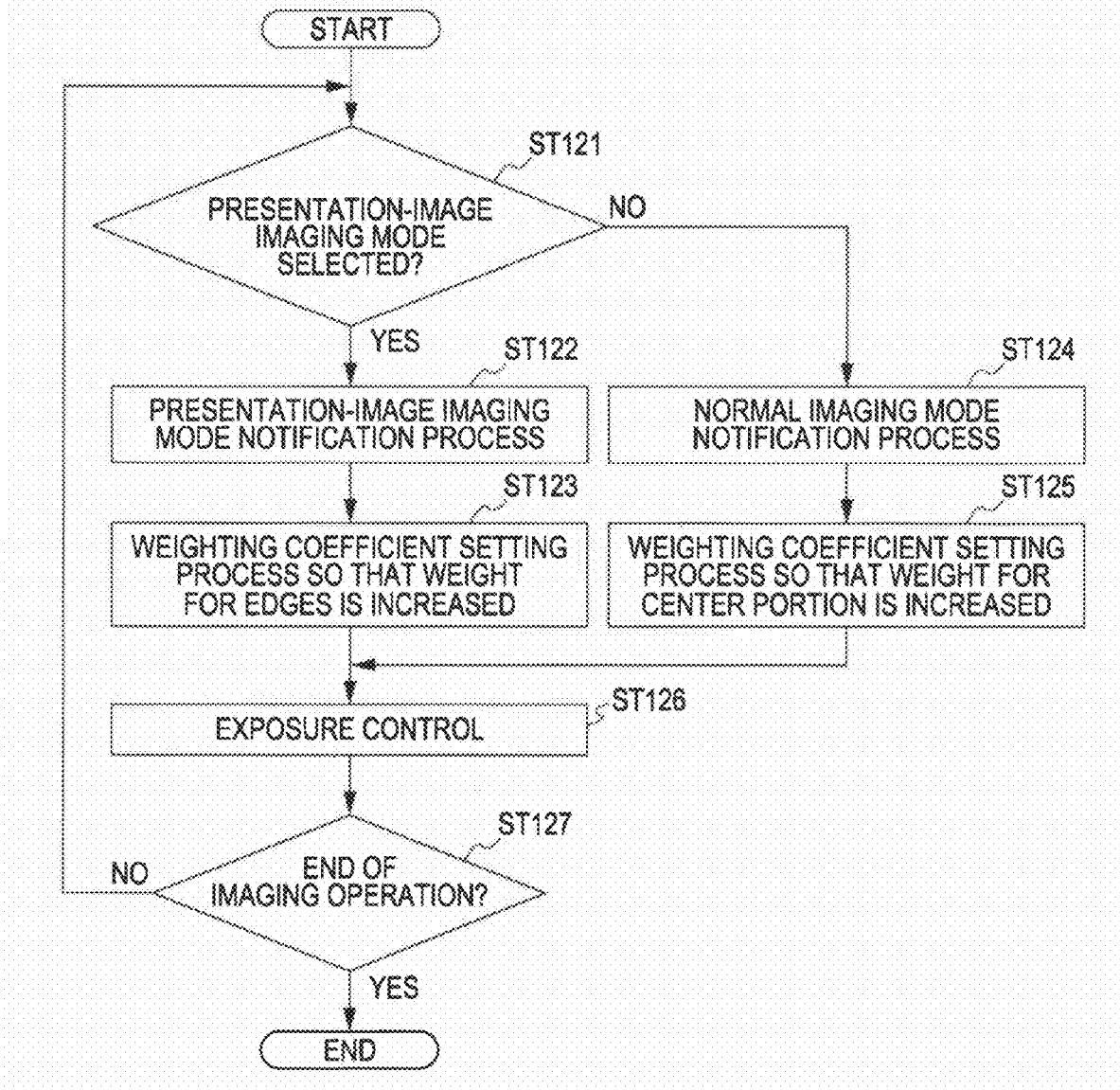
FIG. 24 is a flowchart showing a process of manually switching between imaging modes.

FIG. 24 is a flowchart showing a process of manually switching between imaging modes. In step ST121, the control unit 51 of the imaging apparatus 10B determines whether or not the presentation-image imaging mode is selected. When the user selects the presentation-image imaging mode, the control unit 51 proceeds to step ST122. When the user does not select the presentation-image imaging mode, the control unit 51 proceeds to step ST124. When the user does not select the presentation-image imaging mode, it is assumed that another imaging mode, for example, the normal imaging mode is set.

In step ST122, as in step ST103, the control unit 51 performs a presentation-image imaging mode notification process to notify the user that the imaging apparatus 10B has been set in the presentation-image imaging mode, and proceeds to step ST123.

In step ST123, the control unit 51 controls the detection unit 32 to perform a weighting coefficient setting process in which the weight for the edges of the captured image is increased, and proceeds to step ST126. As described above, a presentation image is often captured so that the presentation image is substantially at the center of the captured image. Therefore, the control unit 51 controls the detection unit 32 to provide a detection area along at least one side of the captured image so as to generate a detection signal JB. Further, instead of using the above-described method of changing a detection area of the detection unit 32 by switching the weights, the control unit 51 may control the detection unit 32 so as to obtain luminance values of only blocks in a detection area of the captured image. In this case, the detection unit 32 supplies the sum of luminance value signals for each block to the control unit 51 as the detection signal JB.

In step ST124, as in step ST105, the control unit 51 performs a normal imaging mode notification process to notify the user that the imaging apparatus 10B has been set in the normal imaging mode, and proceeds to step ST125.

In step ST125, the control unit 51 controls the detection unit 32 to perform a weighting coefficient setting process so that, as in step ST106, the weight for the center is increased, and proceeds to step ST126.

In step ST126, as in step ST107, the control unit 51 performs exposure control on the basis of the detection signal JB generated by the detection unit 32, and proceeds to step ST127.

In step ST127, the control unit 51 determines whether or not the imaging operation ends. The control unit 51 ends the brightness control, for example, when the power of the imaging apparatus 10B is turned off or when the operation of switching the imaging mode to a playback mode for playing back a recorded image is performed. If the power-off operation or the operation of switching to the playback mode is not performed, the control unit 51 returns to step ST121.

Accordingly, even when detection of a presentation image has failed, the switching to the presentation-image imaging mode is performed and a captured image in which the presentation image has appropriate brightness can be obtained. Further, when it is difficult to accurately detect the position of a presentation image due to the low detection accuracy of a presentation image, it is determined whether or not the captured image includes a presentation image in the occasion of detecting a presentation image. When it is determined that the captured image includes a presentation image, the imaging mode is automatically switched to the presentation-image imaging mode, and a detection area is provided along at least one side of the captured image. Thus, the captured image in which the presentation image has appropriate brightness can be obtained.

Figure 25B:
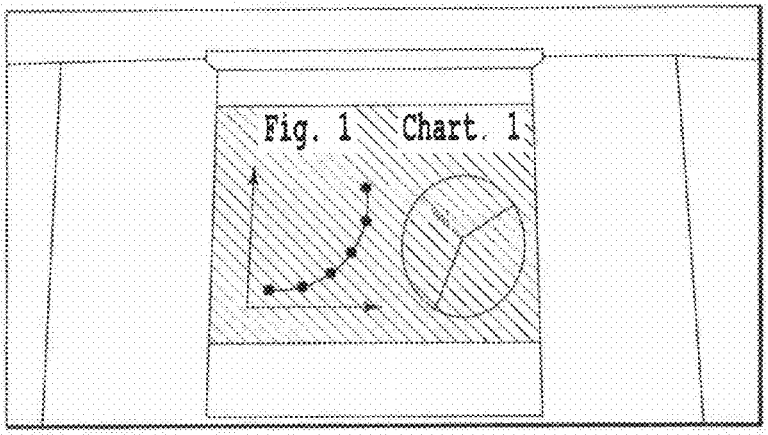
Figure 25C:
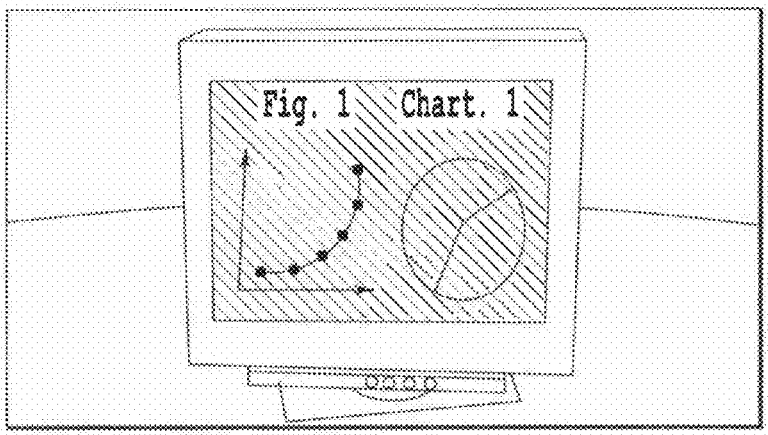
Figure 25D:
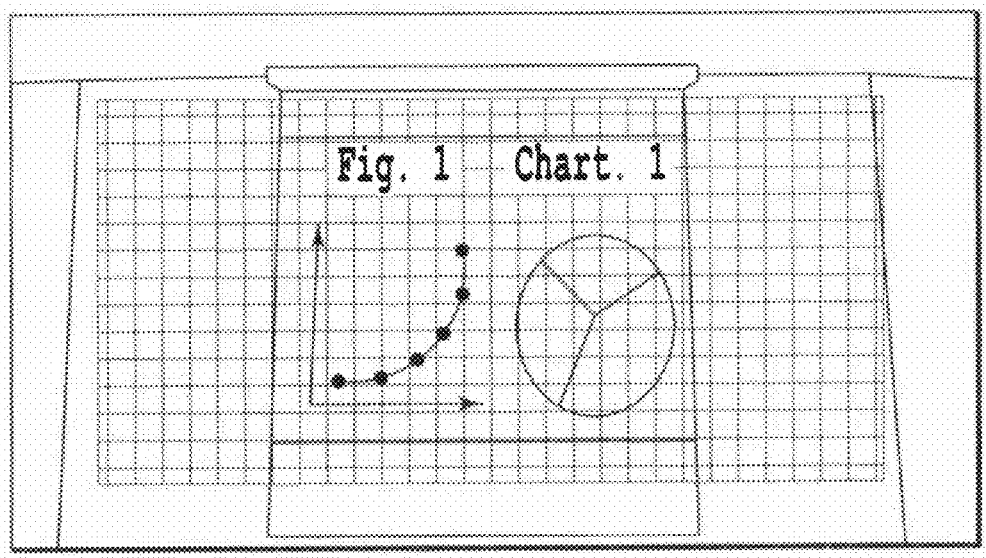
Figure 25E:
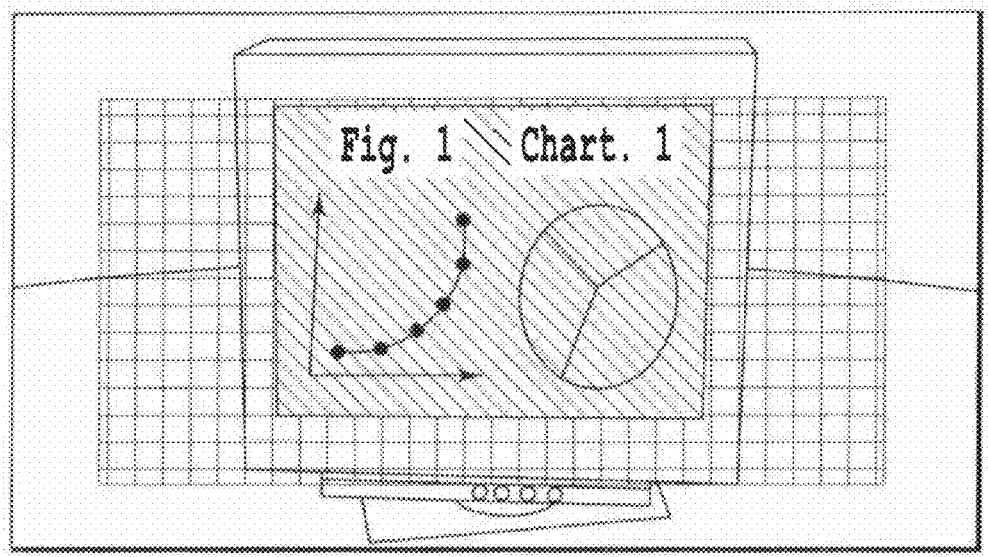

In this manner, when the presentation-image imaging mode is set, high weight is assigned to blocks located along at least one side of the captured image, for example, as shown in FIG. 25A, blocks located along the edges of the captured image, and the weight to remaining blocks (cross-hatched blocks) is set to "0". In this case, as shown in FIGS. 25B and 25C, when a presentation image is captured, as shown in FIGS. 25D and 25E, high weight is assigned to the blocks located along the edges of the captured image so that the blocks corresponding to the presentation image are removed from the detection area. Therefore, even when detection of a presentation image has failed, for example, if the presentation image has a basic color of blue or black, a captured image in which a dark portion such as a black portion in the presentation image does not stand out or in which bright portions such as white letters and figures in the presentation image are prevented from being too bright to cause "white out" can be obtained. Further, strobe light emission is inhibited even when a presentation image is dark, and a captured image in which the presentation image has appropriate brightness can be obtained.

Figure 26A:
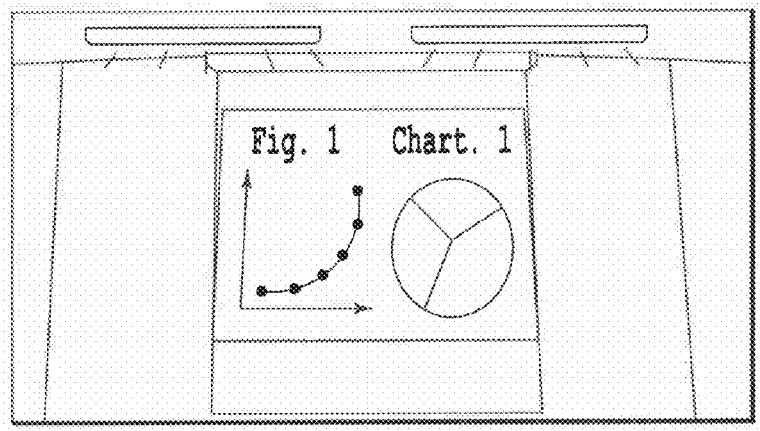
Figure 26B:
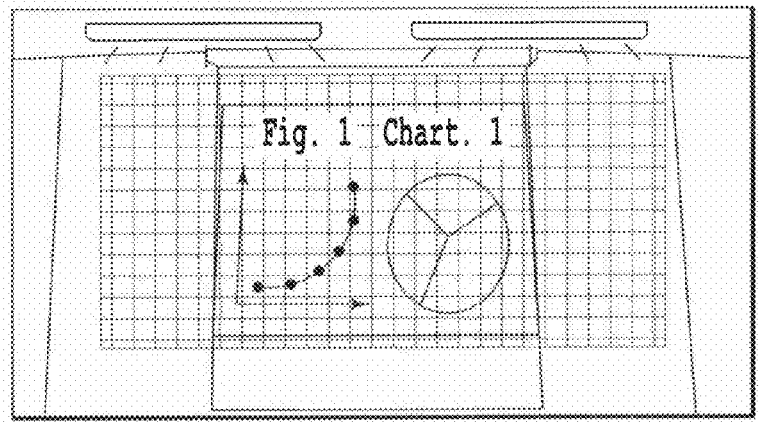
Figure 26C:
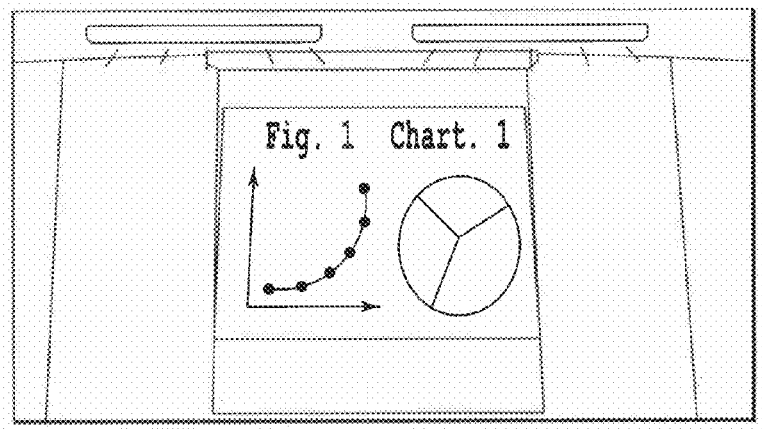

Further, the inconveniences which may be caused in a case where when a presentation image projected on a screen in a room where lighting is turned off is captured, exposure control is performed with fixed settings so that the presentation image has optimum brightness can also be overcome. Specifically, in this case, when the lighting is turned on in the room, the room becomes bright and, as shown in FIG. 26A, the presentation image is too bright to see. However, weighting is performed in the manner shown in FIG. 25A when the presentation-image imaging mode is set, thereby, as shown in FIG. 26B, calculating a detection value based on the edges of the captured image and performing brightness control in accordance with the brightness of the room. Therefore, as shown in FIG. 26C, a captured image with the brightness reduced in accordance with the lighting condition of the room can automatically be obtained.

Figure 27A:
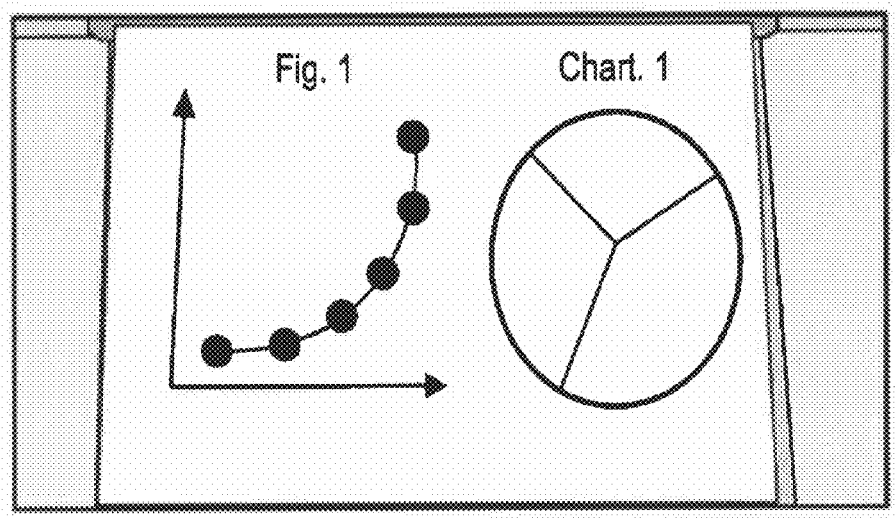
Figure 27B:
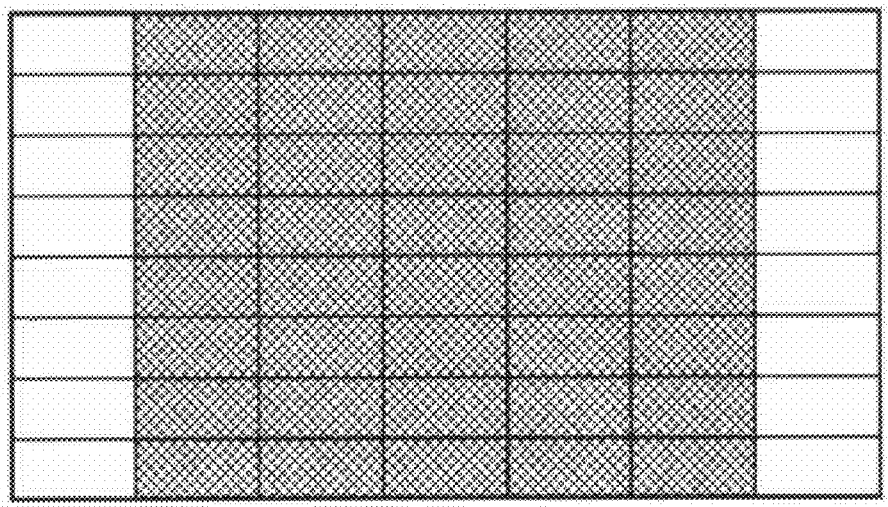

Further, the weighting coefficient setting process in the presentation-image imaging mode is not limited to that shown in FIG. 25A in which high weight is assigned to the upper, lower, left, and right edges of the captured image. For example, in television programs or the like, displayed images generally have an aspect ratio of "16:9". In presentation images projected on screens, on the other hand, the aspect ratio is generally "4:3". If a presentation image projected on a screen is captured from the front, as shown in FIG. 27A, the presentation image is not cast in the left and right edges of the captured image. Therefore, as shown in FIG. 27B, high weight is assigned to blocks located along the left and right edges while low weight, for example, a weight of "0", is assigned to the remaining blocks. Thus, brightness control can easily be performed while being less affected by a presentation image being projected.

Third Embodiment

Next, a third embodiment of the present invention will be described. An imaging apparatus according to the third embodiment has a similar structure to the imaging apparatus 10 shown in FIG. 1, which will not be described herein. The operation of the imaging apparatus 10 according to the third embodiment will now be described with reference to a flowchart shown in FIG. 28. In step ST201, a control unit 51 causes a presentation-image detecting unit 31 to perform presentation-image detection. Then, the control unit 51 proceeds to step ST202 shown in FIG. 28.

Figure 28:
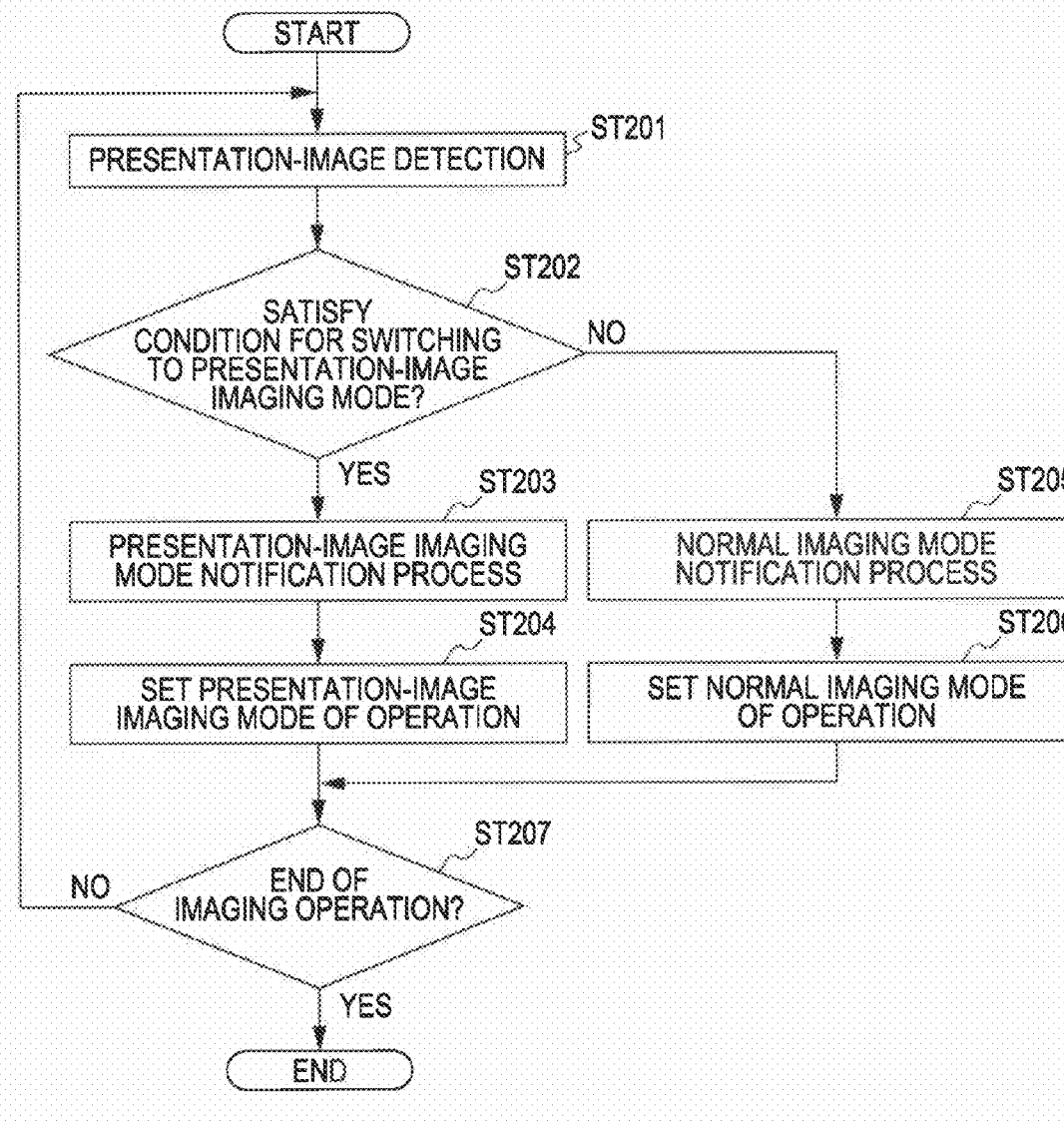
FIG. 28 is a flowchart showing the operation of the imaging apparatus.

In step ST202 shown in FIG. 28, the control unit 51 determines whether or not a condition for switching to the presentation-image imaging mode is satisfied. If it is determined that the condition for switching to the presentation-image imaging mode is satisfied, the control unit 51 proceeds to step ST203. If it is determine that the condition is not satisfied, the control unit 51 proceeds to step ST205.

The control unit 51 determines whether or not the condition for switching to the presentation-image imaging mode is satisfied in accordance with the occurrence of frames where a presentation image has been detected. For example, the control unit 51 counts up each time a frame where a presentation image has been detected is produced, and counts down each time a frame where no presentation image is detected is produced. The count value may be set in the range from "0" to "about several tens". When the count value is greater than or equal to a threshold value determined in advance for the imaging mode determination (hereinafter referred to as a "mode-determination threshold value"), the control unit 51 proceeds to step ST203. If the count value is less than the mode-determination threshold value, the control unit 51 proceeds to step ST205.

Alternatively, the control unit 51 may set an imaging mode on the basis of the number of consecutive frames where a presentation image has been detected or the number of consecutive frames where no presentation image is detected. For example, when the number of consecutive frames where a presentation image has been detected has reached a predetermined value, the control unit 51 may switch the imaging mode from the normal imaging mode to the presentation-image imaging mode. Or, when the number of consecutive frames where no presentation image is detected has reached a predetermined value, the control unit 51 may set the imaging mode from the presentation-image imaging mode to the normal imaging mode. This allows stable switching between the imaging modes according to the detection of a presentation image.

In step ST203, the control unit 51 performs a presentation-image imaging mode notification process, and proceeds to step ST204. The control unit 51 sets the imaging mode to the presentation-image imaging mode, and notifies the user that the imaging apparatus 10 has been set in the presentation-image imaging mode. For example, when the presentation-image imaging mode is set, the control unit 51 generates a display signal HE and supplies the display signal HE to the image processing unit 35 to generate a display image signal HG from the image signal DVa and the display signal HE. Thus, the captured image and information indicating that the presentation-image imaging mode has been set are displayed on the screen of the display unit 38.

In step ST204, the control unit 51 sets the presentation-image imaging mode of operation, and proceeds to step ST207. For example, the control unit 51 controls the detection unit 32 to change a detection area for calculating a detection value used for exposure control to a position less affected by a presentation image. The control unit 51 further controls the white balance adjustment unit 351 or gamma correction unit 352 of the image processing unit 35 to perform white balance adjustment or gamma correction on each of presentation image and background image regions.

In step ST205, the control unit 51 performs a process for notification of an imaging mode different from the presentation-image imaging mode, for example, the normal imaging mode (hereinafter referred to as a "normal imaging mode notification process"), and proceeds to step ST206. The control unit 51 sets the imaging mode to another imaging mode, for example, the normal imaging mode, and notifies the user that the imaging apparatus 10 has been in the normal imaging mode. For example, in a case where when the imaging apparatus 10 is in the presentation-image imaging mode, the display signal HE is supplied to the image processing unit 35 to provide an icon sign MH indicating that the presentation-image imaging mode has been set, the control unit 51 stops the supply of the display signal HE to remove the icon sign MH so that the user can recognize that the normal imaging mode has been set.

In step ST206, the control unit 51 sets the normal imaging mode of operation, and proceeds to step ST207. For example, the control unit 51 controls the detection unit 32 to change a detection area so as to provide exposure control in which the center of the captured image is heavily weighted. The control unit 51 further controls the white balance adjustment unit 351 or gamma correction unit 352 of the image processing unit 35 to perform white balance adjustment or gamma correction on every captured image regardless of in which of the presentation image or background image regions it is performed.

FIGS. 29A to 29C are diagrams describing the operation of the detection unit 32. As shown in FIG. 29A, the detection unit 32 divides a captured image into a plurality of blocks, for example, m by n blocks. When the imaging mode is set to the presentation-image imaging mode, as shown in FIG. 29B, the detection unit 32 increases the weight for blocks located along the edges of the captured image so as to be less affected by a presentation image. Further, when the imaging mode is set to the normal imaging mode, as shown in FIG. 29C, the detection unit 32 sets weighting coefficients so that the weight for blocks corresponding to the center of the captured image can be set high.

When weighting coefficients are set in accordance with the imaging mode, the detection unit 32 forms a detection area in the captured image, and generates a detection signal JR from an image signal in the detection area. Specifically, the detection unit 32 divides the captured image into blocks, and weights a sum of signals indicating the brightness of individual pixels in each block with a weighting coefficient W. The weighted sums are added to calculate a detection value Vjb, and a detection signal JB indicating the detection value Vjb is generated.

Here, if the sum of luminance signals of pixels included in a block given by coordinates (a, b) is presented by BT(a, b) and a weighting coefficient for the block at the coordinates (a, b) is presented by W(a, b), the detection unit 32 generates the detection value Vjb according to Equation (2):

$$Vjb = \Sigma_{a=1, b=1}^{m,n}(W(a,b) \times BT_{(a,b)}) \quad (2)$$

Normalizing the sum of weighting coefficients to 1 yields a normalized detection value Vjb.

The control unit 51 performs exposure control on the basis of the detection signal JB generated by the detection unit 32. Specifically, the control unit 51 generates at least one of the control signals CTb, CTc, and CTd, and supplies the generated control signal CTb, CTc, and CTd to the aperture driving unit 42, the timing signal generation unit 22, and the amplification unit 213, respectively, to perform the aperture setting of the aperture mechanism 12, the adjustment of the exposure time using the timing signal generation unit 22, or the gain adjustment of the image signal Sa using the amplification unit 213 so as to realize appropriate exposure.

FIG. 30 shows the position of achromatic color and a range defining the achromatic color (hereinafter referred to as an "achromatic region"), which are obtained by white balance detection. Here, achromatic color in a presentation image is at a position ACpa in an (R/G)-(B/G) plane detected from a detection signal obtained by performing white balance detection, and achromatic color in a background image is at a position ACpb. In this case, when the imaging mode is set to the presentation-image imaging mode, the white balance adjustment unit 351 determines a white balance correction coefficient from the position ACpa of the achromatic color in the presentation image, and performs white balance adjustment on a presentation image region using this white balance correction coefficient. The white balance adjustment unit 351 further determines a white balance correction coefficient from the position ACpb of the achromatic color in the background image, and performs white balance adjustment on a background image region using this white balance correction coefficient. In FIG. 30, a region ACS represents an achromatic region in an image captured under a standard light source (such as daylight or incandescent light) condition, and a region ACR represents an achromatic region experimentally obtained from an image projected on a screen.

When the imaging mode is set to the normal imaging mode, the white balance adjustment unit 351 detects the position of achromatic color included in the region ACS from the captured image to determine a white balance correction coefficient from the detected position of the achromatic color, and performs white balance adjustment of the captured image using this white balance correction coefficient. That is, when the imaging mode is set to the normal imaging mode, the white balance adjustment unit 351 performs white balance adjustment without separation of the presentation image and background image regions.

Figure 31A:
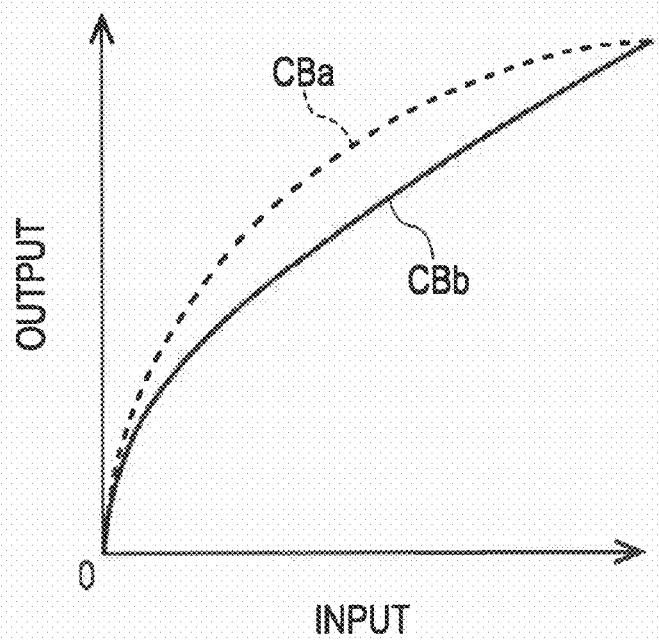
FIGS. 31A and 31B are diagrams showing correction characteristics of a gamma correction unit.
Figure 31B:
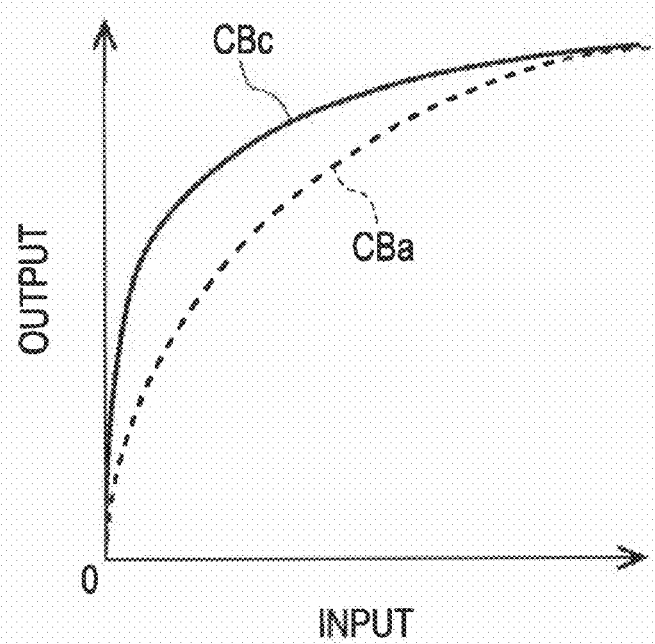

FIGS. 31A and 31B show correction characteristics of the gamma correction unit 352. When the imaging mode is set to the presentation-image imaging mode, the gamma correction unit 352 performs gamma correction on a presentation image region using, as shown in FIG. 31A, a gamma curve CBb whose characteristic is corrected so as to compress the luminance level of a higher-luminance portion than that for a gamma curve CBa used in the normal imaging mode. The gamma correction unit 352 further performs gamma correction on a background image region using, as shown in FIG. 31B, a gamma curve CBc whose characteristic is corrected so as to expand the luminance level of a lower-luminance portion than that for the normal gamma curve CBa. When the imaging mode is set to the normal imaging mode, the gamma correction unit 352 performs gamma correction using the normal gamma curve CBa shown in FIGS. 31A and 31B without separation of the presentation image and background image regions.

In step ST207, the control unit 51 determines whether or not the imaging operation ends. The control unit 51 ends the operation, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST201.

In this manner, the imaging apparatus 10 is configured such that the imaging mode is automatically set to the presentation-image imaging mode or the normal imaging mode in accordance with a result of presentation-image detection. Here, when a presentation image is detected and the imaging mode is set to the presentation-image imaging mode, exposure control, white balance adjustment, or gamma correction is performed so that a high-quality presentation image and background image can be shown in the captured image. When the imaging mode is set to the normal imaging mode since no presentation image is detected, on the other hand, exposure control, white balance adjustment, or gamma correction is performed according to the captured image without separation of presentation image and background image regions.

Therefore, imaging modes can be switched automatically, rather than manually. Further, since it is not necessary to make operation settings each time the presentation-image imaging mode is set, a captured image including a high-quality presentation image or the like can easily be obtained. For example, a desired captured image having no "white out" or discoloration in a presentation image and having no "black out" in a background image can be obtained. Further, the occurrence of undesired strobe light emission can be prevented when a presentation image is captured. In addition, the presentation-image imaging mode can automatically be terminated when the imaging apparatus 10 detects the end of the presentation-image imaging mode. The user can save time to terminate the presentation-image imaging mode by, for example, operating a menu button.

A presentation image may be detected using various methods other than, as described above, determining a horizontal distribution and a vertical distribution from a binary image to detect the sides of the presentation image. For example, as disclosed in Japanese Unexamined Patent Application Publication No. 2007-148612, contour extraction may be performed and a presentation image region may be detected from an extracted contour.

Incidentally, when a presentation image is captured, for example, when an event scene such as a scheduled presentation is captured, the capture is often performed with a fixed angle of view using an imaging apparatus placed on a tripod or the like. Such a condition of the imaging apparatus may be taken into account to switch between imaging modes.

FIG. 32 is a flowchart showing another operation of the imaging apparatus 10 in which the switching between imaging modes is performed by taking the conditions of the imaging apparatus 10 into account. In step ST211, as in step ST201, the control unit 51 causes the presentation-image detecting unit 31 to perform presentation-image detection, and proceeds to step ST212.

In step ST212, the control unit 51 determines whether or not a condition for switching to the presentation-image imaging mode is satisfied. If it is determined that the condition for switching to the presentation-image imaging mode is satisfied, the control unit 51 proceeds to step ST213. If it is determined that the condition is not satisfied, the control unit 51 sets the imaging mode to the normal imaging mode, and proceeds to step ST216. As described above, the control unit 51 determines whether or not the condition for switching to the presentation-image imaging mode is satisfied in accordance with the occurrence of frames where a presentation image has been detected.

In step ST213, the control unit 51 determines whether or not the presentation image in the captured image is in a stable state. If the presentation image in the captured image is not changed in position or size, it is determined that the presentation image in the captured image is in a stable state. In this case, the control unit 51 sets the imaging mode to the presentation-image imaging mode, and proceeds to step ST214. If it is determined that the presentation image is not in the stable state, the control unit 51 proceeds to step ST218.

The presentation image in the captured image may be changed in position or size, for example, when the direction of imaging of the imaging apparatus 10 changes or when a zoom operation is performed. Thus, the control unit 51 determines whether or not the amount of motion of the imaging apparatus 10 is greater than or equal to a predetermined value on the basis of the sensor signal SS from the motion detection unit 53. If the amount of motion is less than the predetermined value, it is determined that the presentation image is in the stable state. If the amount of motion is greater than or equal to the predetermined value, it is determined that the presentation image is not in the stable state. Further, when a zoom operation is performed on the basis of the operation signal PS from the user interface unit 52, the control unit 51 determines that the presentation image is not in the stable state. If no zoom operation is performed, the control unit 51 determines that the presentation image is in the stable state.

In step ST214, as in step ST203, the control unit 51 performs a presentation-image imaging mode notification process, and proceeds to step ST215.

In step ST215, as in step ST204, the control unit 51 sets the presentation-image imaging mode of operation, and proceeds to step ST218. For example, the control unit 51 controls the detection unit 32 to change a detection area for calculating a detection value used for exposure control to a position less affected by the presentation image. The control unit 51 further causes the white balance adjustment unit 351 or gamma correction unit 352 of the image processing unit 35 to perform white balance adjustment or gamma correction for each of presentation image and background image regions.

In step ST216, as in step ST205, the control unit 51 performs a normal imaging mode notification process, and proceeds to step ST217.

In step ST217, as in step ST206, the control unit 51 sets the normal imaging mode of operation, and proceeds to step ST218. For example, the control unit 51 controls the detection unit 32 to change a detection area so as to provide exposure control in which, for example, the center of the captured image is heavily weighted. The control unit 51 further causes the white balance adjustment unit 351 or gamma correction unit 352 of the image processing unit 35 to perform white balance adjustment or gamma correction regardless of in which of the presentation image and background image regions it is performed.

In step ST218, the control unit 51 determines whether or not the imaging operation ends. The control unit 51 ends the operation, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST211.

In this manner, the presentation-image imaging mode is not set unless the presentation image is in the stable state, and frequent mode change can be prevented. The switching to the presentation-image imaging mode when the presentation image is not in the stable state can also be prevented.

Figure 33:
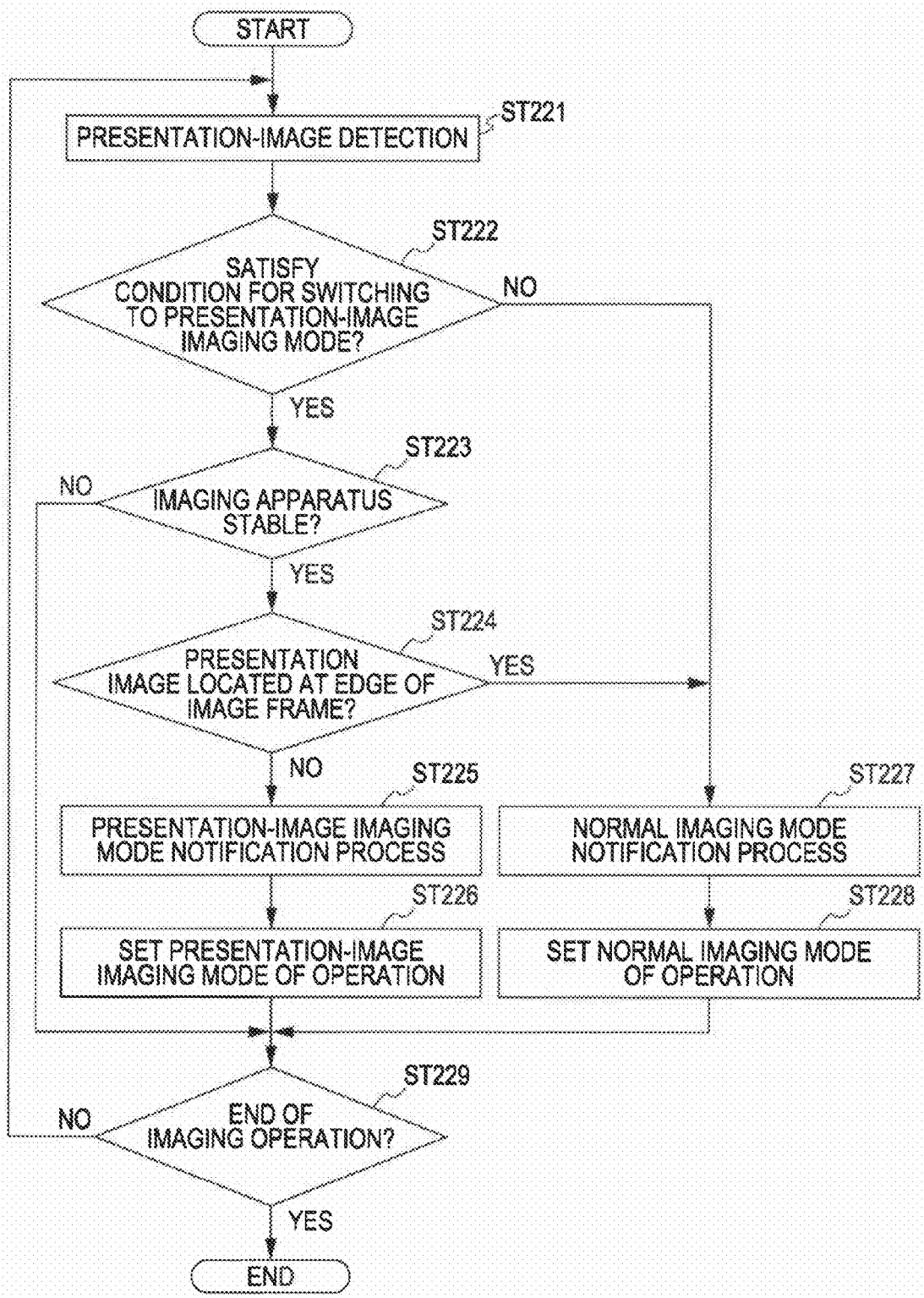
FIG. 33 is a flowchart showing another operation of the imaging apparatus.

The imaging apparatus 10 may also be configured to switch imaging modes in accordance with the position of a detected presentation image. FIG. 33 is a flowchart showing another operation of the imaging apparatus 10 in which imaging modes are switched in accordance with the position of a detected presentation image. In step ST221, as in step ST201, the control unit 51 causes the presentation-image detecting unit 31 to perform presentation-image detection, and proceeds to step ST222.

In step ST222, the control unit 51 determines whether or not a condition for switching to the presentation-image imaging mode is satisfied. If it is determined that the condition for switching to the presentation-image imaging mode is satisfied, the control unit 51 proceeds to step ST223. If it is determined that the condition is not satisfied, the control unit 51 sets the imaging mode to the normal imaging mode, and proceeds to step ST227. As described above, the control unit 51 determines whether or not the condition for switching to the presentation-image imaging mode is satisfied in accordance with the occurrence of frames where a presentation image has been detected.

In step ST223, as in step ST213, the control unit 51 determines whether or not the presentation image is in the stable state. If it is determined that the presentation image is in the stable state, the control unit 51 proceeds to step ST224. If it is determined that the presentation image is not in the stable state, the control unit 51 proceeds to step ST229.

In step ST224, the control unit 51 determines whether or not the position of the presentation image detected in step ST221 has been shifted to an edge of the captured image. If it is determined that the position of the presentation image has not been shifted to an edge of the captured image, the control unit 51 proceeds to step ST225. If it is determined that the position has been shifted to an edge of the captured image, the control unit 51 proceeds to step ST227.

Figure 34:
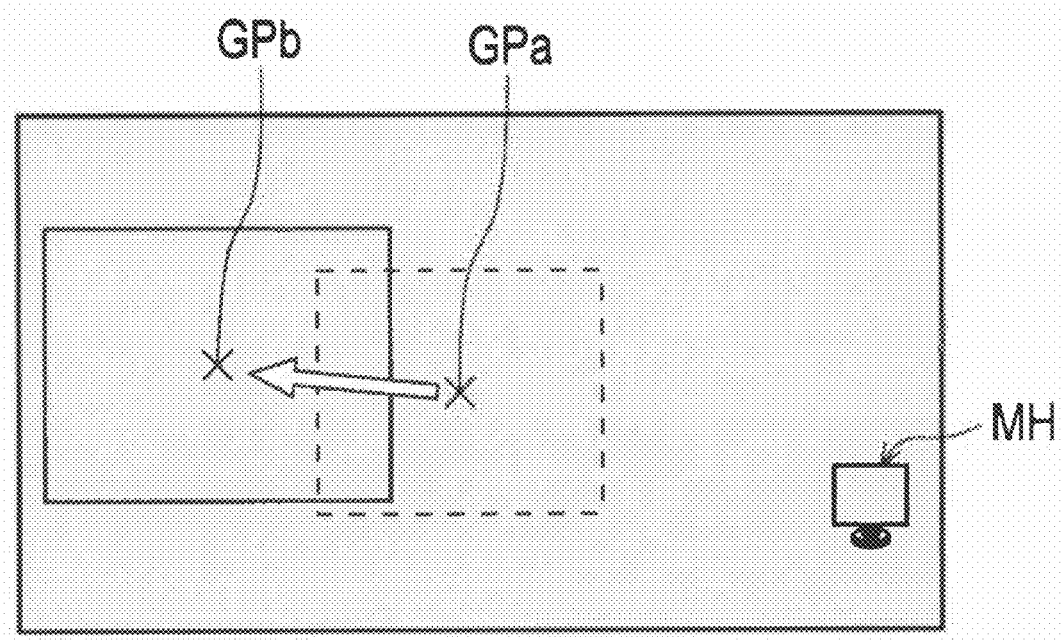
FIG. 34 is a diagram showing a shift of a presentation image.

FIG. 34 shows a shift of a presentation image. Here, for example, when the amount of motion of the imaging apparatus 10 is smaller than a predetermined value and when, for example, a center position GPa of the presentation image is shifted toward an edge of the captured image and located at a position GPb, it is determined that the presentation image has been shifted to the edge of the captured image. In this manner, when the presentation image is shifted to an edge of the captured image, the control unit 51 determines that the object of interest of the user has been changed from the presentation image to another object, and proceeds to step ST227. If it is determined that the presentation image has not been shifted to an edge of the captured image, the control unit 51 proceeds to step ST225.

In step ST225, as in step ST203, the control unit 51 performs a presentation-image imaging mode notification process, and proceeds to step ST226.

In step ST226, as in step ST204, the control unit 51 sets the presentation-image imaging mode of operation, and proceeds to step ST229. For example, the control unit 51 controls the detection unit 32 to change a detection area for calculating a detection value used for exposure control to a position less affected by the presentation image. The control unit 51 further causes the white balance adjustment unit 351 or gamma correction unit 352 of the image processing unit 35 to perform white balance adjustment or gamma correction for each of the presentation image and background image regions.

In step ST227, as in step ST205, the control unit 51 performs a normal imaging mode notification process, and proceeds to step ST228.

In step ST228, as in step ST206, the control unit 51 sets the normal imaging mode of operation, and proceeds to step ST229. For example, the control unit 51 controls the detection unit 32 to change a detection area so as to provide exposure control in which, for example, the center of the captured image is heavily weighted. The control unit 51 further causes the white balance adjustment unit 351 or gamma correction unit 352 of the image processing unit 35 to perform white balance adjustment or gamma correction regardless of in which of the presentation image and background image regions it is performed.

In step ST229, the control unit 51 determines whether or not the imaging operation ends. The control unit 51 ends the operation, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST221.

In this manner, imaging modes are switched depending on whether or not the presentation image is in the stable state or whether or not the presentation image has been shifted to an edge of the captured image. Thus, imaging modes can automatically be switched while taking the object of interest of the user who is capturing an image into account.

Further, imaging modes may also be switched in accordance with a result of presentation-image detection and an instruction given by a user.

FIG. 35 is a flowchart showing another operation of the imaging apparatus 10 in which imaging modes are switched in accordance with a result of presentation-image detection and an instruction given by a user. In step ST231, as in step ST201, the control unit 51 causes the presentation-image detecting unit 31 to perform presentation-image detection, and proceeds to step ST232.

In step ST232, the control unit 51 determines whether or not a condition for switching to the presentation-image imaging mode is satisfied. If it is determined that the condition for switching to the presentation-image imaging mode is satisfied, the control unit 51 proceeds to step ST233. If it is determined that the condition is not satisfied, the control unit 51 sets the imaging mode to the normal imaging mode, and proceeds to step ST237. As described above, the control unit 51 determines whether or not the condition for switching to the presentation-image imaging mode is satisfied in accordance with the occurrence of frames where a presentation image has been detected.

In step ST233, the control unit 51 notifies the user of a result of the presentation-image detection, and proceeds to step ST234.

In step ST234, the control unit 51 determines whether or not the user has performed an operation of specifying a presentation image. If it is determined that the user has performed an operation for specifying a presentation image, the control unit 51 proceeds to step ST235. If the user has performed an operation for specifying a background image which is different from a presentation image, the control unit 51 proceeds to step ST237.

Figure 36A:
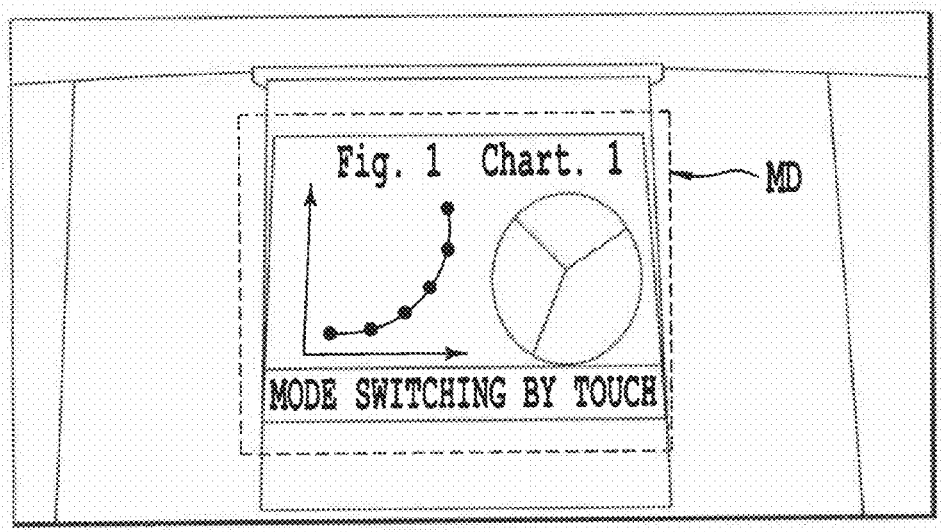
FIGS. 36A to 36D are diagrams describing a result of presentation-image detection and a user instruction operation.
Figure 36B:
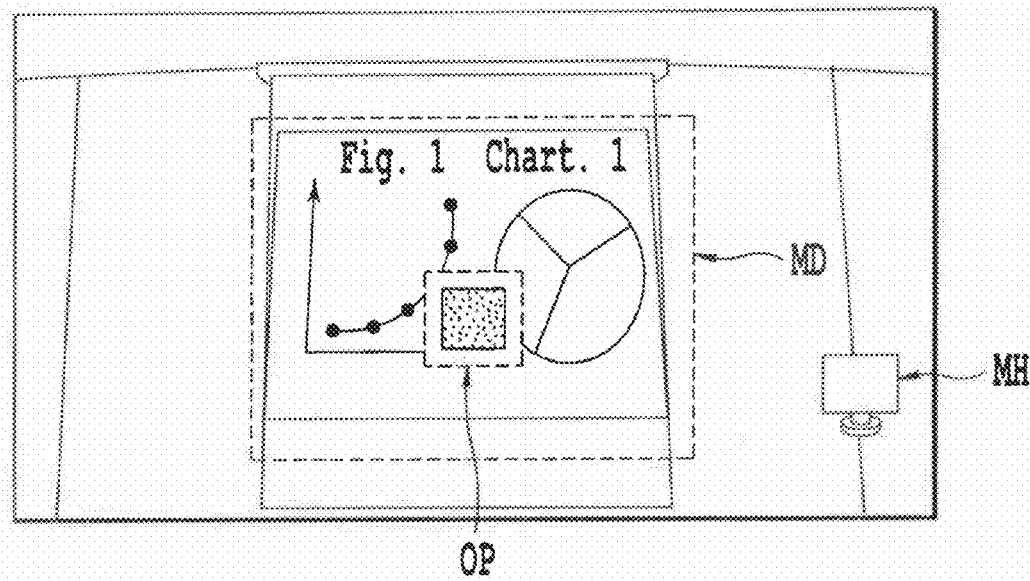
Figure 36C:
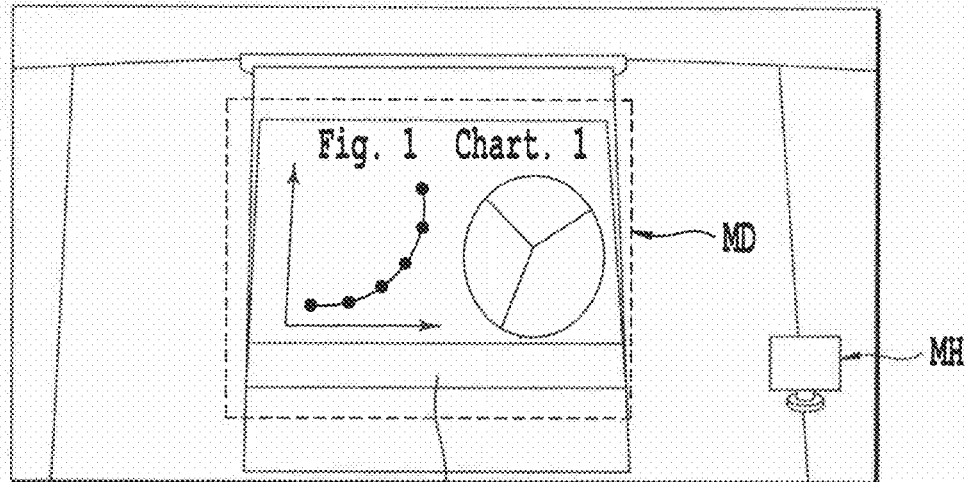
Figure 36D:
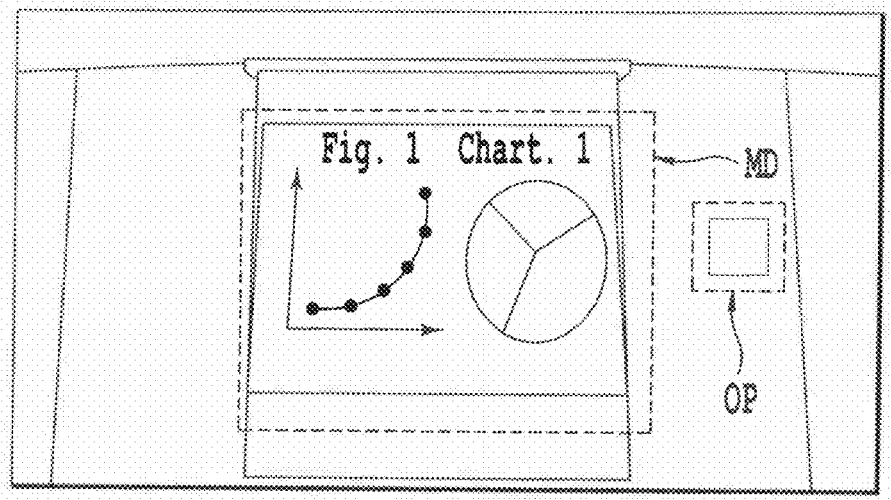

FIGS. 36A to 36D are diagrams describing a result of presentation-image detection and a user instruction operation. The control unit 51 generates a display signal HE on the basis of a detection signal JA. Then, the control unit 51 supplies the generated display signal HE to the image processing unit 35 to generate a display image signal HG from the image signal DVa and the display signal HE. Thus, as shown in FIG. 36A, a captured image and an indication that allows the user to identify a detected presentation image region, for example, a detection frame MD, are displayed on the screen of the display unit 38. Here, when the user specifies a portion in the display frame MD, for example, when, as shown in FIG. 36B, a portion OP pressed by the user is detected to be located in the display frame MD, the control unit 51 determines that the user has performed an operation for specifying a presentation image, and proceeds to step ST235. When the user specifies a portion outside the display frame MD, for example, when, as shown in, FIG. 36D, a portion OP pressed by the user is detected to be located outside the display frame MD in a state where, as shown in FIG. 36C, the presentation-image imaging mode is set, the control unit 51 determines that the user has performed an operation for specifying a background image, and proceeds to step ST237.

In step ST235, as in step ST203, the control unit 51 performs a presentation-image imaging mode notification process, and proceeds to step ST236.

In step ST236, as in step ST204, the control unit 51 sets the presentation-image imaging mode of operation, and proceeds to step ST239. For example, the control unit 51 controls the detection unit 32 to change a detection area for calculating a detection value used for exposure control to a position less affected by the presentation image. The control unit 51 further causes the white balance adjustment unit 351 or gamma correction unit 352 of the image processing unit 35 to perform white balance adjustment or gamma correction for each of presentation image and background image regions.

In step ST237, as in step ST205, the control unit 51 performs a normal imaging mode notification process, and proceeds to step ST238.

In step ST238, as in step ST206, the control unit 51 sets the normal imaging mode of operation, and proceeds to step ST239. For example, the control unit 51 controls the detection unit 32 to change a detection area so as to provide exposure control in which, for example, the center of the captured image is heavily weighted. The control unit 51 further causes the white balance adjustment unit 351 or gamma correction unit 352 of the image processing unit 35 to perform white balance adjustment or gamma correction regardless of in which of the presentation image and background image regions it is performed.

In step ST239, the control unit 51 determines whether or not the imaging operation ends. The control unit 51 ends the operation, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST231.

In this manner, the user is notified of a result of presentation-image detection, and the presentation-image imaging mode is set when the user performs an operation for specifying a presentation image. This can prevent exposure control, white balance adjustment, gamma correction, or the like from being performed on the basis of an erroneous detection result if an error occurs in the detection of a presentation image. Further, a user can merely specify a portion in the notified detection result to switch to the presentation-image imaging mode. This facilitates switching to the presentation-image imaging mode without performing existing operations such as displaying an operation menus, selecting an imaging mode switching menu from the operation menus, and selecting the presentation-image imaging mode from the imaging mode switching menu. Further, when a presentation image is detected, the display frame MD is displayed, which allows the user to easily recognize that the switching to the presentation-image imaging mode is available.

Note that the presentation-image imaging mode may be terminated in accordance with a change of an object without using a result of presentation-image detection. For example, when a target object to be captured is changed from a presentation image to a person, the presentation-image imaging mode may be terminated.

Figure 37:
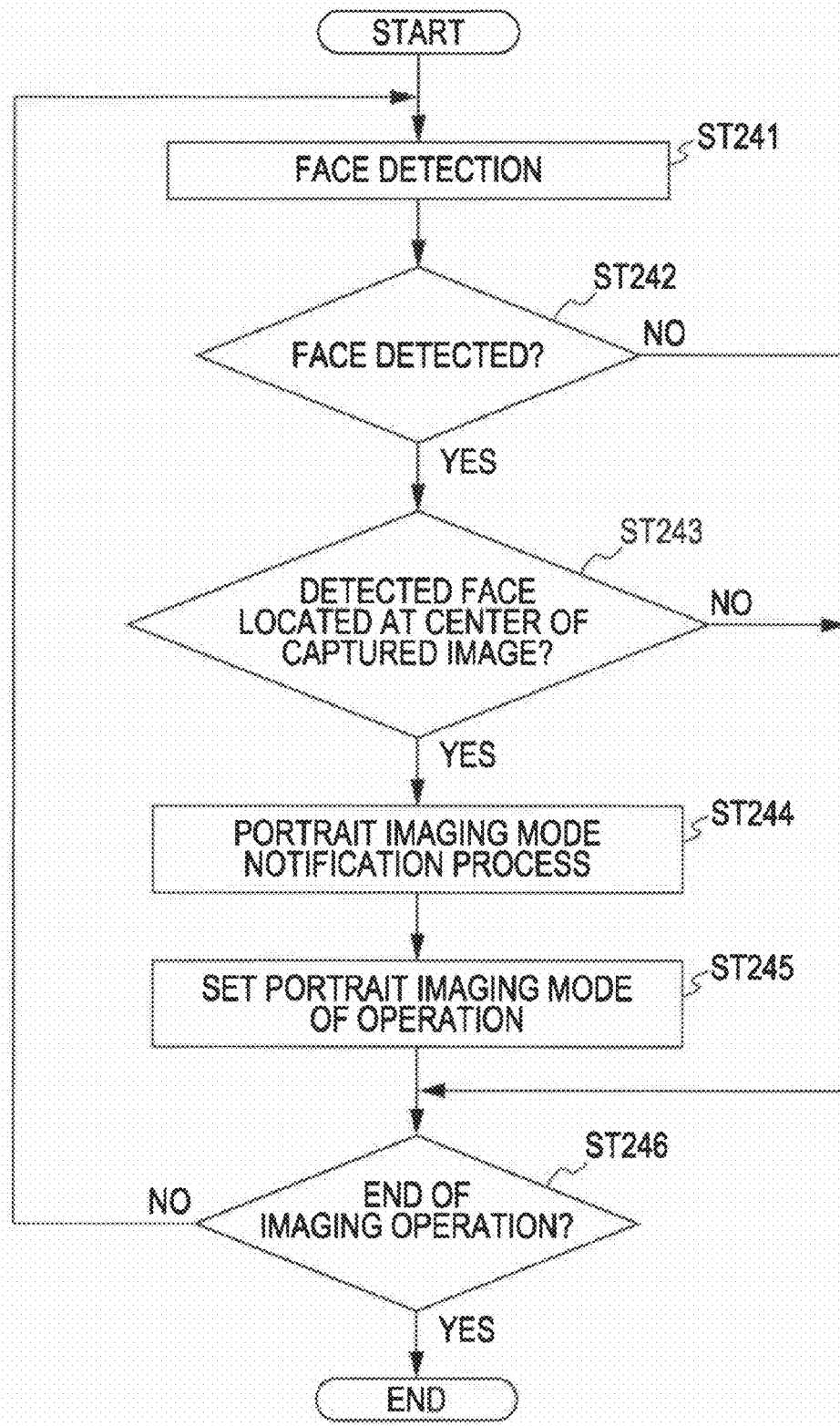
FIG. 37 is a flowchart showing another operation of the imaging apparatus.

FIG. 37 is a flowchart showing an operation for switching between imaging modes in accordance with a result of face detection. In step ST241, the control unit 51 performs face detection, and proceeds to step ST242.

In the face detection, a face is detected based on the face shape or a skin-color area. For example, a method of searching a captured image for a shape of a face using a genetic algorithm, constructing a discriminator for face detection using machine learning, or any other general technique may be used to detect a face image.

In step ST242, the control unit 51 determines whether or not a face has been detected. If it is determined that a face has been detected, the control unit 51 proceeds to step ST243. If no face is detected, the control unit 51 proceeds to step ST246.

In step ST243, the control unit 51 determines whether or not the detected face is located at the center of the captured image. If the detected face is located at the center of the captured image, the control unit 51 switches from the presentation-image imaging mode to another imaging mode, for example, a portrait imaging mode, and proceeds to step ST244. If the detected face is not located at the center, the control unit 51 proceeds to step ST246.

In step ST244, the control unit 51 performs a portrait imaging mode notification process, then proceeds to step ST245. The control unit 51 sets the imaging mode to the portrait imaging mode, and notifies the user that the imaging apparatus 10 has been set in the portrait imaging mode. For example, when the portrait imaging mode is set, the control unit 51 generates a display signal HE and supplies the display signal HE to the image processing unit 35 to generate a display image signal HG from the image signal DVa and the display signal HE. Thus, the captured image and information indicating that the portrait imaging mode has been set are displayed on the displayed screen of the display unit 38. FIG. 38 shows the screen of the display unit 38 on which an icon sign MM indicating that the portrait imaging mode has been set is displayed. In FIG. 38, a frame indication ME indicating the position of the detected face is also displayed.

In step ST245, the control unit 51 sets the portrait imaging mode of operation, and proceeds to step ST246. The control unit 51 performs exposure control, white balance adjustment, or gamma correction so that the captured face image can optimally be displayed. For example, the control unit 51 changes a detection area for calculating a detection value used for exposure control to the location of the detected face, or performs processes such as white balance adjustment so as to provide the person's face with an appropriate color and gamma correction so as not to cause "white out" in the face image.

In step ST246, the control unit 51 determines whether or not the imaging operation ends. The control unit 51 ends the operation, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST241. In this manner, a change of the object of interest of the user from a presentation image to a person is detected and imaging modes can automatically be switched.

FIGS. 39 and 40 show a summary of the operations of the imaging apparatus 10 described above. FIG. 39 shows the relationship between the processes of starting the presentation-image imaging mode, changing a detection area, performing white balance adjustment for each region, and performing gamma correction for each region, and methods of detecting a presentation image.

In simple presentation-image detection, for example, the method shown in FIG. 5 for detecting upper and lower sides and left and right sides by obtaining a horizontal distribution and a vertical distribution, respectively, from a binary signal obtained by performing a binarization process, a presentation image can quickly be detected as compared with high-accuracy presentation-image detection, for example, a method in which edge detection of a captured image is performed to obtain a contour indicating the boundary between a presentation image and a background image and in which the four vertices or four lines indicating sides of a presentation image are determined from information regarding the obtained contour to detect a presentation image. In the high-accuracy presentation-image detection, on the other hand, a presentation image region in a captured image can accurately be detected as compared with the simple presentation-image detection.

Here, in the starting of the presentation-image imaging mode or the changing of a detection area, it is not necessary to detect a presentation image region with high accuracy. In the region-based white balance adjustment and region-based gamma correction, however, it is preferable that a presentation image region be detected with high accuracy. Therefore, as shown in FIG. 39, the simple presentation-image detection is preferably used in the starting of the presentation-image imaging mode or the changing of a detection area, and the high-accuracy presentation-image detection is preferably used in the region-based white balance adjustment and region-based gamma correction.

Further, in the simple presentation-image detection described above, when a presentation image is captured from the front, the presentation image can be detected with high accuracy because the sides of the presentation image in the captured image extend substantially horizontally and vertically. If a presentation image is captured diagonally, however, the sides of the presentation image in the captured image may be inclined with respect to the horizontal or vertical direction, resulting in low detection accuracy of the presentation image. In the region-based white balance adjustment or region-based gamma correction, therefore, the simple presentation-image detection is not preferable when a presentation image is not captured from the front. In FIG. 39, a circle mark denotes "preferable", and a cross (X) mark denotes "not preferable". A triangle mark denotes "conditionally preferable".

FIG. 40 shows the relationship between the processes of changing a detection area, performing white balance adjustment for each region, and performing gamma correction for each region, and actions for imaging. When the presentation image is shifted to an edge of the captured image, the control unit 51 terminates the process of changing a detection area, and performs exposure control so that, for example, the weight for the center of the captured image is increased. Further, the operations of performing white balance adjustment and gamma correction for each region are maintained even when the presentation image is shifted to an edge of the captured image.

When the imaging apparatus 10 is greatly moved or a zoom operation is performed, the control unit 51 maintains the operations of performing exposure control so that the weight for the edges of the captured image is increased and performing white balance adjustment and gamma correction for each region.

Further, when a human face detected in face detection is located at the center of the captured image and when no presentation image is detected, the control unit 51 terminates the operations of performing exposure control so that the weight for the edges of the captured image is increased and performing white balance adjustment and gamma correction for each region. That is, the control unit 51 performs exposure control so that the weight for the center of the captured image is increased and performs white balance adjustment and gamma correction without separation of regions in the captured image.

Further, the changing of a detection area, the region-based white balance adjustment, and the region-based gamma correction may be performed in accordance with a plurality of actions for imaging. FIG. 41 shows exemplary applicability of the processes of changing a detection area, performing white balance adjustment for each region, and performing gamma correction for each region in accordance with a combination of actions for imaging.

When the presentation image is shifted to an edge of the captured image, the control unit 51 terminates the changing of a detection area, and performs exposure control so that, for example, the weight for the center of the captured image is increased. Further, white balance adjustment and gamma correction are performed with the previous settings maintained unchanged even when the presentation image is shifted to an edge of the captured image. Here, when the imaging apparatus 10 is greatly moved or when a zoom operation is performed, the operations of performing white balance adjustment and gamma correction for each region are terminated.

Further, for example, when a zoom operation is performed or when the imaging apparatus 10 is greatly moved when a zoom operation is performed, the control unit 51 performs the changing of a detection area, white balance adjustment, and gamma correction with the previous settings maintained unchanged. Here, when the presentation image is shifted to an edge of the captured image, the operations of performing the changing of a detection area and white balance adjustment and gamma correction for each region are terminated. That is, the control unit 51 performs exposure control so that the weight for the center of the captured image is increased and performs white balance adjustment and gamma correction without separation of regions in the captured image.

Accordingly, the imaging mode can be set to the presentation-image imaging mode in conditions suitable for the presentation-image imaging mode in consideration of various conditions. In an imaging scene including a presentation image and a person, such as a presentation scene, the face detection result or motion detection result may be used to automatically determine which object the user is paying attention to during photographing to perform switching between shooting modes. Therefore, a desired captured image can be obtained in an imaging mode according to the user's intention.

Fourth Embodiment

Next, a fourth embodiment of the present invention will be described. The components of an imaging apparatus according to the fourth embodiment are the same as or similar to those of the imaging apparatus 10 shown in FIG. 1, and detailed descriptions thereof are thus omitted.

The image processing unit 35 performs various image processes on the image signal DVa supplied from the A/D conversion unit 23. For example, the white balance (WB) adjustment unit 351 performs white balance adjustment so that a white object in a captured image can correctly be displayed in white. The gamma correction unit 352 performs level conversion of an image signal using a predetermined gamma curve. The gamma correction unit 352 further performs gamma correction with different characteristics on the region of an image determined to be a presentation image and the region of an image determined to be a background image according to the detection signal JA from the presentation-image detecting unit 31. For example, gamma correction is performed on the region of an image determined to be a presentation image so as not to cause "white out", and gamma correction is performed on the region of an image determined to be a background image so as not to cause "black out".

The control unit 51 further switches imaging modes on the basis of the detection signal JA from the presentation-image detecting unit 31, and supplies a control signal CTe according to the imaging mode to the image processing unit 35 to switch gamma correction operations in accordance with the imaging mode.

The control unit 51 generates at least one of control signals CTb, CTc, and CTd so that a detection value indicated by the detection signal JB supplied from the detection unit 32 becomes equal to a predetermined reference value. The control unit 51 supplies the generated control signals CTb, CTc, and CTd to the aperture driving unit 42, the timing signal generation unit 22, and the amplification unit 213, respectively, to perform the aperture setting of the aperture mechanism 12, the adjustment of the exposure time of the imaging element 211, or the gain adjustment of the image signal Sa so as to realize appropriate exposure. The control unit 51 further performs processes such as generating a control signal CTa and supplying the control signal CTa to the lens driving unit 41 to drive the focus lens of the lens unit 11 so that an in-focus object image can be formed in an in-focus state on the light receiving surface of the imaging element 211.

Next, the operation of the imaging apparatus 10 will be described. FIG. 42 is a flowchart showing a gamma correction operation. In step ST301, the control unit 51 causes the presentation-image detecting unit 31 to perform presentation-image detection, and proceeds to step ST302. When an image presented by a presentation device is captured, the presentation-image detecting unit 31 detects a presentation image region in the captured image, generates a detection signal JA indicating a detection result, and supplies the detection signal JA to the image processing unit 35 and the control unit 51. Then, the control unit 51 proceeds to step ST302 shown in FIG. 42.

The detection of a presentation image region is not limited to the process shown in FIG. 5, and any other detection method as described above may be used. For example, a presentation image region may be detected by performing edge detection of a captured image to obtain a contour indicating the boundary between a presentation image and a background image and determining the four vertices or four lines indicating sides of the presentation image from information regarding the obtained contour.

In step ST302 shown in FIG. 42, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST303. If it is determined that the condition is not satisfied, the control unit 51 sets the imaging mode to another imaging mode (for example, the normal imaging mode), and proceeds to step ST305.

The control unit 51 determines whether or not the condition for switching to the presentation-image imaging mode is satisfied in accordance with the occurrence of frames where a presentation image has been detected. For example, the control unit 51 counts up each time a frame where a presentation image has been detected is produced, and counts down each time a frame where no presentation image is detected is produced. The count value may be set in the range from "0" to "about several tens". When the count value is greater than or equal to a threshold value determined in advance for the imaging mode determination (hereinafter referred to as a "mode-determination threshold value"), the control unit 51 sets the presentation-image imaging mode. If the count value is less than the mode-determination threshold value, the control unit 51 sets the normal imaging mode.

Alternatively, the control unit 51 may set an imaging mode on the basis of the number of consecutive frames where a presentation image has been detected or the number of consecutive frames where no presentation image is detected. For example, when the number of consecutive frames where a presentation image has been detected has reached a predetermined value, the control unit 51 may switch the imaging mode from the normal imaging mode to the presentation-image imaging mode. Or, when the number of consecutive frames where no presentation image is detected has reached a predetermined value, the control unit 51 may set the imaging mode from the presentation-image imaging mode to the normal imaging mode. This allows stable switching between the imaging modes according to the detection of a presentation image.

In step ST303, the control unit 51 performs a presentation-image imaging mode notification process, and proceeds to step ST304. The control unit 51 notifies the user that the imaging apparatus 10 has been set in the presentation-image imaging mode. For example, when the imaging apparatus 10 is in the presentation-image imaging mode, the control unit 51 generates a display signal HE and supplies the display signal HE to the image processing unit 35 to generate a display image signal HG from the image signal DVa and the display signal HE. Thus, the captured image and information indicating that the presentation-image imaging mode has been set are displayed on the screen of the display unit 38.

In step ST304, the control unit 51 causes the gamma correction unit 352 of the image processing unit 35 to perform gamma correction with separation of presentation image and background image regions so that different characteristics are applied to the individual regions, and proceeds to step ST307. That is, the control unit 51 notifies the gamma correction unit 352 that the presentation-image imaging mode has been set by using the control signal CTe. The gamma correction unit 352 performs gamma correction with different characteristics for the individual regions so as not to cause "white out" and "black out" in the presentation image and the background image, respectively. The gamma correction unit 352 performs gamma correction with different characteristics, namely, a characteristic corrected so that the luminance level of a high-luminance portion can be compressed and a characteristic corrected so that the luminance of a low-luminance portion can be enhanced.

For example, when a presentation image such as an image projected on a screen or an image displayed on a television device is captured, the presentation image usually has a higher luminance than the background image. Thus, "white out" is likely to occur in the presentation image within the captured image. Further, the background image usually has a lower luminance than the presentation image. Thus, "black out" is likely to occur in the background image within the captured image. Therefore, the gamma correction unit 352 segments the captured image into a presentation image region and a background image region on the basis of the detection signal JA, and performs gamma correction on the presentation image region with a characteristic corrected so that the luminance level of a high-luminance portion can be compressed. The gamma correction unit 352 further performs gamma correction on the background image region with a characteristic corrected so that the luminance level of a low-luminance portion can be expanded.

Figure 44A:
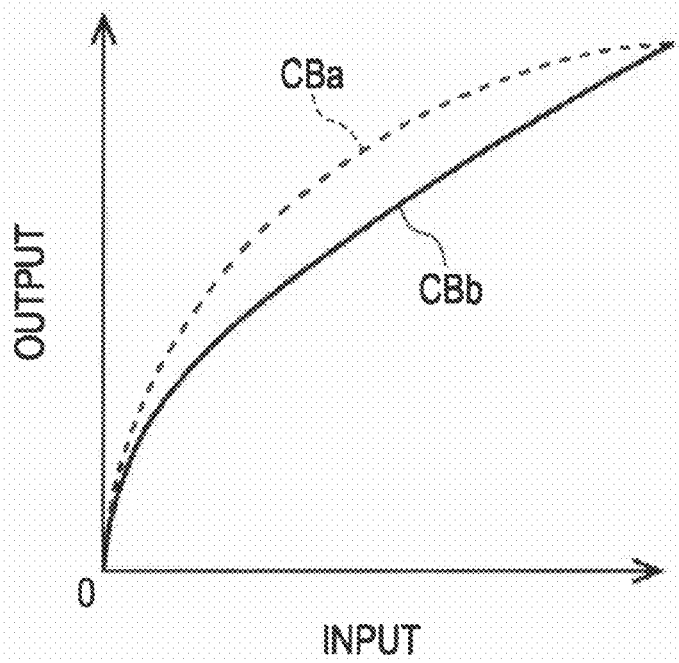
FIGS. 44A and 44B are diagrams showing correction characteristics used for gamma correction.
Figure 44B:
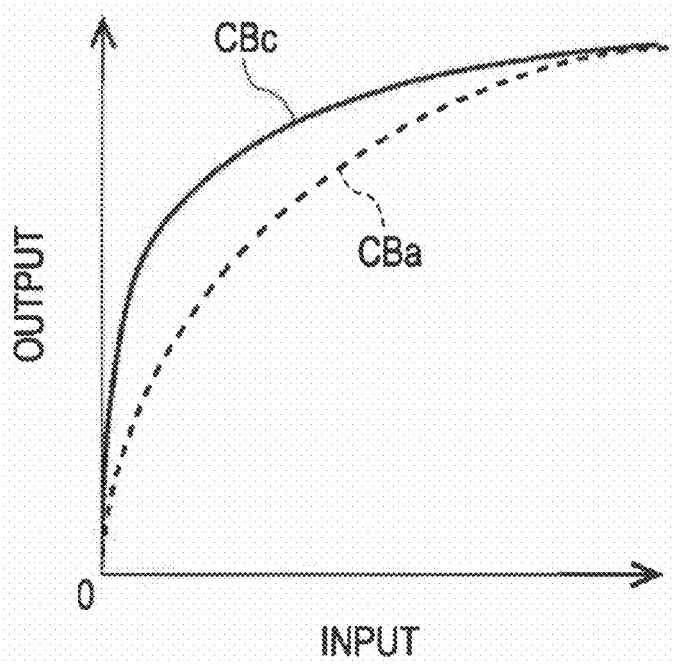

FIG. 43 shows, by way of example, a region A corresponding to a presentation image and a region B corresponding to a background image in a captured image, which are represented by the detection signal JA supplied from the presentation-image detecting unit 31. FIGS. 44A and 44B show correction characteristics (gamma curves) used when the gamma correction unit 352 performs gamma correction. The gamma correction unit 352 performs gamma correction on the presentation image using, as shown in FIG. 44A, a gamma curve CBb (which is indicated by a solid line) having a characteristic corrected so that, as compared to a normal gamma curve CBa (which is indicated by a broken line), the luminance level of a high-luminance portion can be compressed. The gamma correction unit 352 further performs gamma correction on the background image using, as shown in FIG. 44B, a gamma curve CBc (which is indicated by a solid line) having a characteristic corrected so that, as compared to the normal gamma curve CBa (which is indicated by a broken line), the luminance level of a low-luminance portion can be expanded.

When the process proceeds from step ST302 to step ST305, the control unit 51 performs a normal imaging mode notification process, and proceeds to step ST306. The control unit 51 notifies the user that the imaging apparatus 10 has been set in the normal imaging mode. For example, in a case where when the imaging apparatus 10 is in the presentation-image imaging mode, the display signal HE is supplied to the image processing unit 35 to provide an icon sign MH indicating that the presentation-image imaging mode has been set, the control unit 51 stops the supply of the display signal HE to remove the icon sign MH so that the user can recognize that the normal imaging mode has been set.

In step ST306, the control unit 51 causes the gamma correction unit 352 to perform gamma correction without separation of the presentation image and background image regions, and proceeds to step ST307. That is, the control unit t51 notifies the gamma correction unit 352 that the normal imaging mode has been set by using the control signal CTe. In the normal imaging mode, the gamma correction unit 352 performs gamma correction using the gamma curve CBa that is not corrected for compressing the luminance level of a high-luminance portion or expanding the luminance level of a low-luminance portion.

In step ST307, the control unit 51 determines whether or not the imaging operation ends. The control unit 51 terminates gamma correction, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST301.

Figure 45A:
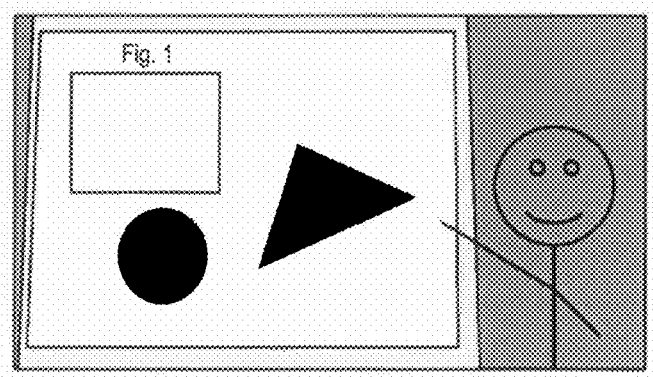
FIGS. 45A to 45D are diagrams describing an operation for gamma correction.
Figure 45B:
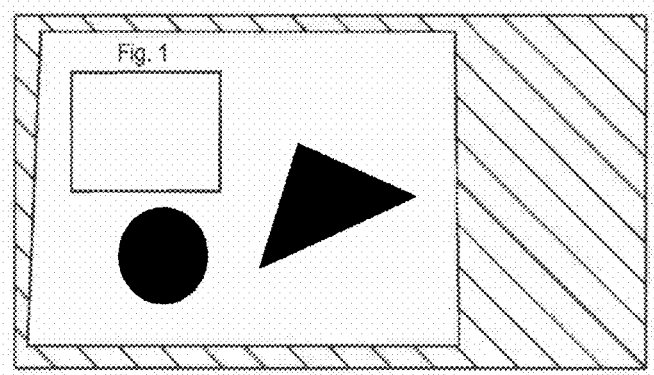
Figure 45C:
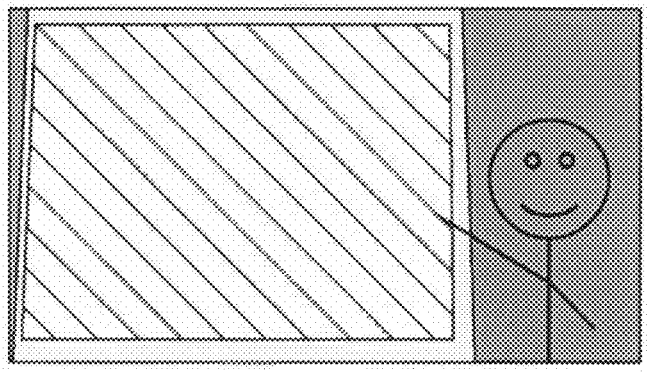

FIGS. 45A to 45D show an operation for gamma correction. The gamma correction unit 352 segments, based on the detection signal JA, a captured image shown in FIG. 45A into a presentation image shown in FIG. 45B and a background image shown in FIG. 45C. In FIG. 45B, a diagonally hatched portion represents a background image region. In FIG. 45C, a diagonally hatched portion represents a presentation image region.

Figure 45D:
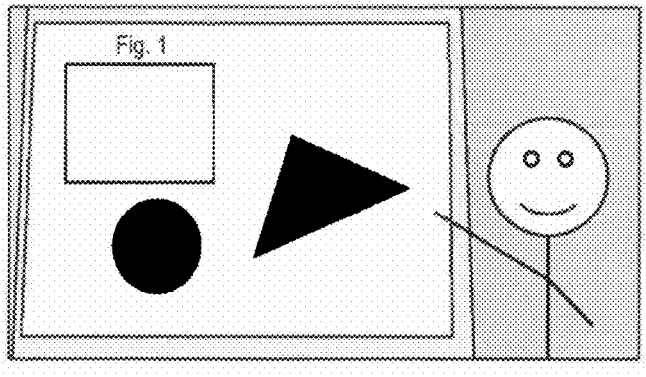

The gamma correction unit 352 performs gamma correction of the presentation image region shown in FIG. 45B using the gamma curve CBb shown in FIG. 44A. Since the gamma curve CBb has a characteristic modified so that the luminance level of a high-luminance portion can be compressed, the gamma-corrected presentation image is an image in which "white out" is prevented. The gamma correction unit 352 further performs gamma correction of the background image region shown in FIG. 45C using the gamma curve CBc shown in FIG. 44B. Since the gamma curve CBc has a characteristic modified so that the luminance level of a low-luminance portion can be expanded, the gamma-corrected background image is an image in which "black out" is prevented. Accordingly, as shown in FIG. 45D, after gamma-correction is performed by the gamma correction unit 352, a captured image in which no "white out" occurs in the presentation image and in which no "black out" occurs in the background image can be obtained.

In this manner, gamma correction is performed with different characteristics on a presentation image region and a remaining image region other than the presentation image region. Thus, a desired captured image without "white-out" or "black-out" objects can easily be obtained.

In the foregoing description, the gamma correction unit 352 is configured to perform gamma correction using a gamma curve modified for compressing the luminance level of a high-luminance portion and a gamma curve modified for expanding the luminance level of a low-luminance portion. Alternatively, when a captured image is an image in which brightness control has been performed in accordance with one of the presentation image and background image regions, gamma correction may be performed with a characteristic corrected only for the other image region.

Figure 46:
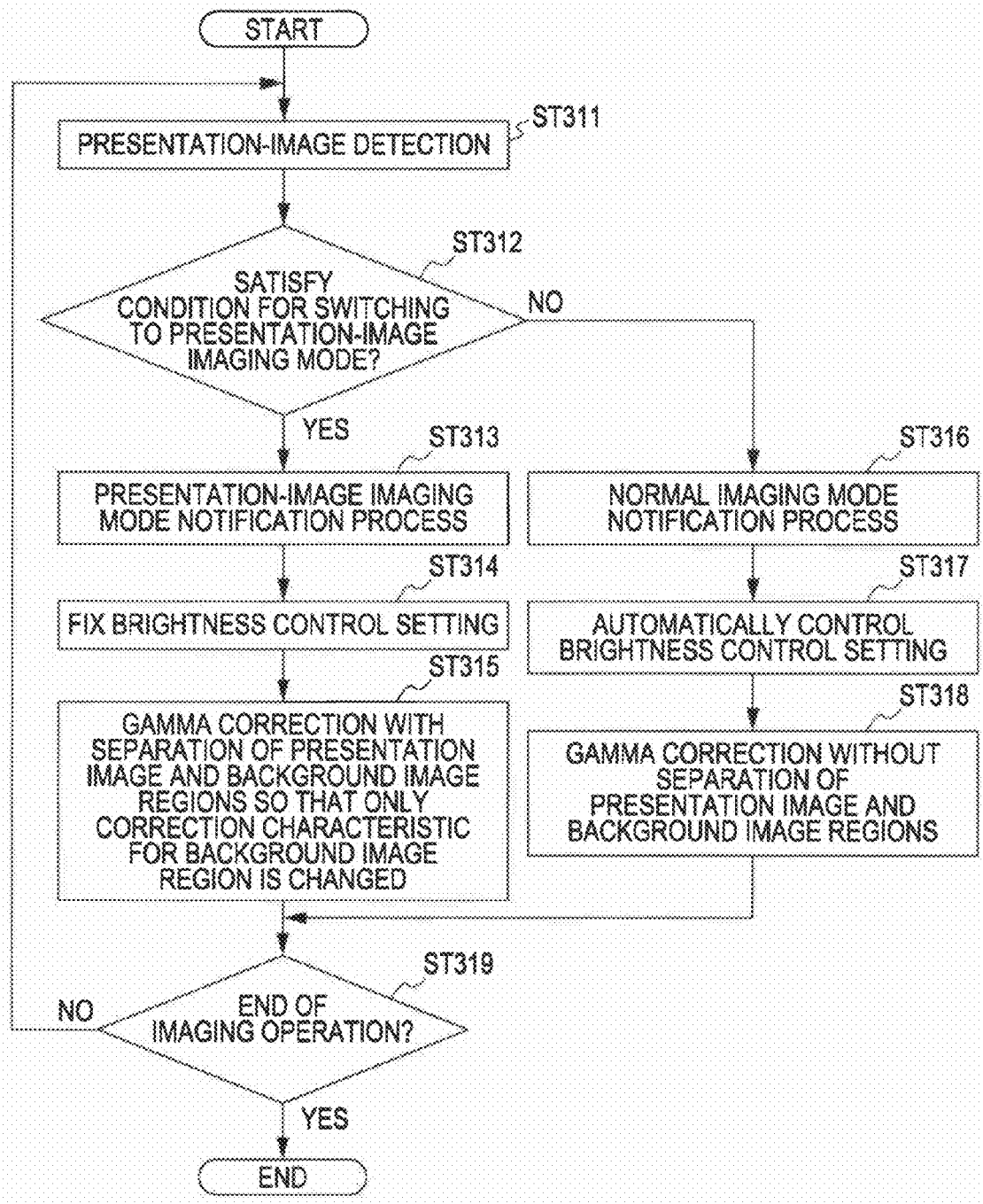
FIG. 46 is a flowchart showing an operation for performing gamma correction so that only the gamma curve used for a background image region is modified.

FIG. 46 is a flowchart showing for performing gamma correction so that only the gamma curve used for a background image region is modified. In step ST311, as in step ST301, the control unit 51 causes the presentation-image detecting unit 31 to perform presentation-image detection, and proceeds to step ST312. When an image presented by a presentation device is captured, the presentation-image detecting unit 31 detects a presentation image region in the captured image, generates a detection signal JA indicating a detection result, and supplies the detection signal JA to the image processing unit 35 and the control unit 51.

In step ST312, as in step ST302, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST313. If it is determined that the condition is not satisfied, the control unit 51 sets the imaging mode to another imaging mode (for example, the normal imaging mode), and proceeds to step ST316.

In step ST313, as in step ST303, the control unit 51 performs a presentation-image imaging mode notification process, and proceeds to step ST314.

In step ST314, the control unit 51 fixes the brightness control setting, and proceeds to step ST315. The control unit 51 sets the control signals CTb, CTc, and CTd to constant values regardless of the detection signal JB supplied from the detection unit 32 to fix the brightness control setting.

Projectors for projecting an image on a screen vary from high optical output power to low optical output power. Projectors with high optical output power are used for presentations in large spaces such as halls. A large image is projected on a substantially entire screen from a projector located at a large distance. If a large image is projected on a substantially entire screen from a projector with low optical output power located at a large distance, the projected images are dark. Projectors with low optical output power are therefore used to project an image on a small screen at a short distance. Even with the use of projectors with different optical output powers, if images are projected with brightness as desired in terms of readability, the presentation images have substantially equal brightness. Since the presentation images have substantially equal brightness, the control signals CTb, CTc, and CTd are determined in advance so that a presentation image in a captured image has desired brightness. By using the determined control signals CTb, CTc, and CTd when the presentation-image imaging mode is set, a captured image in which a presentation image has desired brightness can be produced.

In step ST315, the control unit 51 causes the gamma correction unit 352 of the image processing unit 35 to perform gamma correction with separation of presentation image and background image regions so that only the correction characteristic used for the background image region is changed, and proceeds to step ST319. That is, the control unit 51 notifies the gamma correction unit 352 that the presentation-image imaging mode has been set by using the control signal CTe. Since the brightness control setting is fixed in step ST314 so as to provide the presentation image with optimum brightness, the gamma correction unit 352 performs gamma correction on the presentation image region using the gamma curve that is not modified for compressing the luminance level of a high-luminance portion or expanding the luminance level of a low-luminance portion. The gamma correction unit 352 further performs gamma correction on the background image region using the gamma curve corrected for expanding the luminance level of a low-luminance portion. Note that when the brightness control setting is fixed so as to provide the background image with optimum brightness, gamma correction is performed on the background image region using the gamma curve that is not modified for compressing the luminance level of a high-luminance portion or expanding the luminance level of a low-luminance portion. Further, gamma correction is performed on the presentation image region using the gamma curve modified for compressing the luminance level of a high-luminance portion.

When the process proceeds from step ST312 to step ST316, as in step ST305, the control unit 51 performs a normal imaging mode notification process, and proceeds to step ST317.

In step ST317, the control unit 51 automatically controls the brightness control setting, and proceeds to step ST318. The control unit 51 generates control signals CTb, CTc, and CTd in accordance with the detection signal JB supplied from the detection unit 32, and supplies the control signals CTb, CTc, and CTd to the corresponding units to automatically control the brightness control setting.

In step ST318, as in step ST306, the control unit 51 causes the gamma correction unit 352 to perform gamma correction without separation of the presentation image and the background image, and proceeds to step ST319.

In step ST319, the control unit 51 determines whether or not the imaging operation ends. If it is determined that the imaging operation ends, the control unit 51 terminates gamma correction. If it is determined that the imaging operation does not end, the control unit 51 returns to step ST311.

In this manner, even when only a gamma curve modified for expanding the luminance level of a low-luminance portion is used, a captured image in which no "white out" occurs in the presentation image and in which no "black out" occurs in the background image can be obtained.

In the operation shown in FIG. 46, a presentation image region is gamma-corrected using a gamma curve that is not modified for compressing the luminance level of a high-luminance portion or expanding the luminance level of a low-luminance portion. Alternatively, the presentation image region may be gamma-corrected using a gamma curve corrected so that the presentation image can be optimized. For example, in order to optimize the presentation image so as to improve the readability thereof, a gamma curve for enhancing the contrast of the presentation image may be used. Alternatively, a gamma curve for enhancing the gradation of a high-luminance or low-luminance portion may be used for the presentation image region to facilitate identification of a high-luminance or low-luminance portion in the presentation image region.

Figure 47:
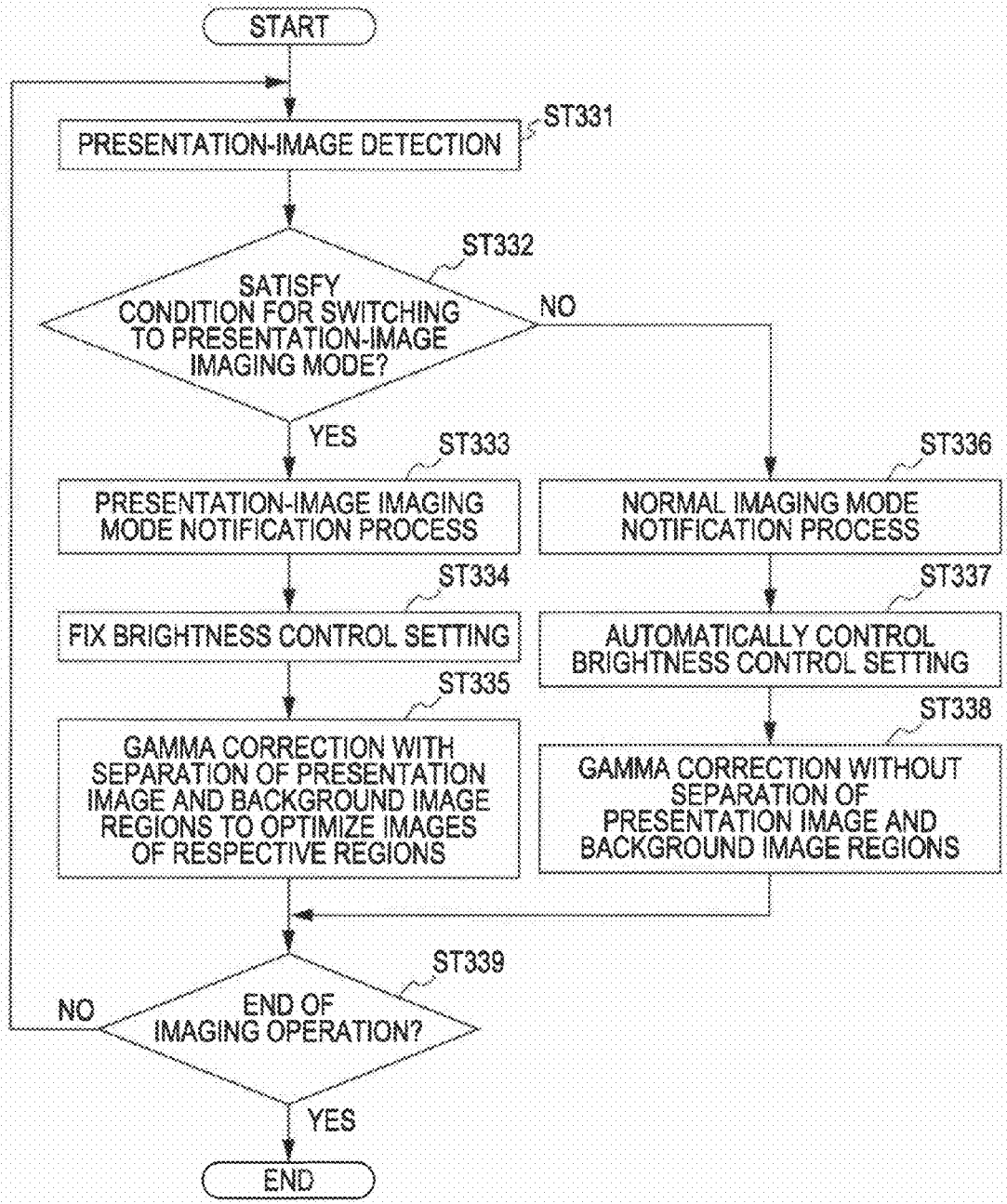
FIG. 47 is a flowchart showing an operation for performing gamma correction so that a presentation image can easily be read.

FIG. 47 is a flowchart showing an operation for performing gamma correction so as to improve the readability of a presentation image.

In step ST331, as in step ST301, the control unit 51 causes the presentation-image detecting unit 31 to perform detection of a presentation image region, and proceeds to step ST332. In step ST332, as in step ST302, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST333. If it is determined that the condition is not satisfied, the control unit 51 sets the imaging mode to the normal imaging mode, and proceeds to step ST336.

In step ST333, as in step ST303, the control unit 51 allows the user to identify that the imaging mode of the imaging apparatus 10 has been set to the presentation-image imaging mode, and proceeds to step ST334.

In step ST334, as in step ST314, the control unit 51 fixes the brightness control setting, and proceeds to step ST335.

In step ST335, the control unit 51 causes the gamma correction unit 352 of the image processing unit 35 to perform gamma correction for each region with separation of presentation image and background image regions so that the images in the individual regions can be optimized, and proceeds to step ST339. That is, the control unit 51 notifies the gamma correction unit 352 that the presentation-image imaging mode has been set by using the control signal CTe. The gamma correction unit 352 uses a gamma curve corrected so that the presentation image can be optimized, for example, a gamma curve for enhancing the contrast of the presentation image. The gamma correction unit 352 further performs gamma correction using a gamma curve corrected so that the background image can be optimized, for example, a gamma curve modified for expanding the luminance level of a low-luminance portion.

FIG. 48 shows a gamma curve for enhancing the contrast of a presentation image. With the use of this gamma curve, gamma correction is performed so that intermediate-luminance gradation levels are enhanced.

When the process proceeds from step ST332 to step ST336, as in step ST305, the control unit 51 performs a normal imaging mode notification process, and proceeds to step ST337. In step ST337, as in step ST317, the control unit 51 automatically controls the brightness control setting, and proceeds to step ST338. In step ST338, as in step ST306, the control unit 51 causes the gamma correction unit 352 to perform gamma correction without separation of the presentation image and the background image, and proceeds to step ST339.

In step ST339, the control unit 51 determines whether or not the imaging operation ends. If it is determined that the imaging operation ends, the control unit 51 terminates gamma correction. If it is determined that the imaging operation does not end, the control unit 51 returns to step ST331.

Figure 49A:
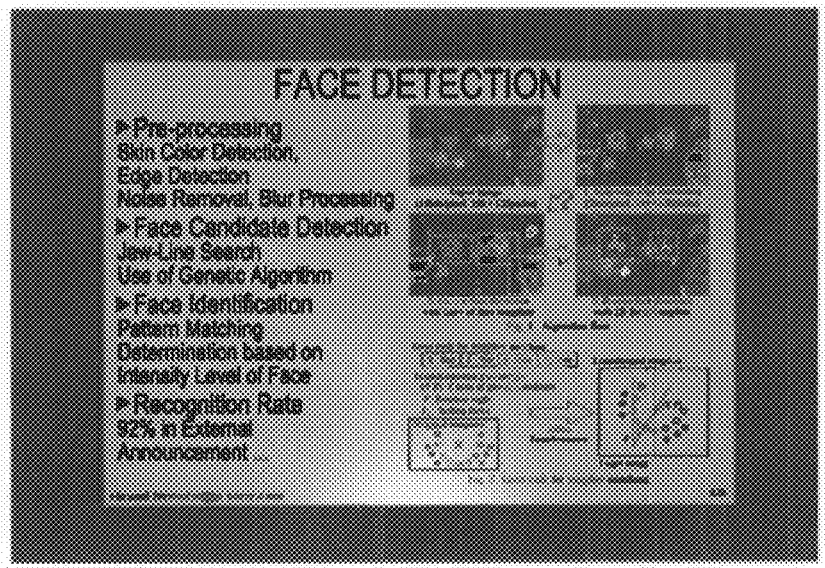
FIGS. 49A and 49B are diagrams showing an operation using a gamma curve corrected so that the contrast is enhanced and a gamma curve modified for expanding the luminance level of a low-luminance portion.
Figure 49B:
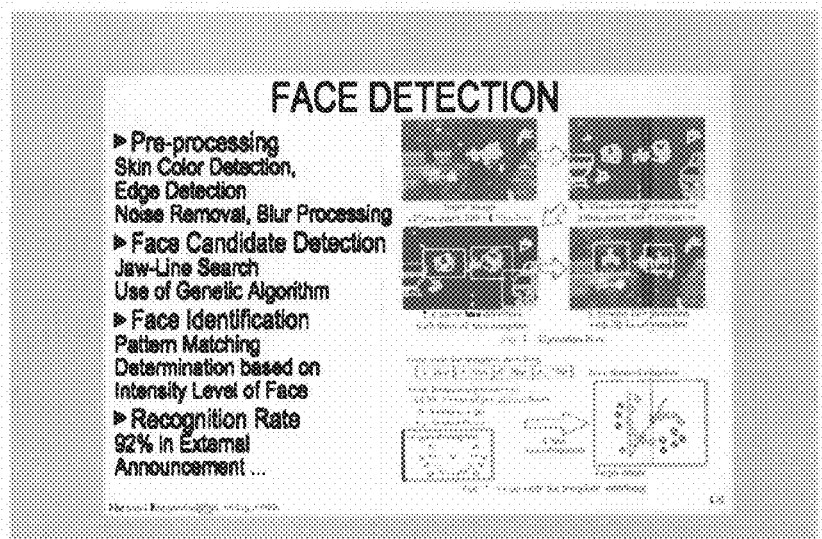

In this manner, gamma correction is performed on a presentation image using, for example, a gamma curve corrected so that the contrast is enhanced. Thus, the readability of a presentation image in a captured image can be improved. FIGS. 49A and 49B show an operation using a gamma curve corrected so that the contrast is enhanced and a gamma curve modified for expanding the luminance level of a low-luminance portion. For example, a presentation image region is detected in a captured image shown in FIG. 49A. Here, a detected background image region is gamma-corrected using a gamma curve modified for expanding the luminance level of a low-luminance portion, and the detected presentation image region is gamma-corrected using a gamma curve corrected so that the contrast is enhanced. If gamma correction is performed in this manner, as shown in FIG. 49B, the gamma-corrected captured image is an image in which "black out" of the background image is prevented and in which the contrast of the presentation image is enhanced to improve the image quality so that the readability of characters or the like can be improved.

A gamma correction unit may be provided for each of presentation image and background image regions into which a captured image is segmented. Alternatively, a single gamma correction unit may be used to switch gamma curves for each of the presentation image and background image regions to perform gamma correction.

In a case where a single gamma correction unit is used to switch gamma curves for each of the presentation image and background image regions to perform gamma correction, an image signal of a presentation image and an image signal of a background image are separately extracted from image signals of a captured image, and gamma correction is performed using one of the image signals. Then, the gamma curve is switched to a different one and gamma correction is performed using the other image signal. The gamma-corrected image signals of the presentation image and background image are combined to produce an image signal of one captured image.

In a case where a single gamma correction unit is used to switch gamma curves for each of a presentation image and a background image to perform gamma correction, furthermore, gamma curves are selectively used in accordance with whether a signal of each pixel in image signals of a captured image corresponds to an image signal in the presentation image region or an image signal in the background image region. This ensures that a captured image subjected to gamma correction in accordance with each of a presentation image and a background image can be obtained without performing a process of combining gamma-corrected image signals of the presentation image and background image to produce an image signal of one captured image.

Fifth Embodiment

Next, a fifth embodiment of the present invention will be described. An imaging apparatus according to the fifth embodiment has a similar structure to the imaging apparatus 10 shown in FIG. 1, which will not be described herein. The operation of the imaging apparatus 10 according to the fifth embodiment, which is performed using a result of presentation-image detection, will be described with reference to flowcharts shown in FIGS. 50 and 51. In step ST401, the control unit 51 determines whether or not mode switching between imaging modes is to be automatically performed. If it is determined that setting is performed so as to perform automatic switching between imaging modes on the basis of an operation signal supplied from the user interface unit 52, the control unit 51 proceeds to step ST402. If it is determined that setting is not performed so as to perform automatic switching, the control unit 51 proceeds to step ST411 shown in FIG. 51.

In step ST402, the control unit 51 determines whether or not white balance (WB) adjustment and/or gamma (γ) correction is to be performed for each region. If it is determined that setting is performed so as to perform white balance adjustment and/or gamma correction for each region on the basis of the operation signal PS from the user interface unit 52, the control unit 51 proceeds to step ST403. If it is determined that setting is not performed so as to perform white balance adjustment and/or gamma correction for each region, the control unit 51 proceeds to step ST405.

In step ST403, the control unit 51 determines whether or not only gamma correction is to be performed for each region. If setting is not performed so as to perform only gamma correction for each region, the control unit 51 proceeds to step ST404. If setting is performed so as to perform only gamma correction for each region, the control unit 51 proceeds to step ST407.

In step ST404, the control unit 51 determines whether or not white balance adjustment for an intermediate level is to be performed. The control unit 51 determines a white balance correction coefficient in which the intermediate color between achromatic color in a presentation image and achromatic color in a background image is set as achromatic color, and determines whether or not white balance adjustment is to be performed on a captured image using the determined white balance correction coefficient. If it is determined that setting is performed so as to perform white balance adjustment for an intermediate level, the control unit 51 proceeds to step ST405. If it is determined that setting is not performed so as to perform white balance adjustment for an intermediate level, the control unit 51 proceeds to step ST407.

In step ST405, the control unit 51 causes the presentation-image detecting unit 31 to perform presentation-image detection, and proceeds to step ST406. As described above, the presentation-image detecting unit 31 binarizes a luminance signal or a color-difference signal to determine a horizontal distribution signal DSh and a vertical distribution signal DSv from a binary luminance signal or a binary color-difference signal, and determines the respective sides of a presentation image from the horizontal distribution signal DSh and the vertical distribution signal DSv to detect a presentation image.

In step ST406, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST421. If it is determined that the condition is not satisfied, the control unit 51 sets the imaging mode to another imaging mode (for example, the normal imaging mode), and proceeds to step ST423.

The control unit 51 determines whether or not the condition for switching to the presentation-image imaging mode is satisfied in accordance with the occurrence of frames where a presentation image has been detected. For example, the control unit 51 counts up each time a frame where a presentation image has been detected is produced, and counts down each time a frame where no presentation image is detected is produced. The count value may be set in the range from "0" to "about several tens". When the count value is greater than or equal to a threshold value determined in advance for the imaging mode determination (hereinafter referred to as a "mode-determination threshold value"), the control unit 51 sets the presentation-image imaging mode. If the count value is less than the mode-determination threshold value, the control unit 51 sets the normal imaging mode.

Alternatively, the control unit 51 may set an imaging mode on the basis of the number of consecutive frames where a presentation image has been detected or the number of consecutive frames where no presentation image is detected. For example, when the number of consecutive frames where a presentation image has been detected has reached a predetermined value, the control unit 51 may switch the imaging mode from the normal imaging mode to the presentation-image imaging mode. Or, when the number of consecutive frames where no presentation image is detected has reached a predetermined value, the control unit 51 may set the imaging mode from the presentation-image imaging mode to the normal imaging mode. This allows stable switching between the imaging modes according to the detection of a presentation image.

In step ST407, the control unit 51 causes the presentation-image detecting unit 31 to perform high-accuracy presentation-image detection, and proceeds to step ST408. The presentation-image detecting unit 31 performs detection of a presentation image with higher accuracy than that in step ST405 described above to detect a presentation image region in the captured image. For example, when it is determined that detected upper, lower, left, and right sides correspond to the respective sides of a presentation image, the presentation-image detecting unit 31 determines that an image defined by the detected upper, lower, left, and right sides is a presentation image and, in addition, detects a presentation image region with higher accuracy. The presentation-image detecting unit 31 may detect a presentation image region with high accuracy by, for example, performing mathematical coordinate transform or the like to detect lines from an edge detection result and determining a presentation image region from a rectangular or trapezoidal region defined by the detected lines. The presentation-image detecting unit 31 may also use any other method.

In step ST408, as in step ST406, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST424. If it is determined that the condition is not satisfied, the control unit 51 sets the imaging mode to the normal imaging mode, and proceeds to step ST423.

Figure 51:
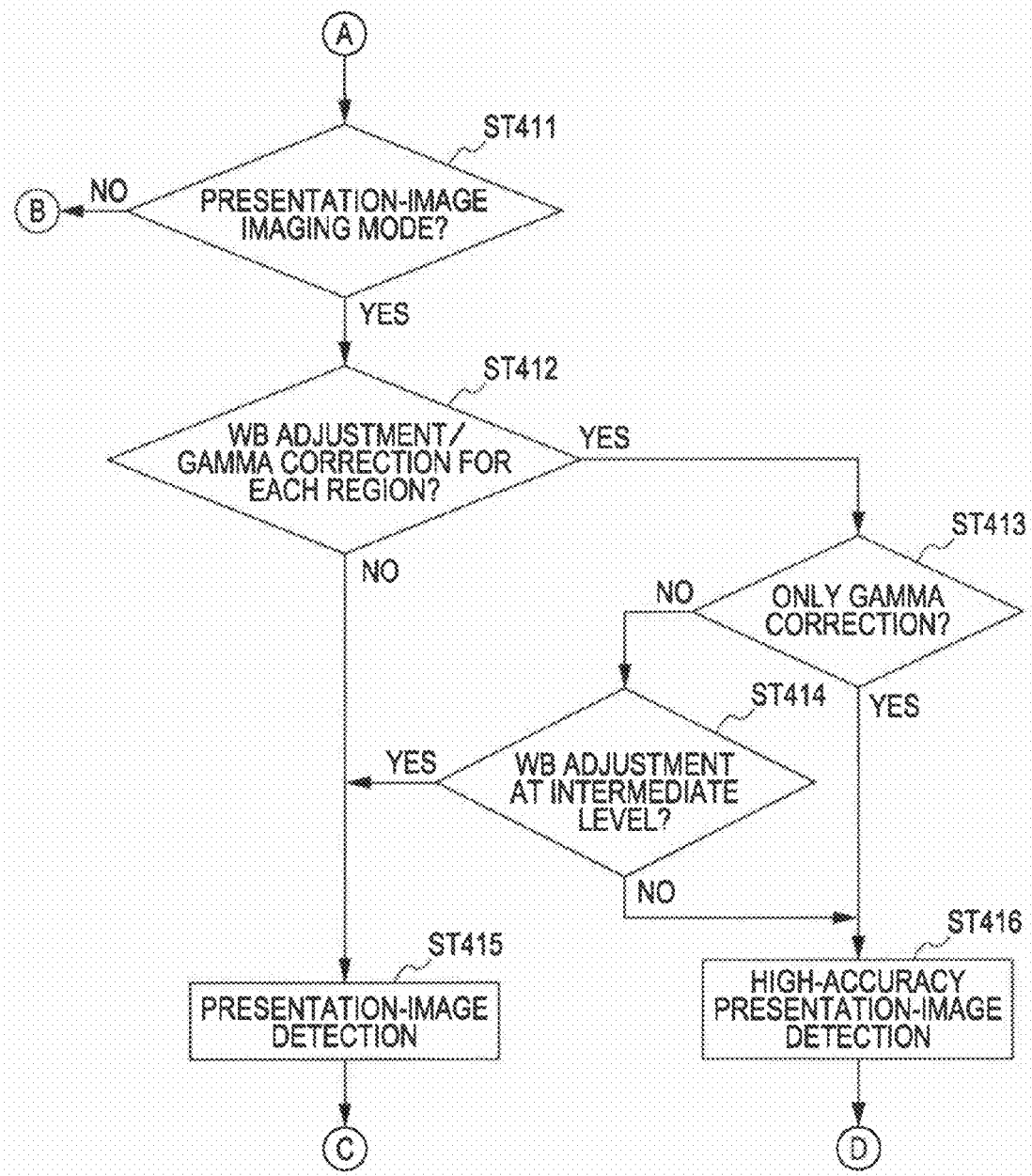
FIG. 51 is a flowchart showing the operation of the imaging apparatus which is performed using a result of presentation-image detection.

If the process proceeds to step ST411 shown in FIG. 51 because it is determined in step ST401 that setting is not performed so as to perform automatic switching between imaging modes, the control unit 51 determines whether or not the user has set the imaging mode to the presentation-image imaging mode. If the imaging mode has been set to the presentation-image imaging mode, the control unit 51 proceeds to step ST412. If the imaging mode has been set to the normal imaging mode, the control unit 51 proceeds to step ST423 shown in FIG. 50.

In step ST412, the control unit 51 determines whether or not white balance (WB) adjustment and/or gamma (γ) correction is to be performed for each region. If it is determined that setting is performed so as to perform white balance adjustment and/or gamma correction for each region on the basis of the operation signal PS from the user interface unit 52, the control unit 51 proceeds to step ST413. If it is determined that setting is not performed so as to perform white balance adjustment and/or gamma correction for each region, the control unit 51 proceeds to step ST415.

In step ST413, the control unit 51 determines whether or not only gamma correction is to be performed for each region. If setting is not performed so as to perform only gamma correction for each region, the control unit 51 proceeds to step ST414. If setting is performed so as to perform only gamma correction for each region, the control unit 51 proceeds to step ST416.

In step ST414, as in step ST404, the control unit 51 determines whether or not white balance adjustment for an intermediate level is to be performed. If it is determined that setting is performed so as to perform white balance adjustment for an intermediate level, the control unit 51 proceeds to step ST415. If it is determined that setting is not performed so as to perform white balance adjustment for an intermediate level, the control unit 51 proceeds to step ST416.

In step ST415, as in step ST405, the control unit 51 causes the presentation-image detecting unit 31 to perform presentation-image detection, and proceeds to step ST421 shown in FIG. 50. In step ST416, as in step ST407, the control unit 51 causes the presentation-image detecting unit 31 to perform high-accuracy presentation-image detection, and proceeds to step ST424 shown in FIG. 50.

When the process proceeds to step ST421 shown in FIG. 50 from step ST406 or ST415, the control unit 51 determines whether or not exposure control is to be changed. If setting is performed in the presentation-image imaging mode so as to switch exposure control to obtain a captured image in which a presentation image has appropriate brightness, the control unit 51 proceeds to step ST422. If setting is not performed so as to switch exposure control, the control unit 51 proceeds to step ST423.

In step ST422, the control unit 51 performs exposure control using a presentation-image detection result, and proceeds to step ST423. For example, the control unit 51 determines the position of a presentation image on the basis of the detection signal JA, performs a weighting coefficient setting process for the detection unit 32 on the basis of this determination result, and controls at least one of the aperture driving unit 42, the timing signal generation unit 22, and the amplification unit 213 on the basis of the detection signal JB generated by the detection unit 32 to perform exposure control.

In step ST423, the control unit 51 performs white balance adjustment and/or gamma correction without separation of regions, and then returns to step ST401. The control unit 51 controls the white balance adjustment unit 351 of the image processing unit 35 to calculate, for example, a white balance correction coefficient from the captured image and perform white balance adjustment using this white balance correction coefficient.

Further, if it is determined in step ST404 or ST414 that white balance adjustment for an intermediate level is to be performed, the control unit 51 determines a white balance correction coefficient in which the intermediate color between achromatic color in the presentation image and achromatic color in the background image is set as achromatic color, and performs white balance adjustment of the captured image using this white balance correction coefficient.

FIG. 52 shows the position of achromatic color obtained by performing white balance detection. Here, achromatic color in a presentation image is at a position ACpa in an (R/G)-(B/G) plane detected from a detection signal obtained by performing white balance detection, and achromatic color in a background image is at a position ACpb. In this case, a white balance correction coefficient in which an intermediate position ACpc between the position ACpa of the achromatic color in the presentation image and the position ACpb of the achromatic color in the background image is set as achromatic color is determined. Further, white balance adjustment of the captured image is performed using the determined white balance correction coefficient. In FIG. 52, a region ACS represents an achromatic region in an image captured under a standard light source (such as daylight or incandescent light) condition, and a region ACR represents an achromatic region experimentally obtained from an image projected on a screen.

Further, the control unit 51 controls the gamma correction unit 352 of the image processing unit 35 to perform gamma correction of the captured image using a predetermined gamma curve.

When the process proceeds to step ST424 from step ST408 or ST416, as in step ST421, the control unit 51 determines whether or not exposure control is to be changed. If setting is performed in the presentation-image imaging mode so as to switch exposure control to obtain a captured image in which a presentation image has appropriate brightness, the control unit 51 proceeds to step ST425. If setting is not performed so as to switch exposure control, the control unit 51 proceeds to step ST426.

In step ST425, as in step ST422, the control unit 51 performs exposure control using a presentation-image detection result, and proceeds to step ST426.

In step ST426, the control unit 51 performs white balance adjustment and/or gamma correction for each region, and then returns to step ST401. The control unit 51 controls the white balance adjustment unit 351 of the image processing unit 35 to calculate a white balance correction coefficient from each of the presentation image and the background image. The control unit 51 further performs white balance adjustment of the presentation image using the white balance correction coefficient calculated from the presentation image, and performs white balance adjustment of the background image using the white balance correction coefficient calculated from the background image. For example, as shown in FIG. 52, when achromatic color in the presentation image is at the position ACpa and achromatic color in the background image is at the position ACpb, a white balance correction coefficient is determined from the position ACpa of the achromatic color of the presentation image, and white balance adjustment is performed on the presentation image region using this white balance correction coefficient. A white balance correction coefficient is further determined from the position ACpb of the achromatic color of the background image, and white balance adjustment is performed on the background image region using this white balance correction coefficient.

Figure 53A:
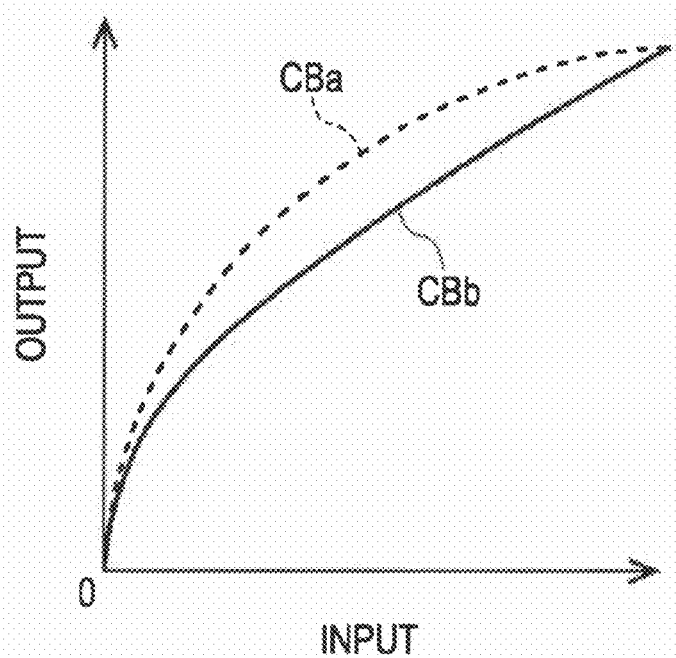
FIGS. 53A and 53B are diagrams showing correction characteristics used for gamma correction.
Figure 53B:
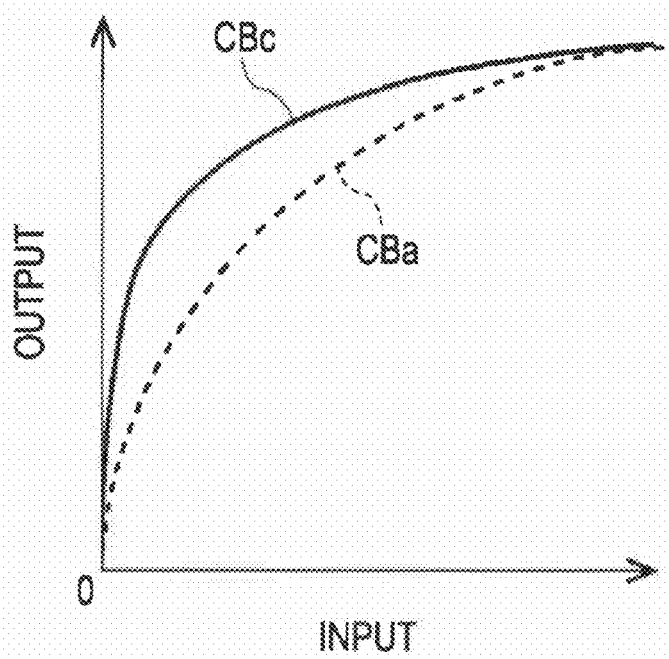

The control unit 51 further controls the gamma correction unit 352 of the image processing unit 35 to perform gamma correction for each region. FIGS. 53A and 53B show correction characteristics used for gamma correction. The control unit 51 causes the gamma correction unit 352 to perform gamma correction on, for example, the presentation image region using, as shown in FIG. 53A, a gamma curve CBb having a characteristic modified for compressing the luminance level of a high-luminance portion as compared to a gamma curve CBa used in the normal imaging mode. The control unit 51 further causes the gamma correction unit 352 to perform gamma correction on, for example, the background image region using, as shown in FIG. 53B, a gamma curve CBc having a characteristic modified for expanding the luminance level of a low-luminance portion as compared to the normal gamma curve CBa.

In this manner, a presentation image is detected from a captured image, and exposure control, white balance adjustment, gamma correction, or the like is performed on the basis of a result of presentation-image detection. This ensures that a captured image in which the presentation image has appropriate brightness and has a correct color can be obtained.

Thus, another image different from the presentation image, for example, a background image, can also be prevented from causing "black out".

Sixth Embodiment

Next, a sixth embodiment of the present invention will be described. An imaging apparatus according to the sixth embodiment has a similar structure to the imaging apparatus 10 shown in FIG. 1, which will not be described herein. FIG. 54 is a flowchart showing a white balance adjustment operation. In step ST501, the control unit 51 causes the presentation-image detecting unit 31 to perform presentation-image detection, and proceeds to step ST502. When an image presented by a presentation device is captured, the presentation-image detecting unit 31 detects a presentation image region in the captured image, generates a detection signal JA indicating a detection result, and supplies the detection signal JA to the image processing unit 35 and the control unit 51. Then, the control unit 51 proceeds to step ST502.

The detection of a presentation image region is not limited to the process shown in FIG. 5, and any other detection method as described above may be used. For example, edge detection of a captured image may be performed to obtain a contour indicating the boundary between a presentation image and a background image, and four vertices or four lines indicating sides of a presentation image may be determined from information regarding the obtained contour to detect a presentation image region.

In step ST502, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST503. If it is determined that the condition is not satisfied, the control unit 51 sets the imaging mode to another imaging mode (for example, the normal imaging mode), and proceeds to step ST505.

The control unit 51 determines whether or not the condition for switching to the presentation-image imaging mode is satisfied in accordance with the occurrence of frames where a presentation image has been detected. For example, the control unit 51 counts up each time a frame where a presentation image has been detected is produced, and counts down each time a frame where no presentation image is detected is produced. The count value may be set in the range from "0" to "about several tens". When the count value is greater than or equal to a threshold value determined in advance for the imaging mode determination (hereinafter referred to as a "mode-determination threshold value"), the control unit 51 sets the presentation-image imaging mode. If the count value is less than the mode-determination threshold value, the control unit 51 sets the normal imaging mode.

Alternatively, the control unit 51 may set an imaging mode on the basis of the number of consecutive frames where a presentation image has been detected or the number of consecutive frames where no presentation image is detected. For example, when the number of consecutive frames where a presentation image has been detected has reached a predetermined value, the control unit 51 may switch the imaging mode from the normal imaging mode to the presentation-image imaging mode. Or, when the number of consecutive frames where no presentation image is detected has reached a predetermined value, the control unit 51 may set the imaging mode from the presentation-image imaging mode to the normal imaging mode. This allows stable switching between the imaging modes according to the detection of a presentation image.

In step ST503, the control unit 51 performs a presentation-image imaging mode notification process, and proceeds to step ST504. The control unit 51 notifies the user that the imaging apparatus 10 has been set in the presentation-image imaging mode. For example, when the imaging apparatus 10 is in the presentation-image imaging mode, the control unit 51 generates a display signal HE and supplies the display signal HE to the image processing unit 35 to generate a display image signal HG from the image signal DVa and the display signal HE. Thus, the captured image and information indicating that the presentation-image imaging mode has been set are displayed on the screen of the display unit 38.

In step ST504, the control unit 51 causes the white balance adjustment unit 351 of the image processing unit 35 to perform white balance adjustment for each region with separation of presentation image and background image regions, and proceeds to step ST507. That is, the control unit 51 notifies the white balance adjustment unit 351 that the presentation-image imaging mode has been set by using the control signal CTe. The white balance adjustment unit 351 performs white balance detection for each region with separation of the presentation image and background image regions into which the captured image is segmented based on the detection signal JA. Then, the white balance adjustment unit 351 determines a white balance correction coefficient for each region from a resulting detection signal JC so that each of the presentation image and background image regions can correctly be white-balance-adjusted, and corrects image signals of the corresponding images using the white balance correction coefficients.

Figure 55:
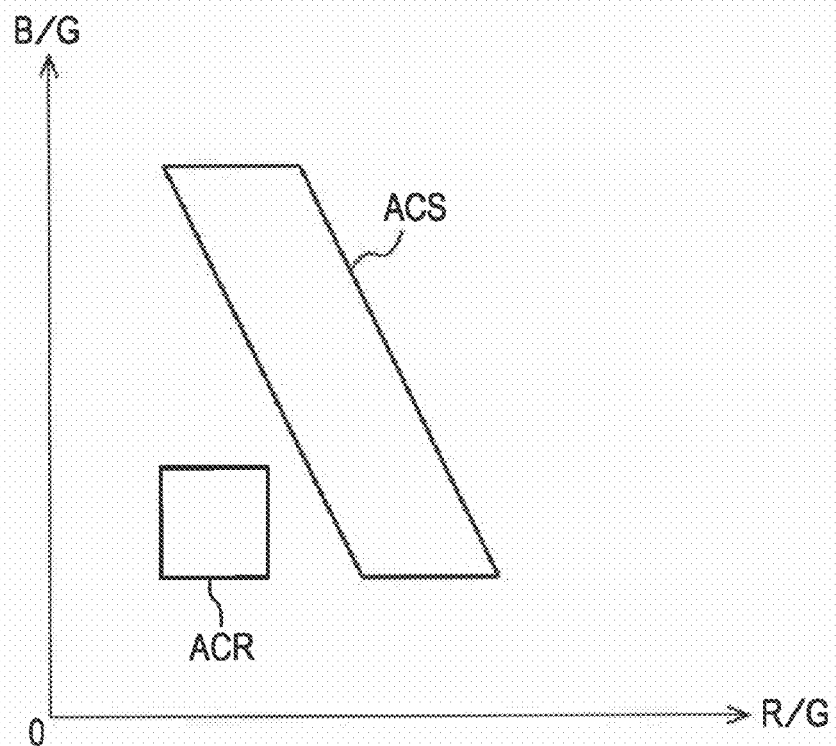
FIG. 55 is a diagram showing first and second achromatic regions.

As shown in FIG. 62, in general, an image projected on a screen is captured so that achromatic color in the presentation image is outside an achromatic region ACS in an image captured using other general light source conditions. Thus, as shown in FIG. 55, the white balance adjustment unit 351 separately provides a first achromatic region ACS in an image captured under general light source conditions, and a second achromatic region ACR in an image obtained by capturing a presentation image projected on a screen. The white balance adjustment unit 351 further performs ratio-based achromatic color detection as white balance detection, and extracts an image signal in the achromatic region ACR in the image obtained by capturing the image projected on the screen and an image signal in the achromatic region ACS in the image captured under general light source conditions as detection signals JC for the presentation image and the background image, respectively.

The white balance adjustment unit 351 determines white balance correction coefficients from the extracted detection signals JC. Specifically, the white balance adjustment unit 351 determines a white balance correction coefficient for the presentation image so that an image of the achromatic region ACR in the image obtained by capturing the image projected on the screen has achromatic color, and determines a white balance correction coefficient for the background image so that an image of the achromatic region ACS in the image captured under general light source conditions has achromatic color.

Further, the white balance adjustment unit 351 corrects an image signal indicating the presentation image using the white balance correction coefficient determined for the presentation image, and corrects an image signal indicating the background image using the white balance correction coefficient determined for the background image.

Figure 56:
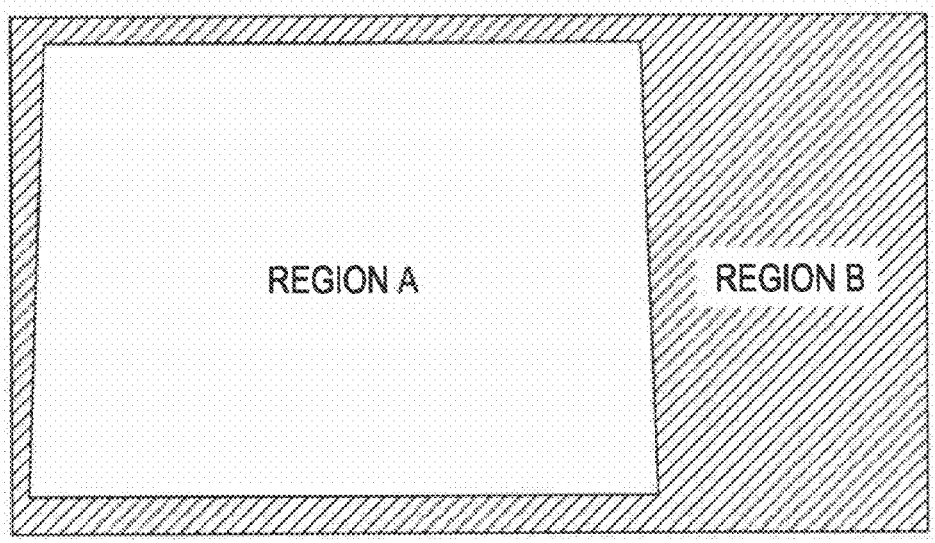
FIG. 56 is a diagram showing a presentation image region and a background image region in a captured image.

FIG. 56 shows, by way of example, a region A corresponding to a captured image and a region B corresponding to a background image region indicated by the detection signal JA supplied from the presentation-image detecting unit 31. The white balance adjustment unit 351 performs white balance adjustment on the presentation image by extracting an image signal in an achromatic region in an image obtained by capturing an image projected on a screen, that is, the achromatic region ACR shown in FIG. 55, as a detection signal JC. The white balance adjustment unit 351 further performs white balance adjustment on the background image by extracting an image signal in an achromatic region in an image captured under general light source conditions, that is, the achromatic region ACS shown in FIG. 55, as a detection signal JC.

When the process proceeds from step ST502 to step ST505, the control unit 51 performs a normal imaging mode notification process, and proceeds to step ST506. The control unit 51 notifies the user that the imaging apparatus 10 has been set in the normal imaging mode. For example, in a case where when the imaging apparatus 10 is in the presentation-image imaging mode, the display signal HE is supplied to the image processing unit 35 to provide an icon sign MH indicating that the presentation-image imaging mode has been set, the control unit 51 stops the supply of the display signal HE to remove the icon sign MH so that the user can recognize that the normal imaging mode has been set.

In step ST506, the control unit 51 causes the white balance adjustment unit 351 of the image processing unit 35 to perform white balance adjustment for each image without separation of the presentation image and background image regions in the captured image into, and proceeds to step ST507. That is, the control unit 51 notifies the white balance adjustment unit 351 that the normal imaging mode has been set by using the control signal CTe. In the normal imaging mode, the white balance adjustment unit 351 extracts, for example, an image signal in the achromatic region ACS in the image captured under general light source conditions from the image signals of the captured image as a detection signal JC. The white balance adjustment unit 351 further determines a white balance correction coefficient from the extracted detection signal JC, and corrects the image signals of the captured image using the white balance correction coefficient.

In step ST507, the control unit 51 determines whether or not the imaging operation ends. The control unit 51 terminates white balance adjustment, for example, when the power of the imaging apparatus 10 is turned off or when the operation of switching from the imaging mode to a playback mode for playing back a recorded image is performed. If the power-off operation or the operation of switching to the playback mode is not performed, the control unit 51 returns to step ST501.

Figure 57A:
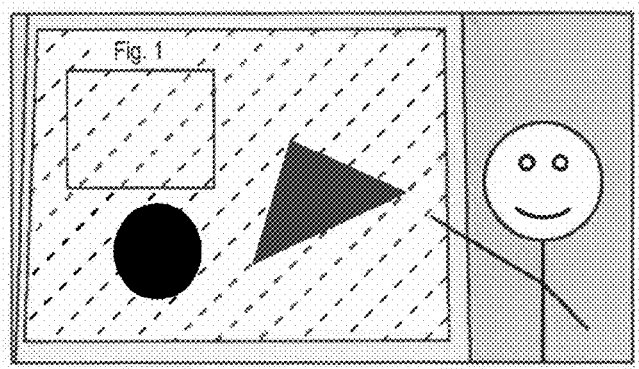
FIGS. 57A to 57D are diagrams describing an operation for white balance adjustment.
Figure 57B:
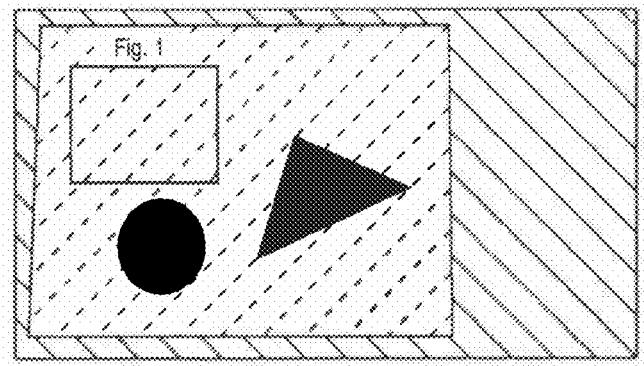
Figure 57C:
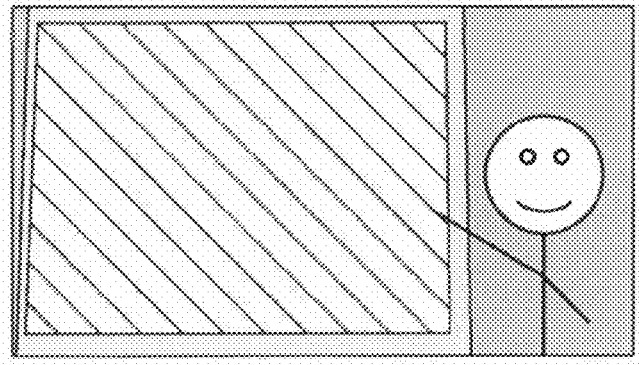
Figure 57D:
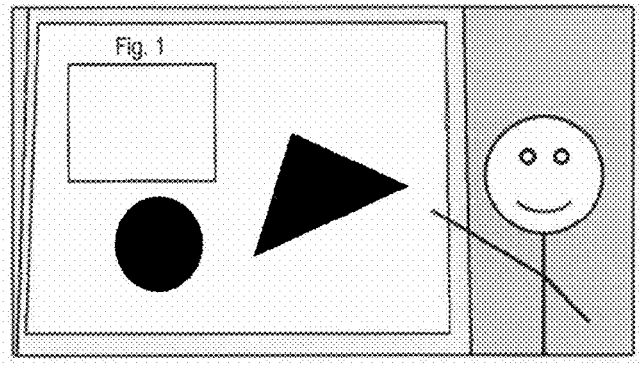

FIGS. 57A to 57D show an operation for white balance adjustment. Assuming that white balance adjustment is performed in the manner described above, a captured image shown in FIG. 57A is segmented into a presentation image shown in FIG. 57B and a background image shown in FIG. 57C. In FIG. 57B, a diagonally hatched region represents a background image region. In FIG. 57C, a diagonally hatched region represents a presentation image region. The presentation image region is corrected so that an image of the achromatic region ACR in the image obtained by capturing the presentation image projected on the screen has achromatic color. The background image region is corrected so that an image of the achromatic region ACS in the image captured under general light source conditions has achromatic color. In the white-balance-adjusted captured image, therefore, no bluish cast of the presentation image or no reddish cast of the background image occurs. As shown in FIG. 57D, the presentation image and the background image are displayed in natural color. In FIGS. 57A and 57B, the bluish cast of the presentation image region is indicated by broken hatching.

In this manner, a detection signal JC is generated from each of a presentation image and a background image, and white balance adjustment is performed using a white balance correction coefficient determined for the presentation image and a white balance correction coefficient determined for the background image. Thus, the presentation image and the remaining image are correctly white-balance-adjusted to ensure that a captured image similar to that perceived by the human eye can be obtained.

The white balance detection is not limited to the ratio-based achromatic color detection in which an image signal in an achromatic region in an (R/G)-(B/G) plane is used as a detection signal JC, and difference-based achromatic color detection may be performed to generate a detection signal JC. Specifically, an achromatic region ACR in an image obtained by capturing an image projected on a screen and an achromatic region ACS in an image captured under general light source conditions are provided in an (R-G)-(B-G) plane, a Cr-Cb plane, or a Pr-Pb plane, and an image signal in the achromatic region ACR in the image obtained by capturing the image projected on the screen and an image signal in the achromatic region ACS in the image captured under general light source conditions may be extracted as detection signals JC for the presentation image and the background image, respectively. Further, an image signal in an achromatic region in either the ratio-based achromatic color detection or difference-based achromatic color detection may be extracted as a detection signal JC. Thus, high-accuracy white balance adjustment can be achieved.

In the white balance adjustment described above, a detection signal JC is generated from each of a presentation image and a background image, and a white balance correction coefficient for the presentation image and a white balance correction coefficient for the background image are determined. Alternatively, a white balance correction coefficient for one of the presentation image and the background image may be fixed, and a white balance correction coefficient for the other image may be determined based on the detection signal JC.

Figure 58:
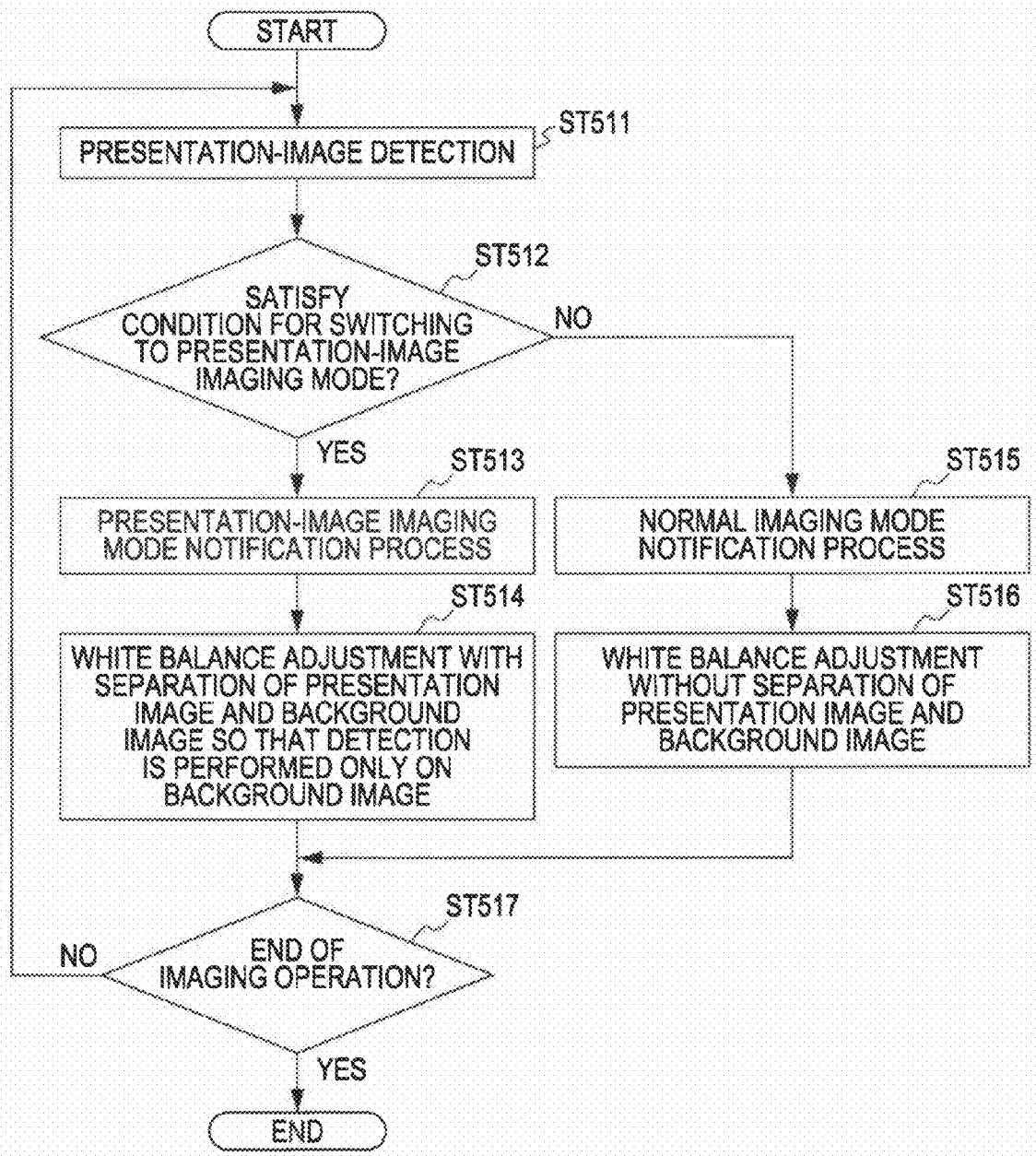
FIG. 58 is a flowchart showing an operation performed using a fixed white balance correction coefficient for one image.

FIG. 58 is a flowchart showing an operation performed using a fixed white balance correction coefficient for one of the images. In step ST511, as in step ST501, the control unit 51 causes the presentation-image detecting unit 31 to perform presentation-image detection, and proceeds to step ST512.

In step ST512, as in step ST502, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST513. If it is determined that the condition is not satisfied, the control unit 51 sets the imaging mode to another imaging mode (for example, the normal imaging mode), and proceeds to step ST515.

In step ST513, as in step ST503, the control unit 51 performs a presentation-image imaging mode notification process, and proceeds to step ST514.

In step ST514, the control unit 51 causes the white balance adjustment unit 351 of the image processing unit 35 to perform white balance adjustment with separation of a presentation image and a background image so that detection is performed only on the background image, and proceeds to step ST517. Specifically, the control unit 51 notifies the white balance adjustment unit 351 that the presentation-image imaging mode has been set by using the control signal CTe. The white balance adjustment unit 351 segments, based on the detection signal JA, a captured image into a presentation image and a background image, and performs white balance detention on the background image to obtain a detection signal JC. Then, the white balance adjustment unit 351 determines a white balance correction coefficient from the detection signal JC, and corrects an image signal of the background image using this white balance correction coefficient. The white balance adjustment unit 351 further corrects an image signal of the presentation image using a predetermined fixed white balance correction coefficient.

White color in an image projected on a screen by a projector is at substantially an equal position in a (R/G)-(B/G) plane or any of the planes described above even though there may be variations in characteristic from one projector to another. Accordingly, a white balance correction coefficient is determined in advance so that in which the image of the achromatic region ACR in an image obtained by capturing the presentation image projected on the screen has achromatic color, and white balance adjustment is performed on the presentation image using the white balance correction coefficient determined in advance. Further, the background image is white-balance-adjusted using a white balance correction coefficient that is determined from a detection signal JC obtained by white balance detection.

When the process proceeds from step ST512 to step ST515, as in step ST505, the control unit 51 performs a normal imaging mode notification process, and proceeds to step ST516.

In step ST516, as in step ST506, the control unit 51 causes the white balance adjustment unit 351 to perform white balance adjustment without separation of the presentation image and the background image, and proceeds to step ST517.

In step ST517, the control unit 51 determines whether or not the imaging operation ends. If it is determined that the imaging operation ends, the control unit 51 terminates white balance adjustment. If it is determined that the imaging operation does not end, the control unit 51 returns to step ST511.

Accordingly, since white balance adjustment is performed on one of the images using a predetermined white balance correction coefficient. It is not necessary to perform a process of determining a white balance correction coefficient from an extracted detection signal JC for each of the images in the captured image. Thus, efficient white balance adjustment can be achieved.

Switching between white balance correction coefficients in the manner described above may cause the boundary where the white balance correction coefficients are switched to be displayed in unnatural color. In order to avoid such an unnatural display, a boundary portion where white balance correction coefficients are switched may be subjected to white balance adjustment that is intermediate between white balance adjustment using one white balance correction coefficient and white balance adjustment using the other white balance correction coefficient.

Figure 59:
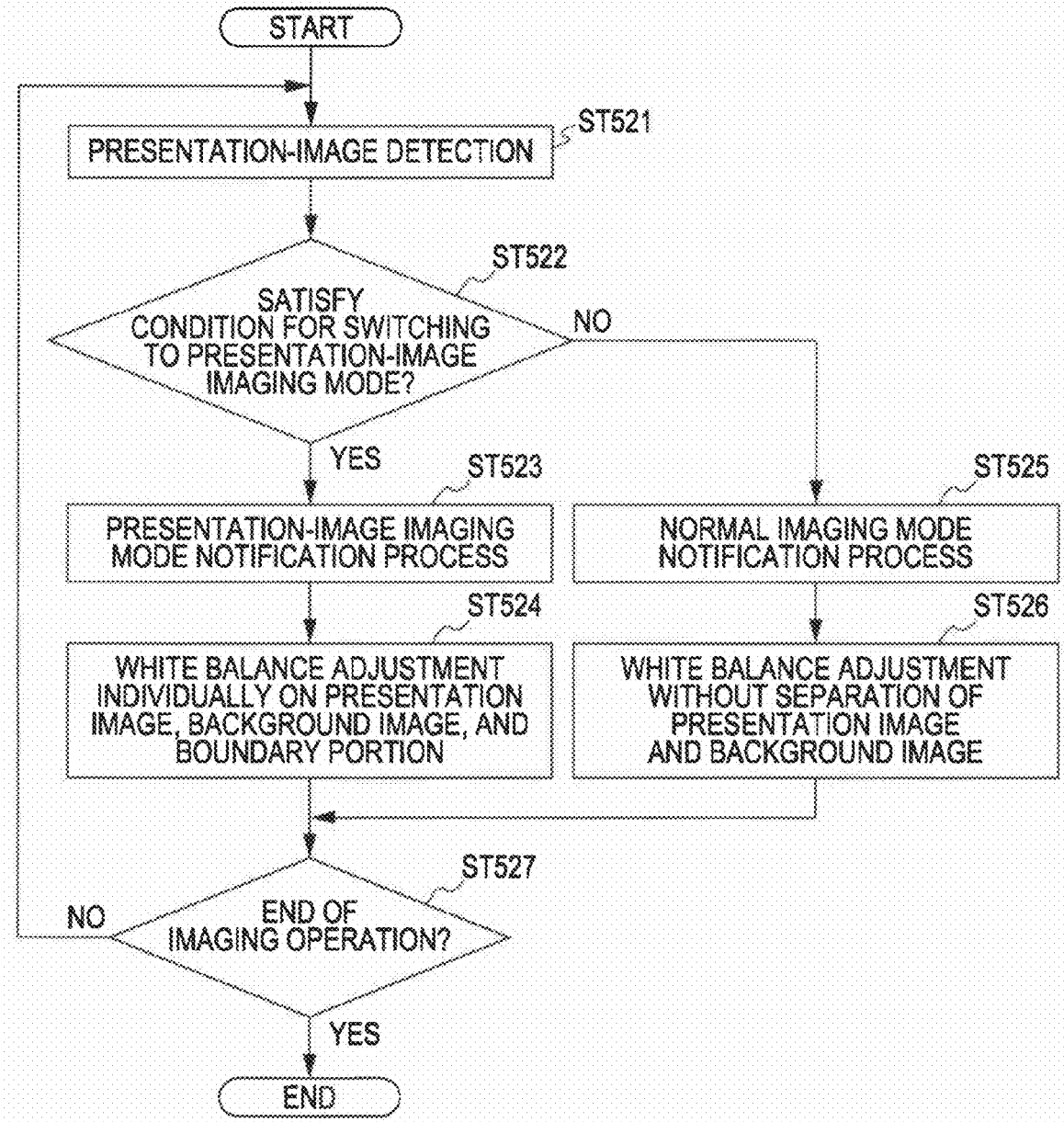
FIG. 59 is a flowchart showing a process for performing white balance adjustment on a boundary portion between a presentation image and a background image in a manner different from that for the presentation image and background image.
Figure 63A:
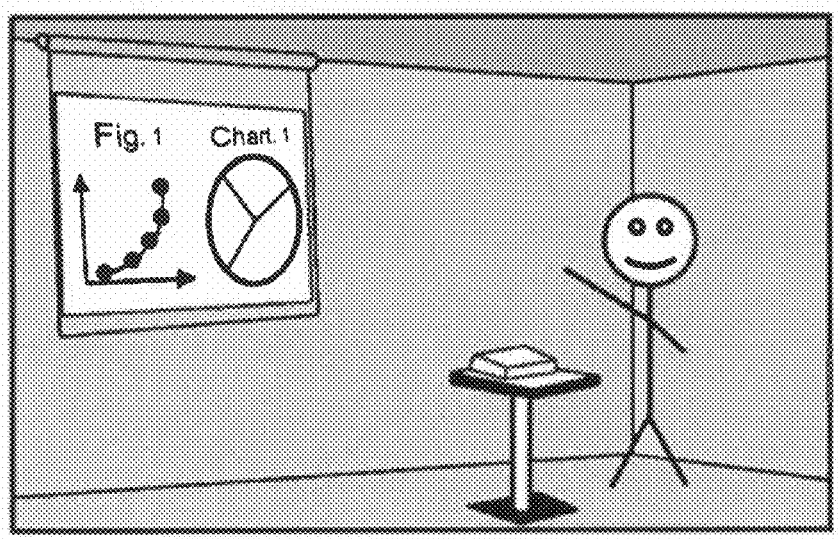
FIGS. 63A and 63B are diagrams showing images of presentation scenes, which are captured using an imaging apparatus.
Figure 63B:
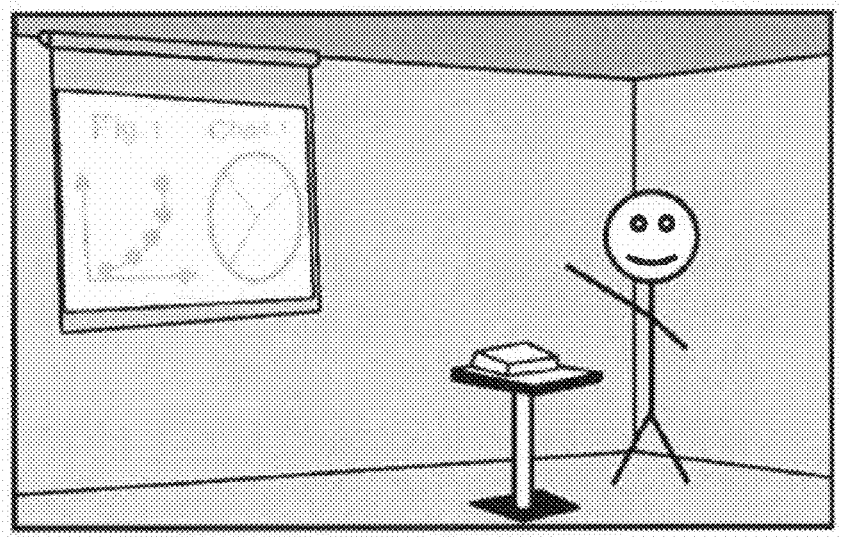
Figure 64A:
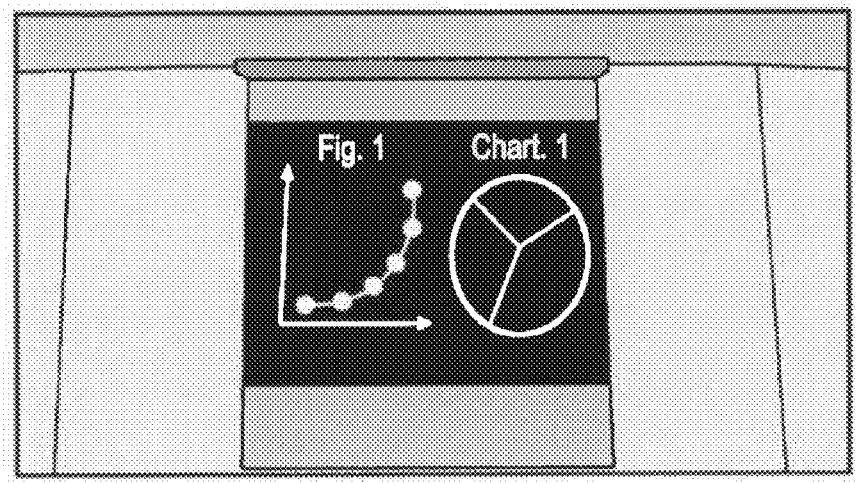
FIGS. 64A and 64B are diagrams showing images of presentation images projected on screens, which are captured using an imaging apparatus.
Figure 64B:
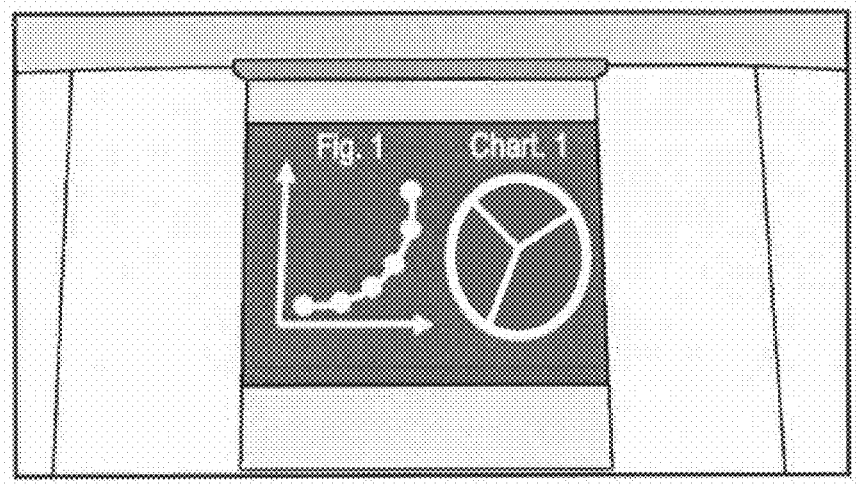
Figure 65A:
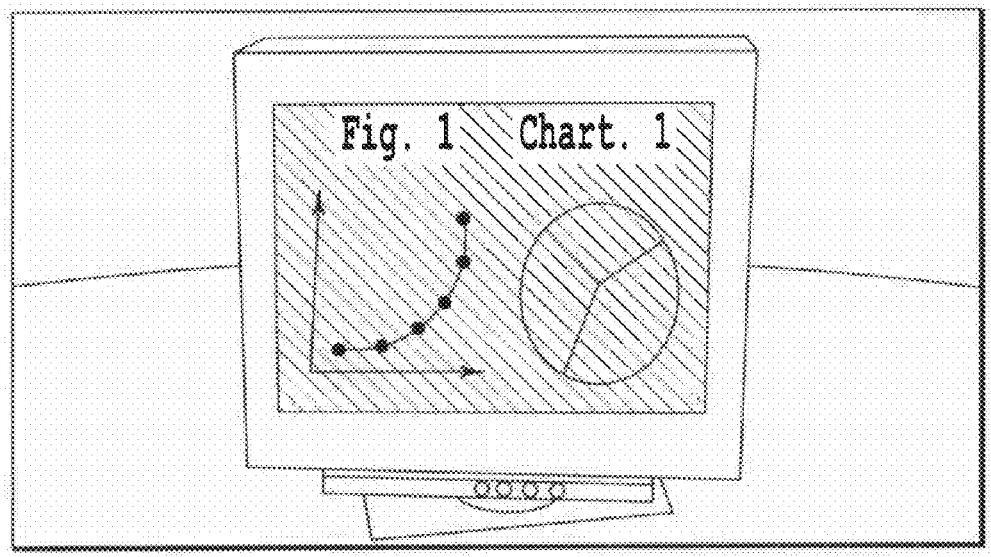
FIGS. 65A and 65B are diagrams showing images of presentation images displayed on screens of television devices, which are captured using an imaging apparatus.
Figure 65B:
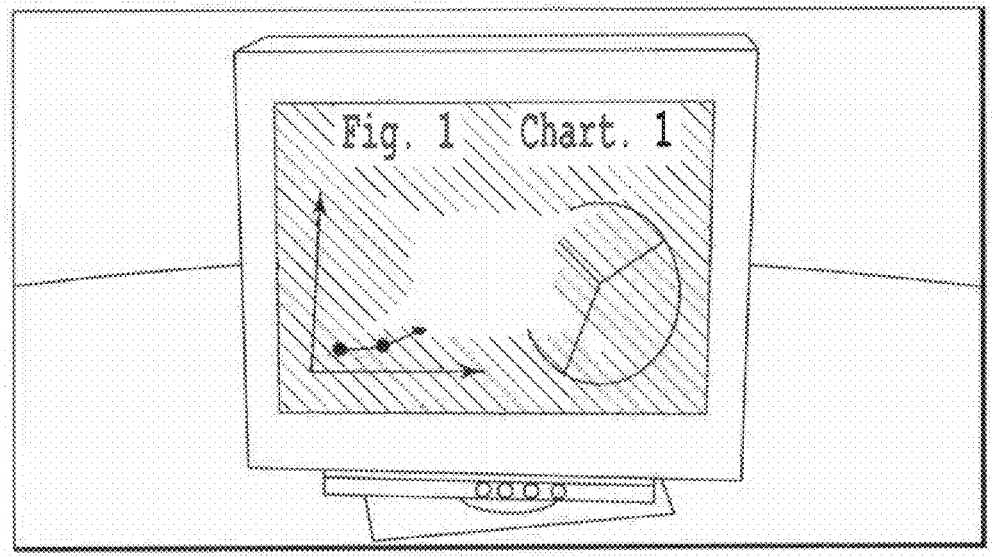

FIG. 59 is a flowchart showing a process for performing white balance adjustment on a boundary portion between a presentation image and a background image in a manner different from that for the presentation image and the background image. In step ST521, as in step ST501, the control unit 51 causes the presentation-image detecting unit 31 to perform detection of a presentation image region, and proceeds to step ST522.

In step ST522, as in step ST502, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST523. If it is determined that the condition is not satisfied, the control unit 51 sets the imaging mode to another imaging mode (for example, the normal imaging mode), and proceeds to step ST525.

In step ST523, as in step ST503, the control unit 51 allows the user to recognize that the imaging mode of the imaging apparatus 10 has been set in the presentation-image imaging mode, and proceeds to step ST524.

In step ST524, the control unit 51 causes the white balance adjustment unit 351 of the image processing unit 35 to perform white balance adjustment, with separation of a presentation image and a background image, individually on the presentation image, the background image, a boundary portion therebetween. Then, the control unit 51 proceeds to step ST527. Specifically, the control unit 51 notifies the white balance adjustment unit 351 that the presentation-image imaging mode has been set by using the control signal CTe. The white balance adjustment unit 351 segments, based on the detection signal JA, a captured image into a presentation image region and a background image region, and performs white balance detection for each region to obtain detection signals JC. Then, the white balance adjustment unit 351 determines a white balance correction coefficient for each image so that each of the presentation image and the background image can correctly be white-balance-adjusted. Further, the white balance adjustment unit 351 determines a position ACpa of achromatic color in the presentation image and a position ACpb of achromatic color in the background image in an (R/G)-(B/G) plane from the detection signals JC, and sets, as a white balance correction coefficient used for white balance adjustment of the boundary portion, a white balance correction coefficient so that an intermediate position ACpc between the positions ACpa and ACpb is used as achromatic color. FIG. 60 shows the intermediate position ACpc between the positions ACpa and ACpb in the (R/G)-(B/G) plane. In this manner, white balance correction coefficients determined for a presentation image, a background image, and a boundary portion therebetween are used to perform white balance adjustment for the respective regions.

When the process proceeds from step ST522 to step ST525, as in step ST505, the control unit 51 performs a normal imaging mode notification process, and proceeds to step ST526. In step ST526, as in step ST506, the control unit 51 causes the white balance adjustment unit 351 to perform white balance adjustment without separation of the presentation image and the background image, and proceeds to step ST527.

In step ST527, the control unit 51 determines whether or not the imaging operation ends. If it is determined that the imaging operation ends, the control unit 51 terminates white balance adjustment. If it is determined that the imaging operation does not end, the control unit 51 returns to step ST521.

Accordingly, a boundary portion between a presentation image and a background image is white-balance-adjusted so that the intermediate color between achromatic color in the presentation image and achromatic color in the background image is set as achromatic color. This prevents the boundary portion between the presentation image and the background image from being perceived to be unnatural unlike the case where no boundary portion is provided. For example, a boundary portion may also be provided so as to have a predetermined width with respect to the boundary between the presentation image and the background image, or a boundary portion may be provided in accordance with the degree of importance of an image. For example, if the presentation image has a high degree of importance, a boundary portion may be provided so as to extend toward the background image having a low degree of importance with respect to the boundary between the presentation image and the background image. With the provision of a boundary portion in this manner, no reddish or bluish cast occurs in, for example, a portion where a white image portion is adjacent to a background image in an image having a high degree of importance. Thus, white balance adjustment of an image having a high degree of importance can be performed preferentially.

In addition, white balance adjustment may be performed using a white balance correction coefficient determined for a boundary portion as a white balance correction coefficient used for an image with a low degree of importance, for example, a background image.

In a case where, as in the embodiment described above, white balance adjustment is performed on each of a presentation image and a background image, low accuracy of detecting a presentation image may cause switching of white balance correction coefficients in the presentation image or in the background image. This may result in an unnatural-color boundary appearing in the presentation image or in the background image. In order to avoid such an inconvenience, a white balance correction coefficient may be determined so that in which an intermediate position in an (R/G)-(B/G) plane between the position of achromatic color in the presentation image and the position of achromatic color in the background image is used as achromatic color, and white balance adjustment of the presentation image and the background image may be performed using this white balance correction coefficient.

FIG. 61 is a flowchart showing a process for performing white balance adjustment using white balance correction coefficients determined so that the intermediate color between achromatic color in a presentation image and achromatic color in a background image is set as achromatic color. In step ST531, as in step ST501, the control unit 51 causes the presentation-image detecting unit 31 to perform detection of a presentation image region, and proceeds to step ST532.

In step ST532, as in step ST502, the control unit 51 determines whether or not a condition for switching to the presentation-image imaging mode is satisfied. If it is determined that the condition for switching to the presentation-image imaging mode is satisfied, the control unit 51 sets the imaging mode to the presentation-image imaging mode, and proceeds to step ST533. If it is determined that the condition is not satisfied, the control unit 51 sets the imaging mode to another imaging mode (for example, the normal imaging mode), and proceeds to step ST535.

In step ST533, as in step ST503, the control unit 51 allows the user to recognize that the imaging mode of the imaging apparatus 10 has been set in the presentation-image imaging mode, and proceeds to step ST534.

In step ST534, the control unit 51 causes the white balance adjustment unit 351 of the image processing unit 35 to individually perform white balance adjustment so that the intermediate color between achromatic color in the presentation image and achromatic color in the background image is set as achromatic color, and proceeds to step ST537. Specifically, the control unit 51 notifies the white balance adjustment unit 351 that the presentation-image imaging mode has been set by using the control signal CTe. The white balance adjustment unit 351 segments, based on the detection signal JA, a captured image into a presentation image region and a background image region, and performs white balance detection for each region, and detects, from resulting detection signals JC, for example, the position of achromatic color in the presentation image and the position of achromatic color in the background image in an (R/G)-(B/G) plane. Further, the white balance adjustment unit 351 determines a white balance correction coefficient so that an intermediate position between the position of the achromatic color in the presentation image and the position of the achromatic color in the background image is set as achromatic color, and performs white balance adjustment of the presentation image and the background image using this white balance correction coefficient.

When the process proceeds from step ST532 to step ST535, as in step ST505, the control unit 51 performs a normal imaging mode notification process, and proceeds to step ST536. In step ST536, as in step ST506, the control unit 51 causes the white balance adjustment unit 351 to perform white balance adjustment without separation of the presentation image and the background image, and proceeds to step ST537.

In step ST537, the control unit 51 determines whether or not the imaging operation ends. If it is determined that the imaging operation ends, the control unit 51 terminates white balance adjustment. If it is determined that the imaging operation does not end, the control unit 51 returns to step ST531.

Accordingly, even if the accuracy of detecting a presentation image region is low, switching between white balance correction coefficients is not performed in a presentation image or in a background image, resulting in no unnatural color boundaries appearing in the presentation image or the background image.

A white balance adjustment unit may be provided for each of presentation image and background image regions into which a captured image is segmented. Alternatively, a single white balance adjustment unit may be used to switch white balance correction coefficients image-by-image to perform white balance adjustment.

In a case where a single white balance adjustment unit is used to switch white balance correction coefficients image-by-image to perform white balance adjustment, an image signal of a presentation image and an image signal of a background image are separately extracted from image signals of a captured image, and white balance adjustment is performed using an image signal of one of the images. Then, the white balance correction coefficient is switched to a different one and white balance adjustment is performed using an image signal of the other image. The white-balance-adjusted image signals of the presentation image and background image are combined to produce an image signal of one captured image.

In a case where a single white balance adjustment unit is used to switch white balance correction coefficients image-by-image to perform white balance adjustment, furthermore, white balance correction coefficients are switched in accordance with whether a signal of each pixel in image signals of a captured image corresponds to an image signal of a presentation image or an image signal of a background image. This ensures that an image signal of a captured image subjected to white balance adjustment using a white balance correction coefficient in accordance with each of a presentation image and a background image can be obtained without performing a process of combining white-balance-adjusted image signals of the presentation image and background image to produce an image signal of one captured image.

The present application contains object matter related to that disclosed in Japanese Priority Patent Applications JP 2008-098644 filed in the Japan Patent Office on Apr. 4, 2008, JP 2008-098645 filed in the Japan Patent Office on Apr. 4, 2008, JP 2008-235245 filed in the Japan Patent Office on Sep. 12, 2008, JP 2008-098646 filed in the Japan Patent Office on Apr. 4, 2008, JP 2008-098647 filed in the Japan Patent Office on Apr. 4, 2008, and JP 2008-098648 filed in the Japan Patent Office on Apr. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging unit configured to capture an image of an object to obtain an image signal;
    a detection unit configured to set a detection area in a captured image based on the image signal obtained by the imaging unit and calculate a detection value from an image signal in the detection area;
    an exposure adjustment unit configured to perform exposure adjustment;
    a control unit configured to control the exposure adjustment unit so that the detection value becomes equal to a predetermined value; and
    a presentation-image detecting unit configured to detect whether a presentation image presented by an image presentation device is included in the captured image on the basis of a difference in luminance of a region in the captured image and a determination of whether an aspect ratio of the region is within a predetermined range, wherein when the presentation-image detecting unit detects the presentation image, the detection unit sets the detection area in a location different from a location of the detected presentation image.

2. The imaging apparatus according to claim 1, wherein the presentation-image detecting unit detects the presentation image only by determining whether or not the captured image includes the presentation image, and
    wherein when the presentation-image detecting unit determines that the captured image includes the presentation image, the detection unit provides the detection area so as to be located along at least one side of the captured image except for a center portion thereof.

3. The imaging apparatus according to claim 2, wherein the imaging unit is configured to obtain an image signal of the captured image, the image signal being indicative of an aspect ratio indicating that the captured image is horizontally larger than the presentation image, and
    wherein the detection unit provides the detection area so as to be located in a region other than the presentation image in the captured image, the region being produced due to a difference in aspect ratio between the presentation image and the captured image.

4. The imaging apparatus according to claim 1 or 2, further comprising a user interface unit configured to generate an operation signal according to a user operation,
    wherein the detection unit provides the detection area so as to be located along at least one side of the captured image when the operation signal indicates an operation of selecting an imaging mode for capturing the presentation image.

5. The imaging apparatus according to claim 1, wherein the exposure adjustment unit is configured to change at least one of an amount of light entering the imaging unit, a gain of an image signal output from the imaging unit, and an exposure time over which the imaging unit obtains the image signal.

6. The imaging apparatus according to claim 1, wherein the presentation-image detecting unit includes
    a binarization processing unit configured to compare a luminance value for each pixel of the captured image with a threshold value and generate a binary signal indicating a comparison result,
    a distribution obtaining unit configured to obtain, from the binary signals, horizontal and vertical distributions of pixels whose luminance values exceed the threshold value, and
    a detecting unit configured to detect horizontal and vertical sides of the region from the horizontal distribution and the vertical distribution and determine that the region defined by the detected horizontal and vertical sides corresponds to the presentation image.

7. The imaging apparatus according to claim 1, wherein the presentation-image detecting unit detects whether the presentation image is included in a portion of the captured image specified by a user.

8. The imaging apparatus according to claim 6, wherein the threshold value is one of input by a user and is automatically generated based on the image signal.

* * * * *